US012656830B2

(12) United States Patent
Kang et al.

(10) Patent No.: US 12,656,830 B2
(45) Date of Patent: Jun. 16, 2026

(54) METHOD FOR MANUFACTURING GLASS WINDOW, METHOD FOR MANUFACTURING DISPLAY DEVICE, DISPLAY DEVICE AND ELECTRONIC DEVICE HAVING THE SAME

(71) Applicant: Samsung Display Co., Ltd., Yongin-si (KR)

(72) Inventors: Byunghoon Kang, Seoul (KR); Kyung-Man Kim, Anyang-si (KR); Sanghoon Kim, Hwaseong-si (KR); Sunghoon Kim, Hwaseong-si (KR); Seungho Kim, Asan-si (KR); Yuri Kim, Guri-si (KR); Min-Hoon Choi, Seoul (KR); Seongjin Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 484 days.

(21) Appl. No.: 18/100,709

(22) Filed: Jan. 24, 2023

(65) Prior Publication Data

US 2023/0305598 A1     Sep. 28, 2023

(30) Foreign Application Priority Data

Mar. 28, 2022     (KR) ........................ 10-2022-0037944

(51) Int. Cl.
| | |
|---|---|
| *C03C 23/00* | (2006.01) |
| *B32B 3/30* | (2006.01) |
| *B32B 17/06* | (2006.01) |
| *C03C 15/00* | (2006.01) |
| *G06F 1/16* | (2006.01) |

(52) U.S. Cl.
CPC ............. *G06F 1/1656* (2013.01); *B32B 3/30* (2013.01); *B32B 17/06* (2013.01); *C03C 15/00* (2013.01);

(Continued)

(58) Field of Classification Search
CPC .... G06F 1/1656; G06F 1/1616; G06F 1/1652; G06F 1/1681; G06F 9/301; G06F 1/1641;

(Continued)

(56) References Cited

U.S. PATENT DOCUMENTS

| | | |
|---|---|---|
| 9,921,414 B2 | 3/2018 | Kwon et al. |
| 10,020,462 B1 | 7/2018 | Al et al. |

(Continued)

FOREIGN PATENT DOCUMENTS

| | | |
|---|---|---|
| CN | 112349209 | 2/2021 |
| KR | 10-2017-0000030 A | 1/2017 |

(Continued)

*Primary Examiner* — Abbas Rashid
*Assistant Examiner* — Caroline Beha
(74) *Attorney, Agent, or Firm* — Sughrue Mion, PLLC

(57) ABSTRACT

A method for manufacturing a glass window. The glass window includes a folding area folded with respect to a folding axis and a non-folding area adjacent to the folding area. The method for manufacturing the glass window includes forming a pattern glass including a pattern part and a non-pattern part adjacent to the pattern part, the pattern part including first groove patterns in a first surface and corresponding to the folding area and a non-pattern part adjacent to the pattern part and corresponding to the non-folding area, and forming a filling layer on the pattern part. The forming of the filling layer includes initial filling of a filling resin into the groove patterns, and additional filling of the filling resin into the outermost groove patterns that are farthest from the folding axis among the groove patterns.

24 Claims, 62 Drawing Sheets

(52) U.S. Cl.
CPC ........ *C03C 23/0025* (2013.01); *G06F 1/1616*
(2013.01); *G06F 1/1652* (2013.01); *B32B*
*2457/20* (2013.01)

(58) Field of Classification Search
CPC ....... B32B 3/30; B32B 17/06; B32B 2457/20;
C03C 15/00; C03C 23/0025; C03C 17/32;
H10K 50/84; H10K 50/865; H10K 71/00;
H10K 77/111; H10K 2102/311
See application file for complete search history.

(56) References Cited

U.S. PATENT DOCUMENTS

| | | | |
|---|---|---|---|
| 10,948,630 B2 | 3/2021 | Kim et al. | |
| 11,320,866 B2 * | 5/2022 | Sunwoo | G06F 1/1656 |

| | | | | |
|---|---|---|---|---|
| 2003/0184613 | A1 * | 10/2003 | Nakamura | B41J 2/15 347/107 |
| 2004/0023567 | A1 * | 2/2004 | Koyama | B41J 2/04598 439/894 |
| 2018/0143353 | A1 * | 5/2018 | Kim | G06F 1/1652 |
| 2020/0411780 | A1 * | 12/2020 | Kim | H10K 50/841 |
| 2021/0043858 | A1 * | 2/2021 | Choi | H10K 71/00 |
| 2023/0104988 | A1 * | 4/2023 | Ahn | G02B 1/14 359/483.01 |

FOREIGN PATENT DOCUMENTS

| | | |
|---|---|---|
| KR | 10-2017-0023231 | 3/2017 |
| KR | 10-2018-0057814 | 5/2018 |
| KR | 10-2018-0079093 | 7/2018 |
| KR | 10-2019-0066106 A | 6/2019 |
| KR | 10-2146730 B1 | 8/2020 |
| KR | 10-2021-0053113 | 5/2021 |

* cited by examiner

NPP1

GP1

GP2

FL1

FL2

PP

NPP2

NPP1

PP

NPP2

NPP2

GP2

GP1

FL1

NPP1

W_UMa { W_BM

PL

W_ALa

METHOD FOR MANUFACTURING GLASS WINDOW, METHOD FOR MANUFACTURING DISPLAY DEVICE, DISPLAY DEVICE AND ELECTRONIC DEVICE HAVING THE SAME

CROSS-REFERENCE TO RELATED APPLICATION(S)

This U.S. non-provisional patent application claims priority to and benefits of Korean Patent Application No. 10-2022-0037944 under 35 U.S.C. § 119, filed on Mar. 28, 2022 in the Korean Intellectual Property Office, the entire contents of which are hereby incorporated by reference.

BACKGROUND

1. Technical Field

The disclosure relates to a method for manufacturing a glass window having impact resistance and capable of folding, a method for manufacturing a display device, a display device, and an electronic device having the same.

2. Description of the Related Art

A display device displays various images on a display screen to provide information to a user. In general, a display device displays information within an assigned screen.

In recent years, flexible display devices including foldable flexible display panels are being developed. A flexible display device may be foldable or rollable, unlike a flat panel display device. A flexible display device, which is capable of being modified in various shapes, may be portable regardless of a size of an existing screen and thus may improve user convenience.

SUMMARY

The disclosure provides a method for manufacturing a glass window having impact resistance and being capable of folding, and a method for manufacturing a display device.

The disclosure provides a display device including a glass window having impact resistance and capable of folding, and an electronic device having the same.

According to an embodiment, a method is provided for manufacturing a glass window that may include a folding area folded with respect to a folding axis and a non-folding area adjacent to the folding area. The method may include forming a pattern glass including a pattern part and a non-pattern part adjacent to the pattern part, the pattern part including first groove patterns in a first surface and corresponding to the folding area, the non-pattern part corresponding to the non-folding area, and forming a first filling layer on the pattern part. The forming of the first filling layer may include initial filling of a filling resin into the first groove patterns, and additional filling of the filling resin into first and second outermost groove patterns that are farthest from the folding axis among the first groove patterns.

Each of the first groove patterns may have a strip shape extending in a first direction parallel to the folding axis. The first groove patterns may be disposed in a second direction perpendicular to the first direction.

The first and second outermost groove patterns may be disposed at both sides opposite to each other with respect to the folding axis in the second direction.

The initial filling of the filling resin may be in an inkjet manner, and the additional filling of the filling resin may be in an inkjet manner.

The initial filling of the filling resin into the first groove patterns may include a plurality of unit filling processes.

A discharge amount per each one of the plurality of unit filling processes and a discharge amount per the additional filling of the filling resin into the first and second outermost groove patterns may be same.

The filling of the filling resin may further include second additional filling of the filling resin into both ends of each of the first groove patterns.

The initial filling of the filling resin may be in an inkjet manner, the additional filling of the filling resin may be in an inkjet manner, and the second additional filling of the filling resin may be in an inkjet manner.

The initial filling of the filling resin into the first groove patterns may include a plurality of unit filling processes.

A discharge amount per each one of the plurality of unit filling processes and a discharge amount per the additional filling of the filling resin into both the ends may be same.

The forming of the pattern glass may include forming the first groove patterns, each of which may be in a shape that is recessed from a surface of a base glass.

The forming of the first groove patterns may include irradiating laser onto the surface of the base glass to form laser patterns, and etching the base glass, on which the laser patterns may be formed, to form the first groove patterns.

A height difference between the surface and the first filling layer may be about 5 μm or less.

The method may further include attaching a window upper film to the pattern glass and the first filling layer.

The window upper film may include a protective layer, a window adhesive layer disposed between the protective layer and the pattern glass, and a window light blocking layer disposed to surround the window adhesive layer and disposed along an edge of the protective layer.

The method may further include forming a window adhesive layer on the pattern glass and the first filling layer. The forming of the window adhesive layer may include initial injecting of an adhesive resin onto the pattern glass and the first filling layer to form a preliminary adhesive layer, and additional injecting of the adhesive resin onto an edge portion of the preliminary adhesive layer to form the window adhesive layer.

The adhesive resin may have adhesion greater than or equal to that of the filling resin.

The filling resin may have a modulus less than or equal to that of the adhesive resin.

The method may further include attaching a window upper film to the window adhesive layer. The window upper film may further include a protective layer, and a window light blocking layer disposed along an edge of the protective layer.

The pattern part may further include second groove patterns in a second surface facing the first surface and corresponding to the folding area. The method for manufacturing the glass window may further include forming a second filling layer on the pattern part. The forming of the second filling layer may include initial filling of the filling resin into the second groove patterns, and additional filling of the filling resin into third and fourth outermost groove patterns that are farthest from the folding axis among the second groove patterns.

According to an embodiment, a method is provided for manufacturing a display device that may include a folding area folded with respect to a folding axis and a non-folding area adjacent to the folding area. The method may include manufacturing a display panel that displays an image, manufacturing a glass window, and physically connecting the display panel to the glass window. The manufacturing of the glass window may include forming a pattern glass including a pattern part including groove patterns corresponding to the folding area and a non-pattern part adjacent to the pattern part and corresponding to the non-folding area, and forming a filling layer on the pattern part. The forming of the filling layer may include initial filling of a filling resin into the groove patterns, and additional filling of the filling resin into the outermost groove patterns that are farthest from the folding axis among the groove patterns.

According to an embodiment, a display device is provided that may include a folding area folded with respect to a folding axis and a non-folding area adjacent to the folding area. The display device may include a display panel that displays an image, a glass window disposed on the display panel, and a window upper film disposed on the glass window. The glass window may include a pattern glass including a pattern part including first groove patterns in a first surface and corresponding to the folding area and a non-pattern part adjacent to the pattern part and corresponding to the non-folding area, and a first filling layer filled into the first groove patterns. The window upper film may include a protective layer, and a window light blocking layer disposed along an edge of the protective layer and that covers a first edge surface disposed on each of both ends of the first filling layer in a first direction parallel to the folding axis.

The first edge surface may include an inclined surface inclined with respect to a top surface of the first filling layer.

The window light blocking layer may have a width greater than a width of the first edge surface in the first direction.

The pattern part may further include second groove patterns in a second surface facing the first surface and corresponding to the folding area, and the glass window may further include a second filling layer filled into the second groove patterns.

The window light blocking layer may cover a second edge surface disposed on each of both ends of the second filling layer in the first direction parallel to the folding axis, and the window light blocking layer has a width greater than a width of the second edge surface in the first direction.

The window upper film may further include a window adhesive layer disposed between the protective layer and the pattern glass, and the window light blocking layer may be disposed to surround the window adhesive layer.

According to an embodiment, an electronic device is provided that may include a folding area folded with respect to a virtual folding axis and a non-folding area adjacent to the folding area. The electronic device may include a display panel that displays an image, a glass window disposed on the display panel, a window upper film disposed on the glass window, and a housing physically connected to the glass window and that accommodates the display panel. The glass window may include a pattern glass including a pattern part including groove patterns corresponding to the folding area and a non-pattern part adjacent to the pattern part and corresponding to the non-folding area, and a filling layer provided on the pattern part. The window upper film may include a protective layer, and a window light blocking layer disposed along an edge of the protective layer and that covers an edge surface disposed on each of both ends of the filling layer in a first direction parallel to the folding axis.

The edge surface may include an inclined surface inclined with respect to a top surface of the filling layer, and the window light blocking layer may have a width greater than a width of the edge surface in the first direction.

The window upper film may further include a window adhesive layer disposed between the protective layer and the pattern glass, and the window light blocking layer may be disposed to surround the window adhesive layer.

BRIEF DESCRIPTION OF THE DRAWINGS

The accompanying drawings are included to provide a further understanding of the disclosure, and are incorporated in and constitute a part of this specification. The drawings illustrate embodiments and, together with the description, serve to explain principles of the disclosure. In the drawings:

FIG. 5A is a schematic cross-sectional view of the display device, taken along line I-I' of FIG. 4;

FIG. 6B is a schematic cross-sectional view taken along line II-II' of FIG. 6A;

FIG. 7C is a schematic cross-sectional view taken along line III-III' of FIG. 7B;

FIGS. 13A to 13K are schematic views illustrating a process of manufacturing a glass window according to an embodiment;

FIGS. 15A to 15H are schematic views illustrating a process of manufacturing a glass window according to an embodiment;

FIGS. 17A to 17C are schematic views illustrating a process of manufacturing a glass window according to an embodiment.

DETAILED DESCRIPTION OF THE EMBODIMENTS

Figure 1:
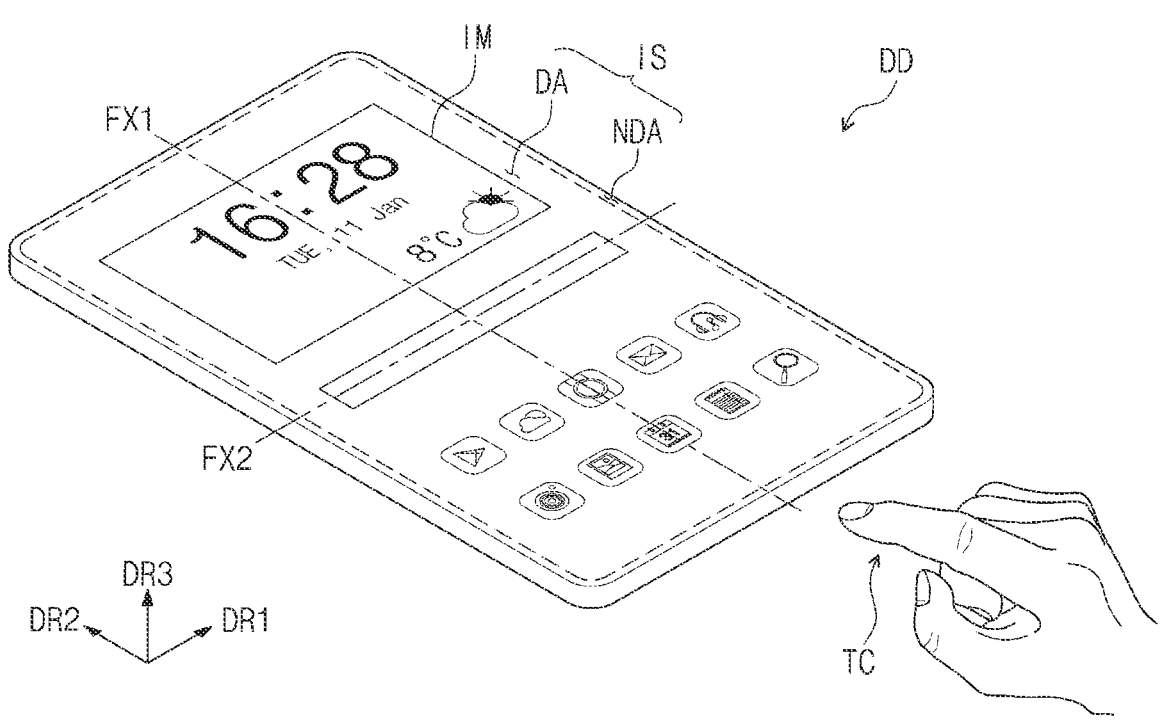
FIG. 1 is a schematic perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In this specification, it will also be understood that when one component (or region, layer, portion) is referred to as being "on", "connected to", or "coupled to" another component, it can be directly disposed/connected/coupled on/to the other component, or an intervening third component may also be present.

Like reference numerals refer to like elements throughout. Also, in the figures, the thickness, ratio, and dimensions of components may be exaggerated for clarity of illustration. The term "and/or" includes any and all combinations of one or more of the associated elements. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

It will be understood that although the terms such as "first" and "second" are used herein to describe various elements, these elements should not be limited by these terms. The terms are only used to distinguish one component from other components. For example, a first element referred to as a first element in an embodiment can be referred to as a second element in another embodiment without departing from the scope of the disclosure. Terms of a singular form may include plural forms unless the context clearly indicates otherwise.

Also, "under", "below", "on", "above", and the like are used for explaining relation association of the elements illustrated in the drawings. The terms may be a relative concept and described based on directions expressed in the drawings.

The meaning of "include," "have,", "comprise," and the like specifies a property, a fixed number, a process, an operation, an element, a component or a combination thereof, but does not exclude other properties, fixed numbers, processes, operations, elements, components or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic perspective view of a display device according to an embodiment.

Referring to FIG. 1, a display device DD may be a device activated according to an electrical signal. The display device DD may include various embodiments. For example, the display device DD may be used for large electronic devices such as a television, a monitor, or an external billboard as well as small and medium-sized electronic devices such as a personal computer, a notebook computer, a personal digital terminal, a car navigation unit, a game console, a portable electronic device, or a camera. In this embodiment, a display device DD for a smart phone will be described as an example.

The display device DD according to an embodiment may have a rectangular shape having short sides in a first direction DR1 and long sides in a second direction DR2 crossing the first direction DR1. However, the display device DD is not limited in shape. For example, the display device DD may have various shapes.

The display device DD may be a foldable display device. Particularly, the display device DD according to an embodiment may be folded with respect to a folding axis extending in a direction. Hereinafter, a flat state without being folded is defined as a first state (i.e., unfolded state), and a state folded with respect to the folding axis is defined as a second state (i.e., folded state). The folding axis may be a rotational axis generated in case that the display device DD is folded and may be defined by a mechanical structure of the display device DD.

The folding axis may extend in the first direction DR1 or the second direction DR2. In an embodiment, the folding axis extending in the second direction DR2 may be defined as a first folding axis FX1, and a folding axis extending in the first direction DR1 may be defined as a second folding axis FX2. The display device DD may include a folding axis of the first folding axis FX1 and the second folding axis FX2. For example, the display device DD may be folded with respect to a folding axis of the first and second folding axes FX1 and FX2.

As illustrated in FIG. 1, the display device DD may display an image IM on a display surface IS that is parallel to each of the first and second directions DR1 and DR2. The display surface IS on which the image IM is displayed may correspond to a front surface of the electronic device DD. A direction perpendicular to the display surface IS, for example, a thickness direction of the display device DD, may be referred to as a third direction DR3. The display surface IS may display the image IM in the third direction DR3.

The display surface IS of the display device DD may be divided into multiple areas. A display area DA and a non-display area NDA may be defined on the display surface IS of the display device DD.

The display area DA may be an area on which an image IM is displayed, and a user may see the image IM through the display area DA. The display area DA may have a rectangular shape. The non-display area NDA may be an area which is adjacent to the display area DA and on which the image IM may not be displayed. A bezel area of the display device DD may be defined by the non-display area NDA. For example, the non-display area NDA may surround the display area DA. Thus, the shape of the display area DA may be substantially defined by the non-display area NDA. However, this is merely an example. For example, the non-display area NDA may be disposed adjacent to only a side of the display area DA or may be omitted.

A display device DD according to an embodiment may sense a user's input TC applied from the outside. The user's input TC may include various types of external inputs such as a portion of user's body, light, heat, a pressure, or the like. In this embodiment, the user's input TC is illustrated as a user's hand applied to the front surface. However, this is merely an example. For example, as described above, the user's input TC may be provided in various shapes. The display device DD may sense the user's input TC applied to a side surface or the rear surface of the display device DD according to a structure of the display device DD, but is not limited to a specific embodiment.

The display device DD may activate the display surface IS to display the image IM and also sense the user's input TC. In this embodiment, an area on which the user's input TC is sensed may be provided on the display area DA on which the image IM is displayed. However, this is merely an example. For example, the area on which the user's input TC may be provided on the non-display area NDA or provided on an entire area of the display surface IS.

FIGS. 2A to 2D are schematic views illustrating a state in which the display device of FIG. 1 may be folded.

Figure 2A:
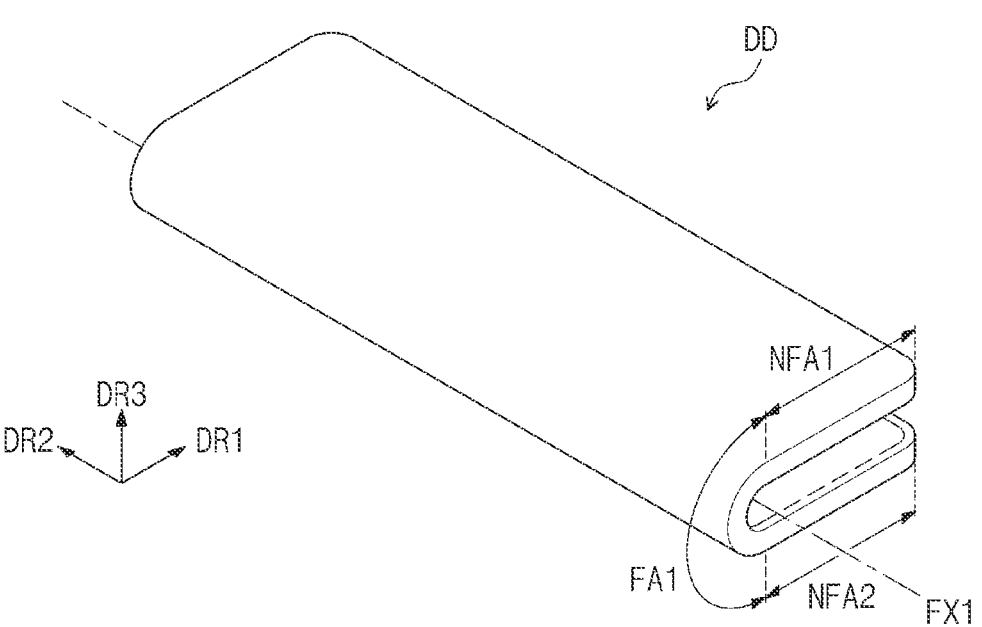
FIGS. 2A to 2D are schematic views illustrating a state in which the display device of FIG. 1 may be folded.
Figure 2B:
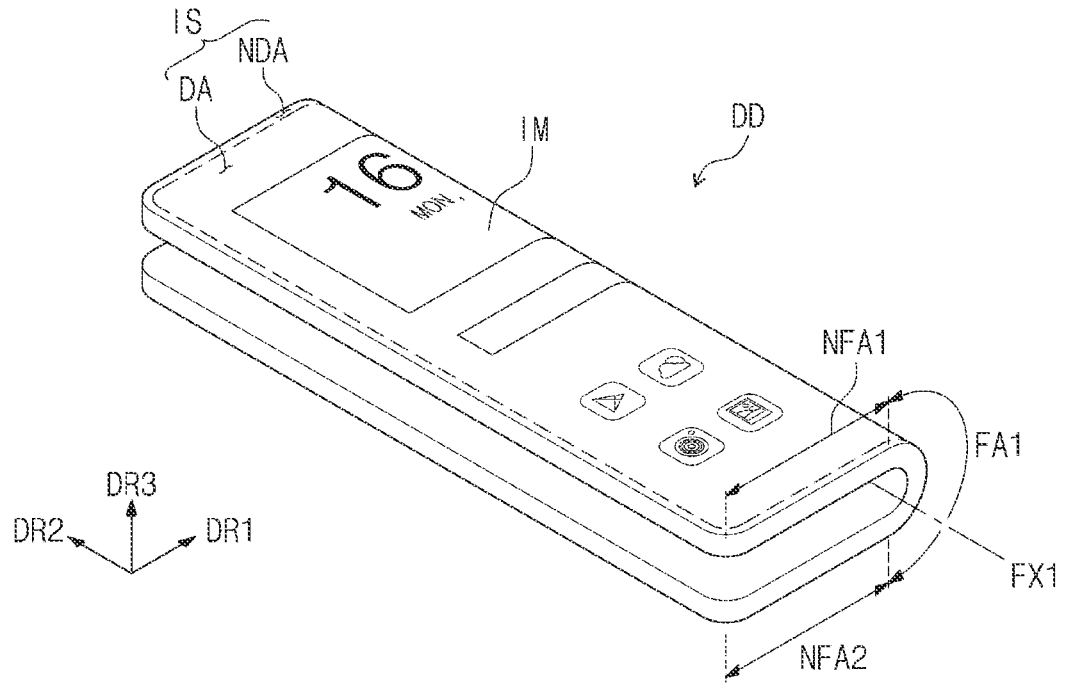

FIG. 2A is a view illustrating a state in which the display device DD of FIG. 1 is in-folded along a first folding axis, and FIG. 2B is a view illustrating a state in which the display device DD of FIG. 1 is out-folded along the first folding axis.

Figure 2C:
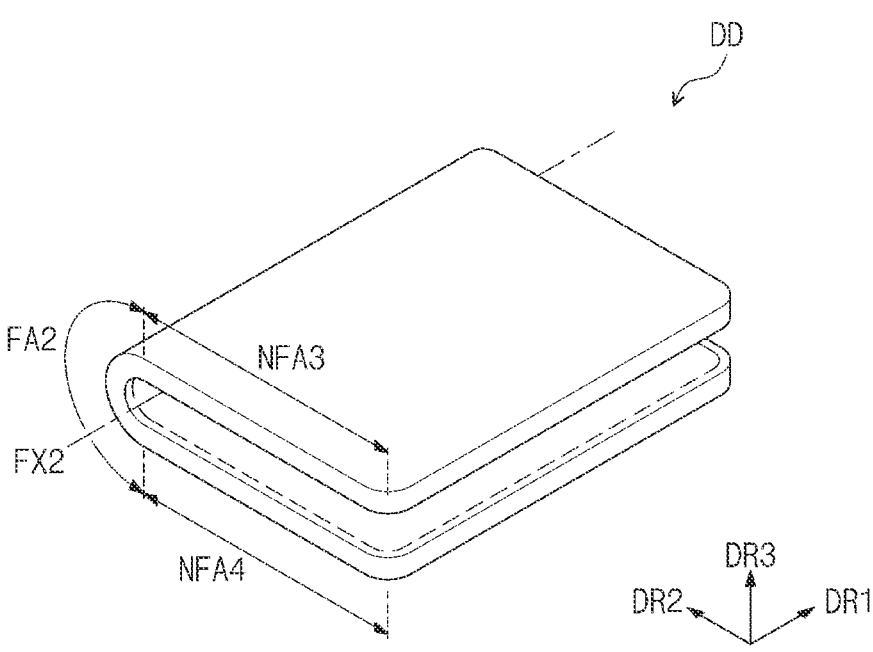
Figure 2D:
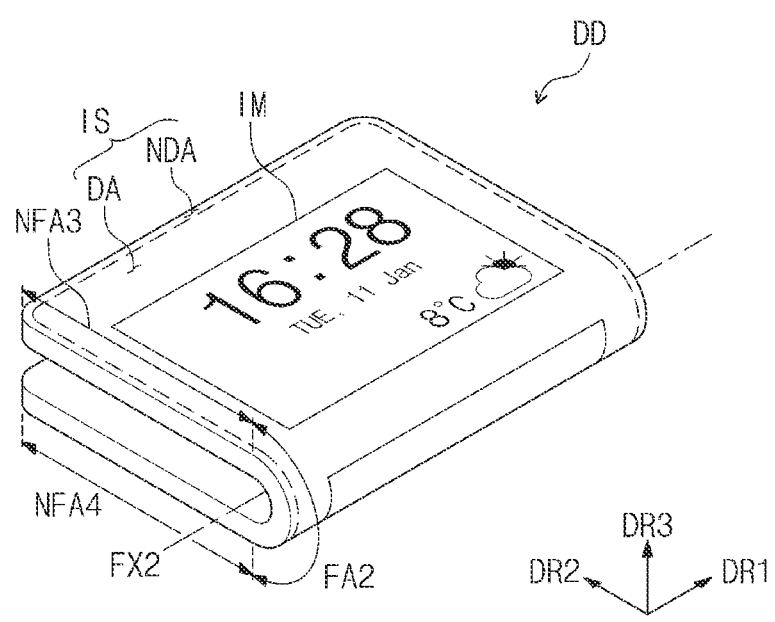

FIG. 2C is a view illustrating a state in which the display device DD of FIG. 1 is in-folded along the second folding axis, and FIG. 2D is a view illustrating a state in which the display device DD of FIG. 1 is out-folded along the second folding axis.

Referring to FIGS. 2A to 2D, the display device DD may be a foldable display device DD. The display device DD may be folded based on the folding axis extending in a direction (e.g., the first folding axis FX1 or the second folding axis FX2).

Referring to FIGS. 2A and 2B, multiple areas may be defined in the display device DD according to an operation type. The areas may be divided into the folding area FA1 and at least one non-folding area NFA1 and NFA2. The folding area FA1 may be defined between the two non-folding areas NFA1 and NFA2.

The folding area FA1 may be an area that is folded with respect to the first folding axis FX1 to substantially form a curvature. Here, the first folding axis FX1 may extend in the second direction DR2, for example, in a long axis direction of the display device DD. The folding area FA1 may be defined as an area that is folded along the first folding axis FX1 and extends in the second direction DR2.

According to an embodiment, the non-folding areas NFA1 and NFA2 may include a first non-folding area NFA1 and a second non-folding area NFA2. The first non-folding area NFA1 may be adjacent to a side of the folding area FA1 in the first direction DR1, and the second non-folding area NFA2 may be adjacent to another side of the folding area FA1 in the first direction DR1.

The display device DD may be in-folded or out-folded. The folding of the display surfaces of the different non-folding areas NFA1 and NFA2 to face each other may be defined as in-folding, and the folding of the display surfaces of the different non-folding areas NFA1 and NFA2 to face the outside may be defined as out-folding.

Here, the in-folding refers to folding of the display surface IS to face each other, and the out-folding refers to folding of the rear surface of the display device DD to face each other.

The display device DD illustrated in FIG. 2A may be in-folded so that the display surface IS of the first non-folding area NFA1 and the display surface IS of the second non-folding area NFA2 face each other. As the first non-folding area NFA1 rotates in a clockwise direction along the first folding axis FX1, the display device DD may be in-folded. To in-fold the display device DD1 so that the first non-folding area NFA1 and the second non-folding area NFA2 are aligned, the first folding axis FX1 may be defined at a center of the display device DD in the first direction DR1.

Referring to FIG. 2B, the display device DD may be out-folded with respect to the first folding axis FX1. The display device DD may display the image IM in case that the display surface of the first non-folding area NFA1 and the display surface of the second non-folding area NFA2 are exposed to the outside. The display surface of the folding area FA1 exposed to the outside may also display the image IM. Referring to FIG. 1, the display device DD may display the image IM in a unfolded state. The first non-folding area NFA1, the second non-folding area NFA2, and the folding area FA may respectively display images providing pieces of information, which may be independent of each other, or respectively display portions of an image providing one item of information.

The display device DD may be manufactured to have both the in-folding state and the out-folding state or may be manufactured to have one of the in-folding state and the out-folding state.

Referring to FIGS. 2C and 2D, the display device DD may be in-folded or out-folded with respect to the second folding axis FX2. The second folding axis FX2 may extend along the first direction DR1, for example, a short axis direction of the display device DD.

Multiple areas may be defined in the display device DD according to an operation type. The areas may be divided into a folding area FA2 and at least one non-folding area NFA3 and NFA4. The folding area FA2 is defined between the two non-folding areas NFA3 and NFA4.

The folding area FA2 may be an area that is folded with respect to the first folding axis FX2 to substantially form a curvature. The folding area FA2 may be defined as an area that is folded along the second folding axis FX2 and extends in the first direction DR1.

According to an embodiment, the non-folding areas NFA3 and NFA4 may include a first non-folding area NFA3 and a second non-folding area NFA4. The first non-folding area NFA3 may be adjacent to a side of the folding area FA2 in the second direction DR2, and the second non-folding area NFA4 may be adjacent to another side of the folding area FA2 in the second direction DR2.

Figure 3A:
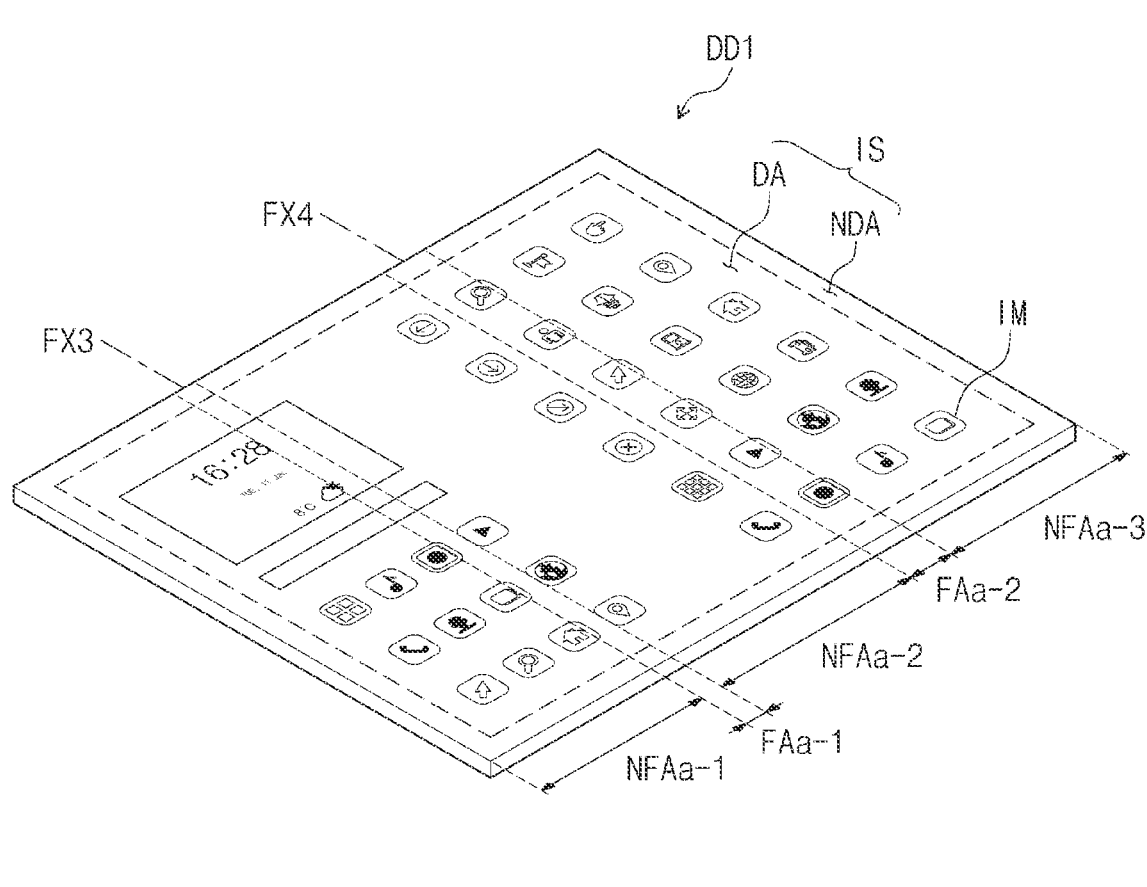
FIG. 3A is a schematic perspective view illustrating a state in which the display device is unfolded according to an embodiment.
Figures 3B, 3C:
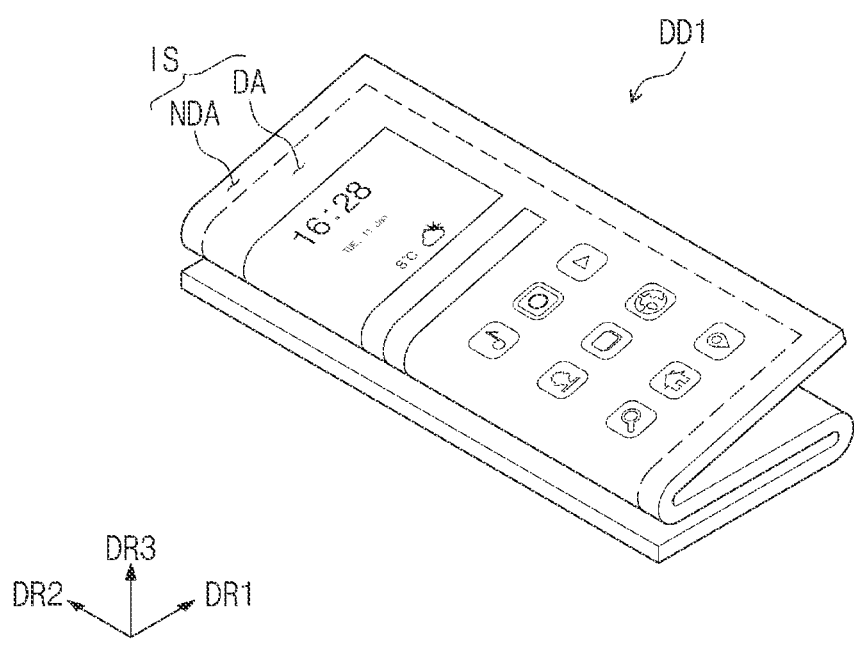
FIGS. 3B and 3C are schematic views illustrating a state in which the display device of FIG. 3A is folded.

FIG. 3A is a schematic perspective view illustrating a state in which the display device is unfolded according to an embodiment. FIGS. 3B and 3C are schematic views illustrating a state in which the display device of FIG. 3A is folded.

Referring to FIGS. 3A and 3B, a display device DD1 may be a multi-foldable display device. Multiple folding areas may be defined in the display device DD1. The display device DD1 may include folding areas FAa-1 and FAa-2 and non-folding areas NFAa-1, NFAa-2, and NFAa-3. As an example, the display device DD1 may include a first folding area FAa-1, a second folding area FAa-2, a first non-folding area NFAa-1, a second non-folding area NFAa-2, and a third non-folding area NFAa-3. The first folding area FAa-1 may be disposed between the first non-folding area NFAa-1 and the second non-folding area NFAa-2 in the first direction DR1, and the second folding area FAa-2 may be disposed between the second non-folding area NFAa-2 and the third non-folding area NFAa-3 in the first direction DR1. For example, the two folding areas FAa-1 and FAa-2 and three non-folding areas NFAa-1, NFAa-2, and NFAa-3 are illustrated, but the number of folding areas FAa-1 and FAa-2 and non-folding areas NFAa-1, NFAa-2, and NFAa-3 are not limited thereto.

Referring to FIGS. 3A and 3B, the first folding area FAa-1 may be in-folded based on a third folding axis FX3 parallel to the second direction DR2. The first folding area FAa-1 may be in-folded so that a display surface of the second non-folding area NFAa-2 faces a display surface of the first non-folding area NFAa-1. The second folding area FAa-2 may be folded based on a fourth folding axis FX4 parallel to the second direction DR2. The second folding area FAa-2 may be out-folded so that a rear surface of the second non-folding area NFAa-2 and a rear surface of the third non-folding area NFAa-3 face each other, and a display surface of the third non-folding area NFAa-3 faces the outside.

Referring to FIGS. 3A and 3C, the first folding area FAa-1 may be in-folded based on the third folding axis FX3 parallel to the second direction DR2. The first folding area FAa-1 may be in-folded so that the display surface of the first non-folding area NFAa-1 is disposed therein, and the display surface of the second non-folding area NFAa-2 faces the display surface of the first non-folding area NFAa-1. The second folding area FAa-2 may be folded based on the fourth folding axis FX4 parallel to the second direction DR2. The second folding area FAa-2 may be in-folded so that the rear surface of the first non-folding area NFAa-1 and the display surface of the third non-folding area NFAa-3 face each other.

In an embodiment, the out-folding operation and the in-folding operation may occur at the same time, and only one of the out-folding operation and the in-folding operation may occur.

Although the multi-folded state of the display device DD1 is illustrated in FIGS. 3B and 3C, embodiments are not limited thereto and may have various folding shapes.

Figure 4:
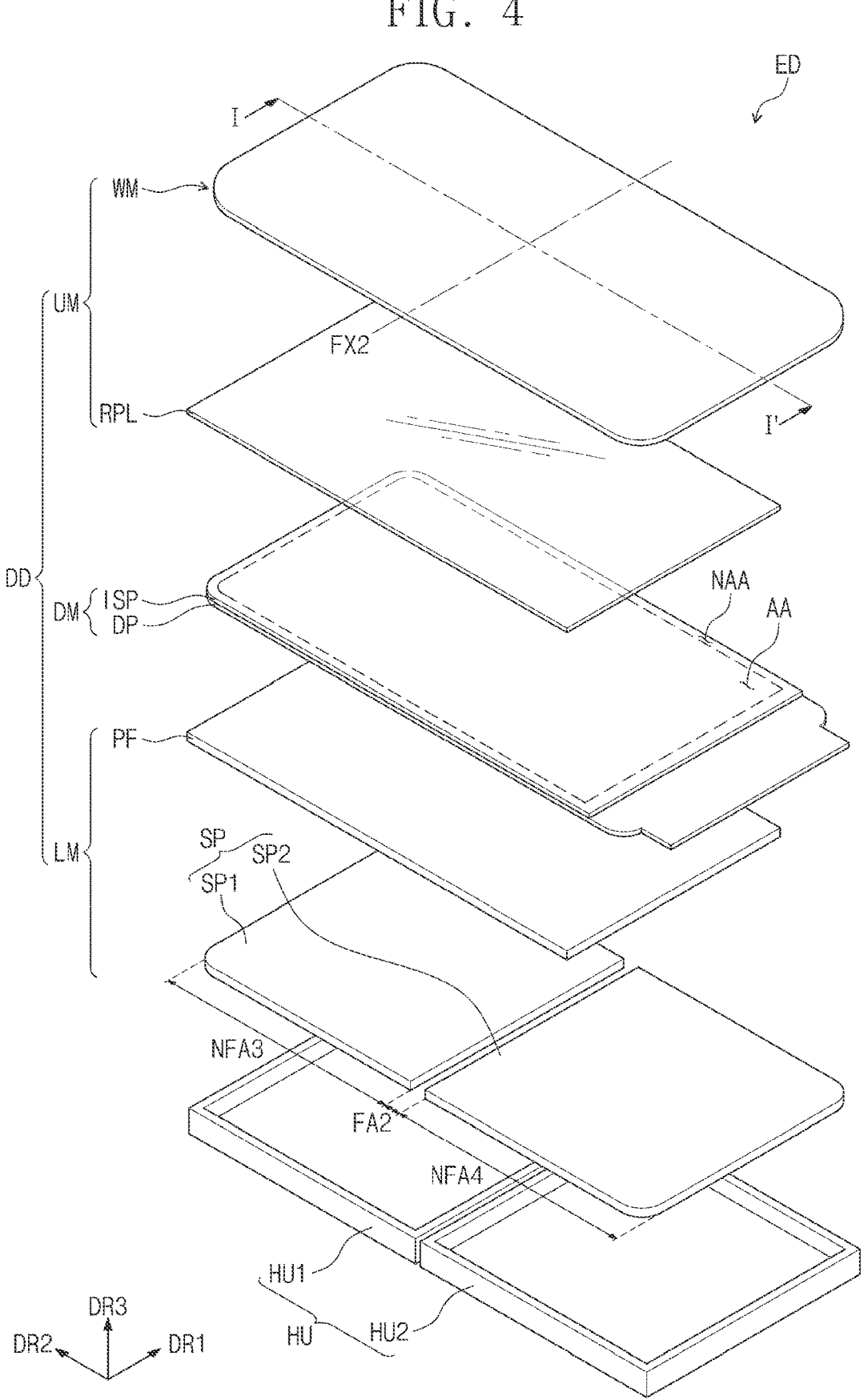
FIG. 4 is an exploded schematic perspective view of an electronic device according to an embodiment.

FIG. 4 is an exploded schematic perspective view of an electronic device according to an embodiment.

Figure 5A:
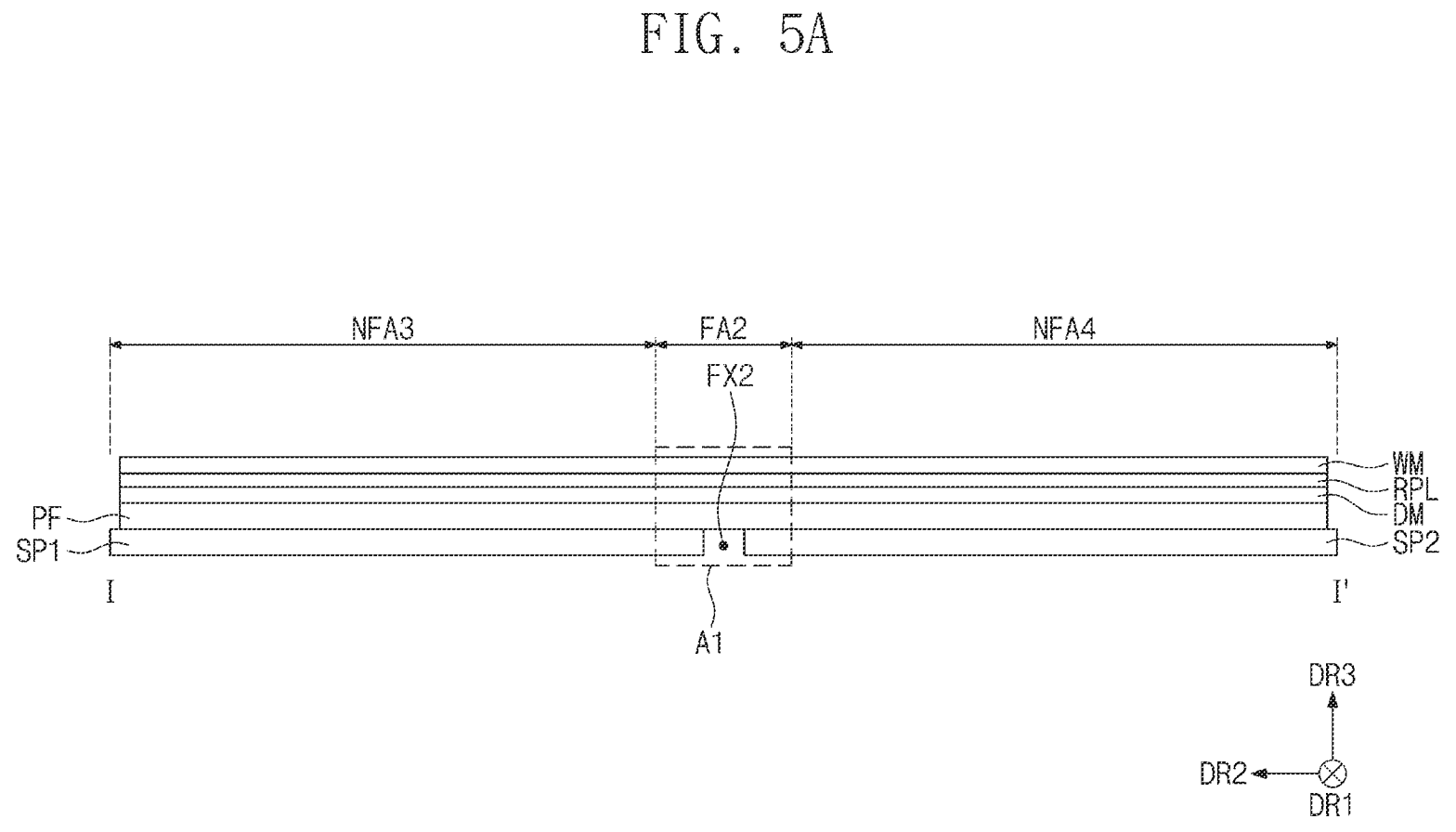
Figure 5B:
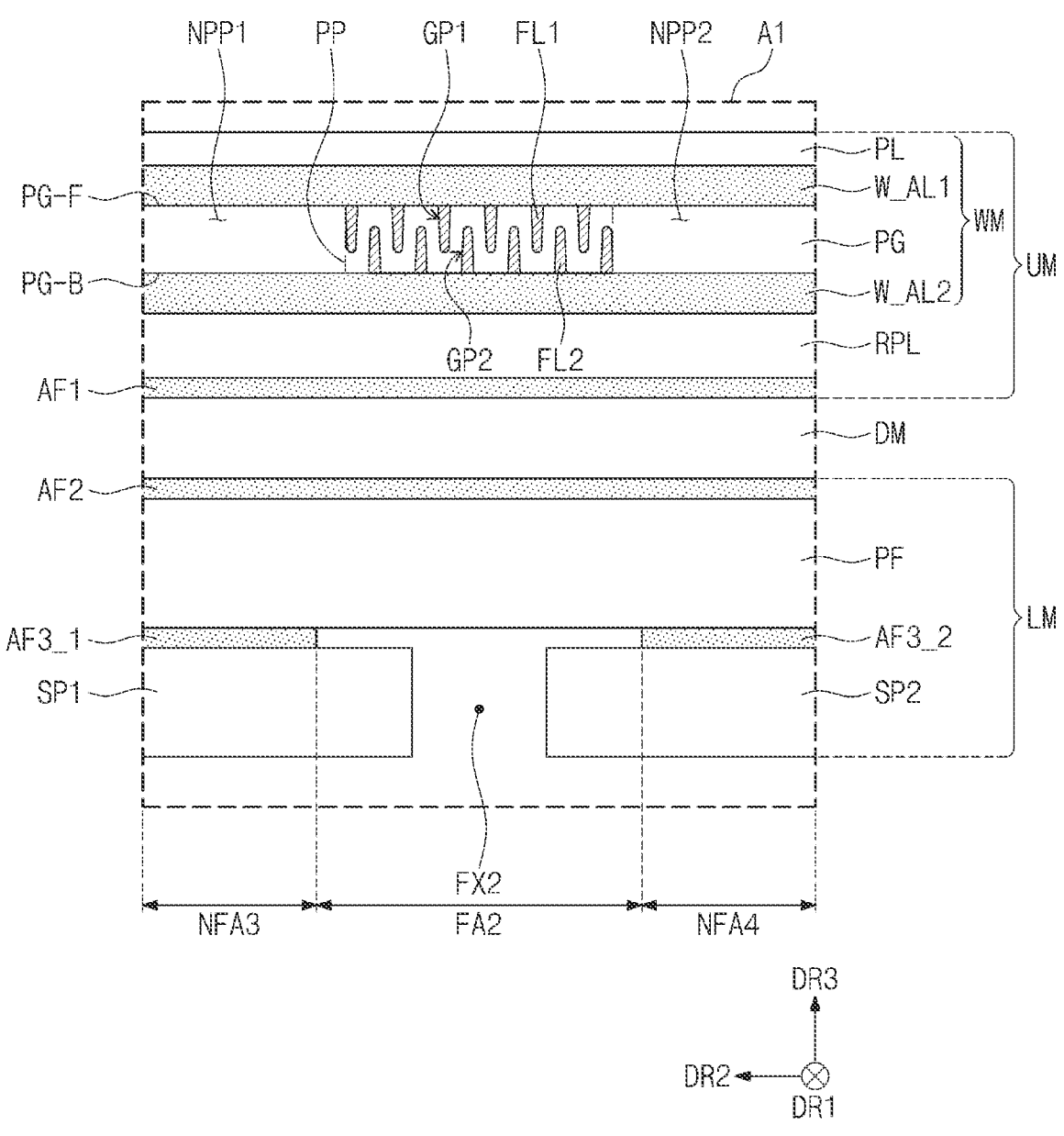
FIG. 5B is an enlarged schematic cross-sectional view of portion A1 of FIG. 5A.

FIG. 5A is a schematic cross-sectional view of the display device, taken along line I-I' of FIG. 4; FIG. 5B is an enlarged schematic cross-sectional view of portion A1 of FIG. 5A.

Referring to FIGS. 4, 5A, and 5B, an electronic device ED according to an embodiment may include a display device DD and a housing HU. Although not shown separately, the electronic device ED may further include a mechanism structure (or a hinge structure) for controlling a folding operation (or a bending operation) of the display device DD.

The display device DD according to an embodiment may include a display module DM that displays an image, an upper module UM disposed on the display module DM, and a lower module LM disposed below the display module DM. The display module DM may constitute a portion of the display device DD, and particularly, the image may be generated by the display module DM.

The display module DM may include a display panel DP and an input sensing unit ISP. The display panel DP according to an embodiment may be an emission type display panel, but is not limited thereto. For example, the display panel DP may be an organic light emitting display panel, an inorganic light emitting display panel, or a quantum dot light emitting display panel. An emission layer of the organic light emitting display panel may include an organic light emitting material, and an emission layer of the inorganic light emitting display panel may include an inorganic light emitting material. An emission layer of the quantum dot light emitting display panel may include a quantum dot, a quantum rod, and/or the like. Hereinafter, the display panel DP may be described as an organic light emitting display panel.

The display panel DP may be a flexible display panel. Thus, the display panel DP may be entirely rolled or folded or unfolded with respect to the second folding axis FX2.

The input sensing unit ISP may be directly disposed on the display panel DP. According to an embodiment, the input sensing unit ISP may be disposed on the display panel DP through a continuous process. For example, in case that the input sensing unit ISP is directly disposed on the display panel DP, an adhesive film may not be disposed between the input sensing unit ISP and the display panel DP. However, embodiments are not limited thereto. The adhesive film may be disposed between the input sensing unit ISP and the display panel DP. The input sensing unit ISP may not be manufactured together with the display panel DP by the continuous process. Thus, after being manufactured through a process separate from the process of forming the display panel DP, the input sensing unit ISP may be fixed to a top surface of the display panel DP by the adhesive film.

The display panel DP may generate an image, and the input sensing unit ISP may acquire coordinate information for a user's input (e.g., touch event).

The upper module UM may include a glass window WM disposed on the display module DM. The glass window WM may include an optically transparent insulating material. Thus, the image generated on the display module DM may pass through the glass window WM and thus be readily recognized by the user. The glass window WM may include a pattern glass PG, a first filling layer FL1, a second filling layer FL2, and a protective layer PL.

The pattern glass PG may include a glass material. The pattern glass PG may include a pattern part PP and non-pattern parts NPP1 and NPP2. The pattern part PP may correspond to the folding area FA2, and the non-pattern parts NPP1 and NPP2 may correspond to the first and second non-folding areas NFA3 and NFA4. The non-pattern parts NPP1 and NPP2 may include a first non-pattern part NPP1 corresponding to the first non-folding area NFA3 and a second non-pattern part NPP2 corresponding to the second non-folding area NFA4. The pattern part PP may be disposed between the first and second non-pattern parts NPP1 and NPP2.

The pattern glass PG may include a top surface PG-F and a bottom surface PG-B. The top surface PG-F and the bottom surface PG-B refer to two surfaces facing each other in the pattern glass PG and may be, for example, two surfaces facing each other in the third direction DR3.

The pattern part PP may include multiple first groove patterns GP1 and multiple second groove patterns GP2. In an embodiment, the first groove patterns GP1 are provided in the top surface PG-F of the pattern glass PG, and the second groove patterns GP2 are provided in the bottom surface PG-B of the pattern glass PG. Each of the first groove patterns GP1 may have a shape recessed from the top surface PG-F of the pattern glass PG. Each of the second groove patterns GP2 may have a shape recessed from the bottom surface PG-B of the pattern glass PG.

As an example, in case that the second folding axis FX2 extends in the first direction DR1, the first groove patterns GP1 may be arranged to be spaced apart from each other in the second direction DR2, and the second groove patterns GP2 may be arranged to be spaced apart from each other in the second direction DR2. In other embodiments, in case that the second folding axis FX2 extends in the second direction DR2, the first groove patterns GP1 may be arranged to be spaced apart from each other in the first direction DR1, and the second groove patterns GP2 may be arranged to be spaced apart from each other in the first direction DR1.

The first and second groove patterns GP1 and GP2 may be filled by the first and second filling layers FL1 and FL2, respectively. The first filling layer FL1 may be filled into the first groove patterns GP1, and the second filling layer FL2 may be filled into the second groove patterns GP2. In other words, a recessed space defined by the first groove patterns GP1 may be filled by the first filling layer FL1, and a recessed space formed by the second groove patterns GP2 may be filled by the second filling layer FL2. Thus, the glass window WM may have a flat surface by the first and second filling layers FL1 and FL2. As an example, the first and second filling layers FL1 and FL2 may be provided only on the pattern part PP and not be provided on the first and second non-pattern parts NPP1 and NPP2.

Each of the first and second filling layers FL1 and FL2 may include a synthetic resin material. Each of the first and second filling layers FL1 and FL2 may include a material having the same refractive index as that of the pattern glass PG. As an example, each of the first and second filling layers FL1 and FL2 may include at least one selected from a urethane resin, an epoxy resin, a polyester resin, a polyether resin, an acrylate resin, an acrylonitrile-butadiene-styrene (ABS) resin, and rubber. Specifically, each of the first and second filling layers FL1 and FL2 may include at least one of phenylene, polyethylene terephthalate (PET), polyimide (PI), polyamide (PAI), polyethylene naphthalate (PEN), and polycarbonate (PC).

The glass window WM may further include a protective layer PL. The protective layer PL may be provided on the pattern glass PG. The passivation layer PL may be provided on the first filling layer FL1. The protective layer PL may function to protect the pattern glass PG from an external impact. The protective layer PL may include a synthetic resin material. As an example, the protective layer PL may include at least one selected from a urethane resin, an epoxy resin, a polyester resin, a polyether resin, an acrylate resin, an acrylonitrile-butadiene-styrene (ABS) resin, and rubber. Particularly, the protective layer PL may include at least one of phenylene, polyethylene terephthalate (PET), polyimide (PI), polyamide (PAI), polyethylene naphthalate (PEN), and polycarbonate (PC).

The glass window WM may further include a first window adhesive layer W_AL1 and a second window adhesive layer W_AL2. The first window adhesive layer W_AL1 may be disposed on the top surface PG-F of the pattern glass PG, and the second window adhesive layer W_AL2 may be disposed on the bottom surface PG-B of the pattern glass PG. The first window adhesive layer W_AL1 may be disposed between the pattern glass PG and the protective layer PL to attach the protective layer PL to the pattern glass PG. The second window adhesive layer W_AL2 may couple the glass window WM to a member disposed under the glass window WM. Each of the first window adhesive layer W_AL1 and the second window adhesive layer W_AL2 may include an optically transparent adhesive material. In an embodiment, each of the first window adhesive layer W_AL1 and the second window adhesive layer W_AL2 may include a pressure sensitive adhesive (PSA), an optical clear adhesive (OCA), and/or an optical clear resin (OCR).

The glass window WM may be folded or unfolded with respect to the second folding axis FX2. For example, the glass window WM may be defined in shape together with deformation in shape of the display module DM. The glass window WM may transmit the image transmitted from the display panel DP and also mitigate the external impact to prevent the display module DM from being damaged or malfunctioned by the external impact. The external impact may mean force applied from the outside, which is expressed as a pressure, stress, or the like, i.e., force that causes defects of the display module DM.

The upper module UM may further include one or more functional layers disposed between the display module DM and the glass window WM. As an example, the functional layer may be an anti-reflection layer RPL that blocks reflection of external light. The anti-reflection layer RPL may be physically connected to the glass window WM by the second window adhesive layer W_AL2.

The anti-reflection layer RPL may prevent elements constituting the display module DM from being visually recognized at the outside by external light incident through a front surface of the display device DD. The anti-reflection layer RPL may include a retarder and/or a polarizer. The retarder may be a film type or liquid crystal coating type retarder and may include a $\lambda/2$ retarder and/or a $\lambda/4$ retarder. The polarizer may also be provided in a film type or liquid crystal coating type polarizer. The film type may include an elongation-type synthetic resin, and the liquid crystal coating type may include liquid crystals that are arranged in an arrangement. The retarder and the polarizer may be implemented as a polarizing film. The functional layer may further include a protective film disposed on an upper side or a lower side of the anti-reflection layer RPL.

The upper module UM may further include a first adhesive film AF1 provided between the anti-reflection layer RPL and the display module DM. The first adhesive film AF1 may include an optically transparent adhesive material. As an example, the first adhesive film AF1 may include a pressure sensitive adhesive (PSA), an optical clear adhesive (OCA), and/or an optical clear resin (OCR).

The display module DM may display an image according to an electrical signal and transmit/receive information on an external input. The display module DM may be defined into an active area AA and a peripheral area NAA. The active area AA may be defined as an area that emits the image provided from the display module DM.

The peripheral area NAA is adjacent to the active area AA. For example, the peripheral area NAA may surround the active area AA. However, this is merely an example. For example, the peripheral area NAA may have various shapes and is not limited to a specific embodiment. According to an embodiment, the active area AA of the display module DM may correspond to at least a portion of the display area DA (see FIG. 1).

The lower module LM may include a support plate SP disposed on the rear surface of the display module DM to support the display module DM. The support plate SP may include a number of support plates corresponding to a number of non-folding areas NFA3 and NFA4. As an example, the support plate SP may include a first support plate SP1 and a second support plate SP2, which may be spaced apart from the first support plate SP1.

The first and second support plates SP1 and SP2 may be disposed to correspond to the first and second non-folding areas NFA3 and NFA4, respectively. The first support plate SP1 may be disposed to correspond to the first non-folding area NFA3 of the display module DM, and the second support plate SP2 may be disposed to correspond to the second non-folding area NFA4 of the display module DM. Each of the first and second support plates SP1 and SP2 may include a metal material or a plastic material.

In case that the display module DM has a flat first state, the first and second support plates SP1 and SP2 are disposed to be spaced apart from each other in the second direction DR2. In case that the display module DM has a second state that is folded based on the second folding axis FX2, the first and second support plates SP1 and SP2 may be disposed to be spaced apart from each other in the third direction DR3.

The first and second support plates SP1 and SP2 may be spaced apart from each other with respect to the folding area FA2. The first and second support plates SP1 and SP2 may partially overlap the folding area FA2. For example, a spaced distance between the first and second support plates SP1 and SP2 in the second direction DR2 may be less than a width of the folding area FA2.

The support plate SP may further include a connection module that connects the first and second support plates SP1 and SP2 to each other. The connection module may include a hinge module or a multi joint module.

Although a case in which the support plate SP includes two support plates SP1 and SP2 is illustrated, embodiments are not limited thereto. For example, in case that multiple second folding axes FX2 are provided, the support plate SP may include multiple support plates separated based on the second folding axes FX2. Also, the support plate SP may be provided in an integral shape without being separated into the first and second support plates SP1 and SP2. A bending part may be provided on the support plate SP to correspond to the folding area FA2. An opening defined through the support plate SP may be provided in the bending part, or a groove recessed from a surface of the support plate SP may be provided in the bending part.

The lower module LM may further include a protective film PF disposed between the display module DM and the support plate SP. The protective film PF may be a layer disposed under the display module DM to protect the rear surface of the display module DM. The protective film PF may include a synthetic resin film, for example, a polyimide film or a polyethylene terephthalate film. However, this is merely an example, and the protective film PF is not limited to the above-described example.

The lower module LM may further include a second adhesive film AF2 disposed between the protective film PF and the display module DM and a third adhesive film disposed between the protective film PF and the support plate SP. The protective film PF may be attached to the rear surface of the display module DM by the second adhesive film AF2. As an example, the third adhesive film may include a first sub-adhesive film AF3_1 and a second sub-adhesive film AF3_2. The first sub-adhesive film AF3_1 may be disposed between the first support plate SP1 and the protective film PF, and the second sub-adhesive film AF3_2 may be disposed between the second support plate SP2 and the protective film PF. The first and second sub-adhesive films AF3_1 and AF3_2 may be spaced apart from each other with the folding area FA2 therebetween.

Each of the second and third adhesive films AF2, AF3_1, and AF3_2 may include an optically transparent adhesive material. As an example, each of the second and third adhesive films AF2, AF3_1, AF3_2 may include a pressure sensitive adhesive (PSA), an optical clear adhesive (OCA), and/or an optical clear resin (OCR).

The housing HU may be physically connected to the display device DD, in particular, the glass window WM to accommodate other modules (i.e., the display module DM and the lower module LM, etc.). The housing HU is illustrated as including first and second housings HU1 and HU2 separated from each other, but is not limited thereto. Although not shown, the electronic device ED may further include a hinge structure for physically connecting the first and second housings HU1 and HU2 to each other.

Hereinafter, the pattern glass PG according to an embodiment will be described in detail with reference to the drawings.

Figure 6A:
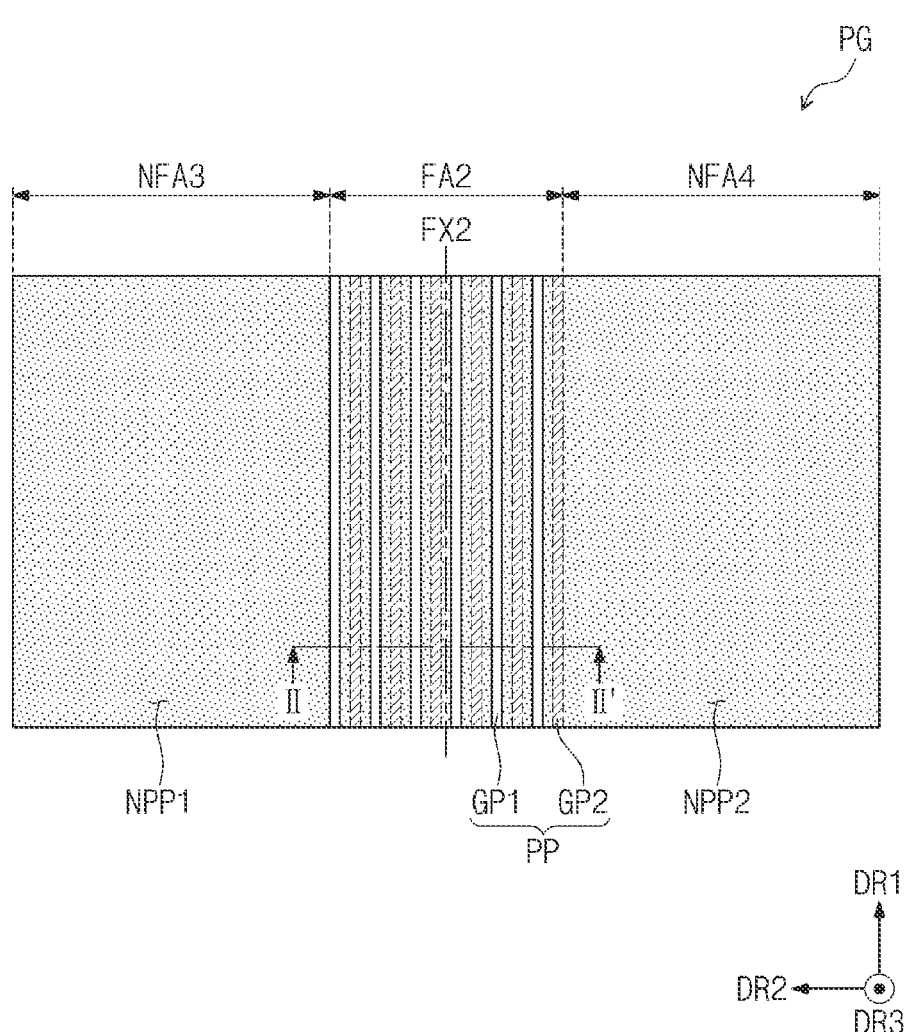
FIG. 6A is a schematic plan view of a pattern glass according to an embodiment.
Figure 6B:
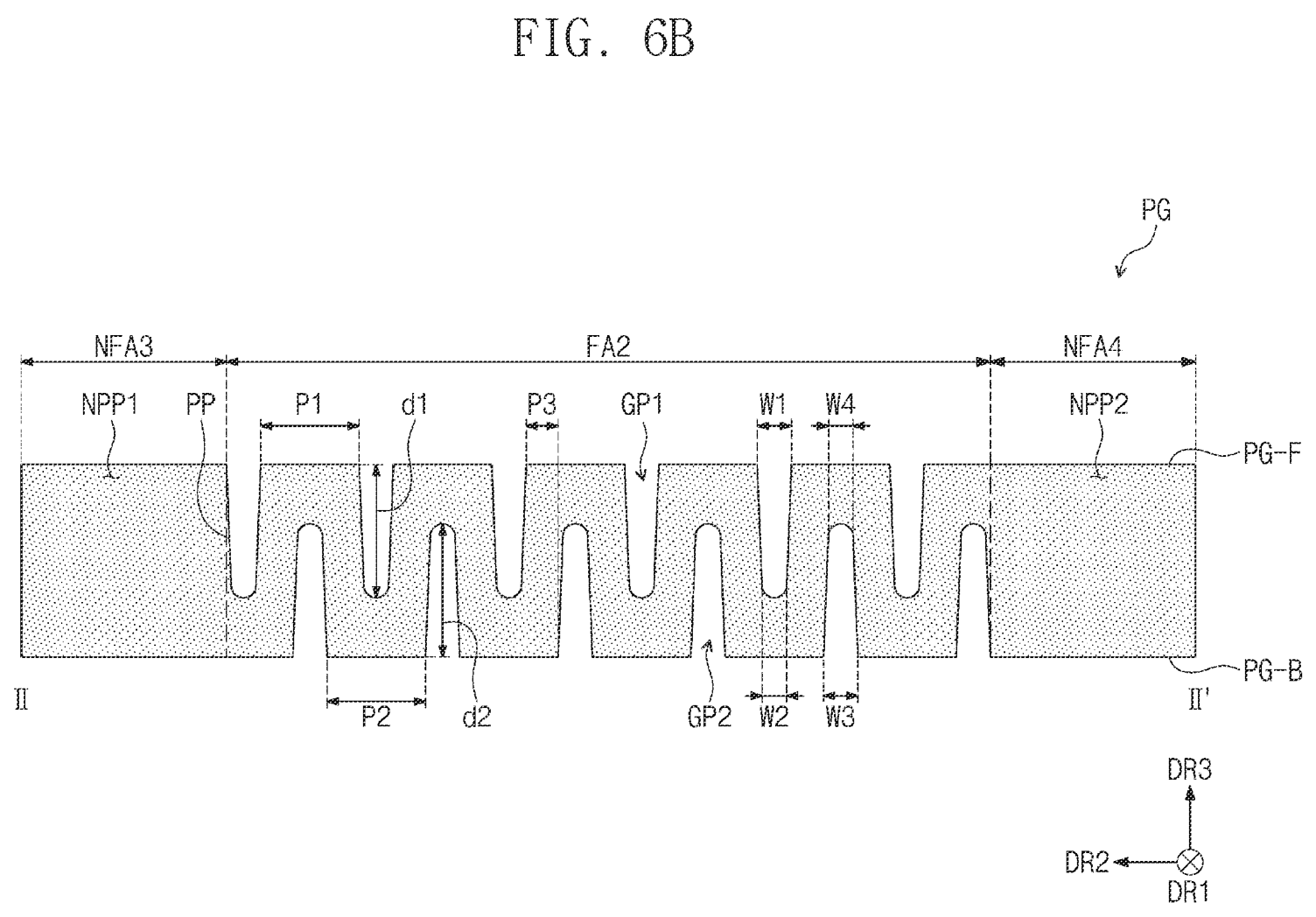

FIG. 6A is a schematic plan view of the pattern glass according to an embodiment, and FIG. 6B is a schematic cross-sectional view taken along line II-II' of FIG. 6A.

Referring to FIGS. 6A and 6B, the pattern glass PG may include a pattern part PP and non-pattern parts NPP1 and NPP2. The pattern part PP may be disposed to correspond to the folding area FA2. The non-pattern parts NPP1 and NPP2 may include a first non-pattern part NPP1 corresponding to the first non-folding area NFA3 and a second non-pattern part NPP2 corresponding to the second non-folding area NFA4. The pattern part PP may be disposed between the first and second non-pattern parts NPP1 and NPP2.

The pattern part PP may include multiple first groove patterns GP1 and multiple second groove patterns GP2. As an example, the first groove patterns GP1 may have a groove shape recessed from the top surface PG-F of the pattern glass PG. The second groove patterns GP2 may have a groove shape recessed from the bottom surface PG-B of the pattern glass PG.

Each of the first groove patterns GP1 and the second groove patterns GP2 may have a stripe shape extending in a direction parallel to the second folding axis FX2 (i.e., the first direction DR1). The first groove patterns GP1 may be arranged to be spaced apart from each other in the second direction DR2, and the second groove patterns GP2 may be arranged to be spaced apart from each other in the second direction DR2. In other embodiments, each of the first groove patterns GP1 may include multiple first sub-groove patterns arranged to be spaced apart from each other in the first direction DR1. Each of the first sub-groove patterns may have a stripe shape extending in the first direction DR1. Each of the second groove patterns GP2 may include multiple second sub-groove patterns arranged to be spaced apart from each other in the first direction DR1. Each of the second sub-groove patterns may have a stripe shape extending in the first direction DR1.

Each of the first groove patterns GP1 may have a trapezoidal shape in cross-section. A width (hereinafter, referred to as a first width) W1 of an upper end (a portion relatively adjacent to the top surface PG-F of the pattern glass PG) of each of the first groove patterns GP1 may be greater than a width (hereinafter, referred to as a second width) W2 of a lower end (a portion relatively adjacent to the bottom surface PG-B of the pattern glass PG). A bottom surface of each of the first groove patterns GP1 may have a round shape. Each of the second groove patterns GP2 may have a trapezoidal shape in cross-section. A width (hereinafter, referred to as a third width) W3 of an upper end (a portion relatively adjacent to the bottom surface PG-B of the pattern glass PG) of each of the second groove patterns GP2 may be greater than a width (hereinafter, referred to as a fourth width) W4 of a lower end (a portion relatively adjacent to the top surface PG-F of the pattern glass PG). A bottom surface of each of the second groove patterns GP2 may have a round shape.

As an example, each of the first groove patterns GP1 may have the same shape as each of the second groove patterns GP2. The first and third widths W1 and W3 may be equal to each other, and the second and fourth widths W2 and W4 may be equal to each other. However, embodiments are not limited thereto. In other embodiments, each of the first groove patterns GP1 may have a shape different from that of each of the second groove patterns GP2. The first and third widths W1 and W3 may be different from each other, and the second and fourth widths W2 and W4 may be different from each other.

A size of each of the first to fourth widths W1 to W4 may be determined according to folding characteristics. Also, a size of each of the first and second widths W1 and W2 may be adjusted according to a depth d1 (hereinafter, referred to as a first depth) of each of the first groove patterns GP1. A size of each of the third and fourth widths W3 and W4 may be adjusted according to a depth d2 (hereinafter, referred to as a second depth) of each of the second groove patterns GP2. As an example, the first depth d1 may be the same as the second depth d2. In other embodiments, the first depth d1 may be different from the second depth d2.

The first groove patterns GP1 and the second groove patterns GP2 may be alternately disposed in the second direction DR2. The first groove patterns GP1 may be uniformly spaced a first interval P1 from each other in the second direction DR2, and the second groove patterns GP2 are uniformly spaced a second interval P2 from each other in the second direction DR2. As an example, the first interval P1 and the second interval P2 may be the same. The first and second groove patterns GP1 and GP2 adjacent to each other in the second direction DR2 may be spaced a third interval P3 from each other. The third interval P3 may be less than each of the first interval P1 and the second interval P2.

Figure 7A:
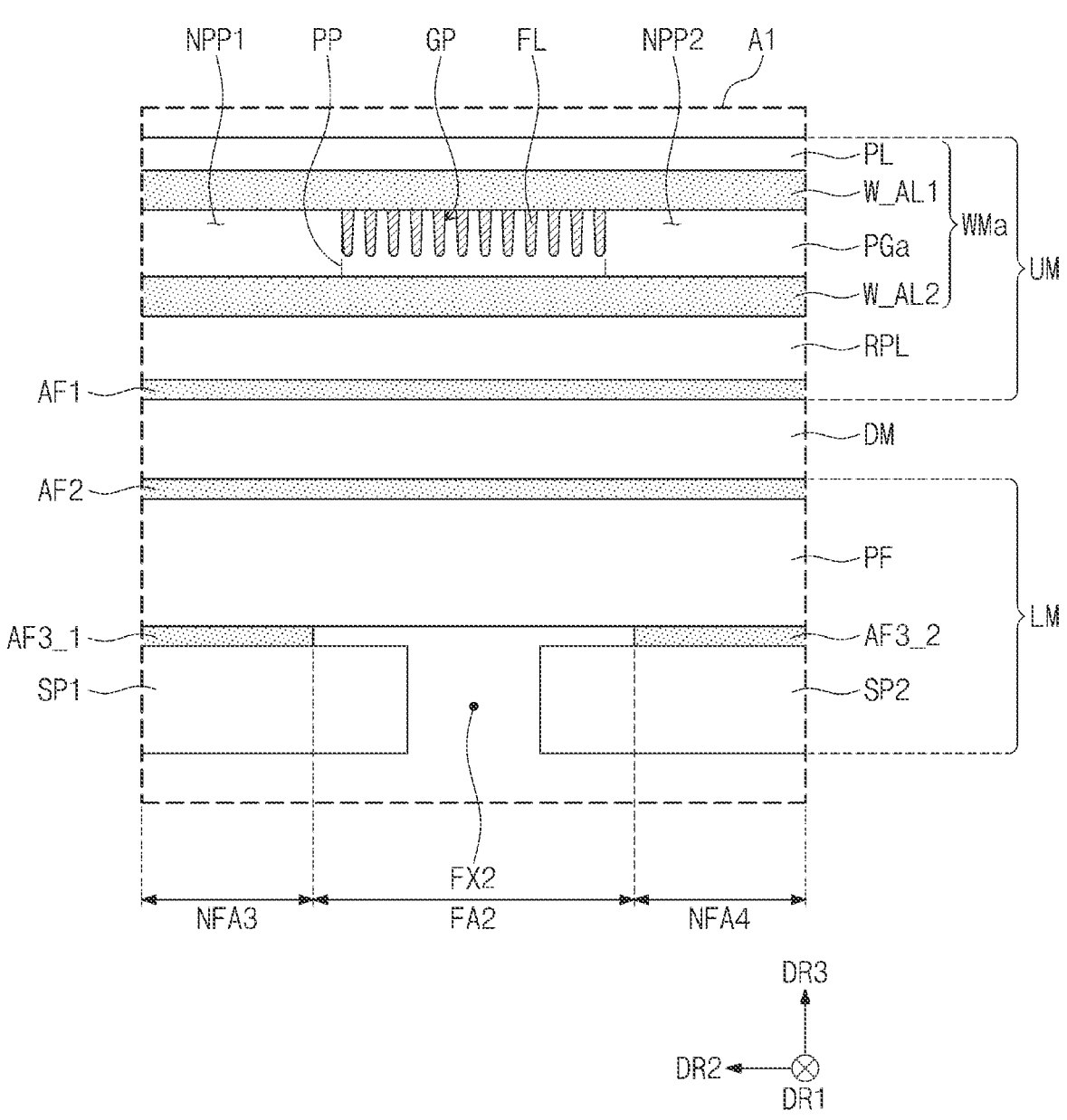
FIG. 7A is an enlarged schematic cross-sectional view of portion A1 of FIG. 5A according to an embodiment.
Figure 7B:
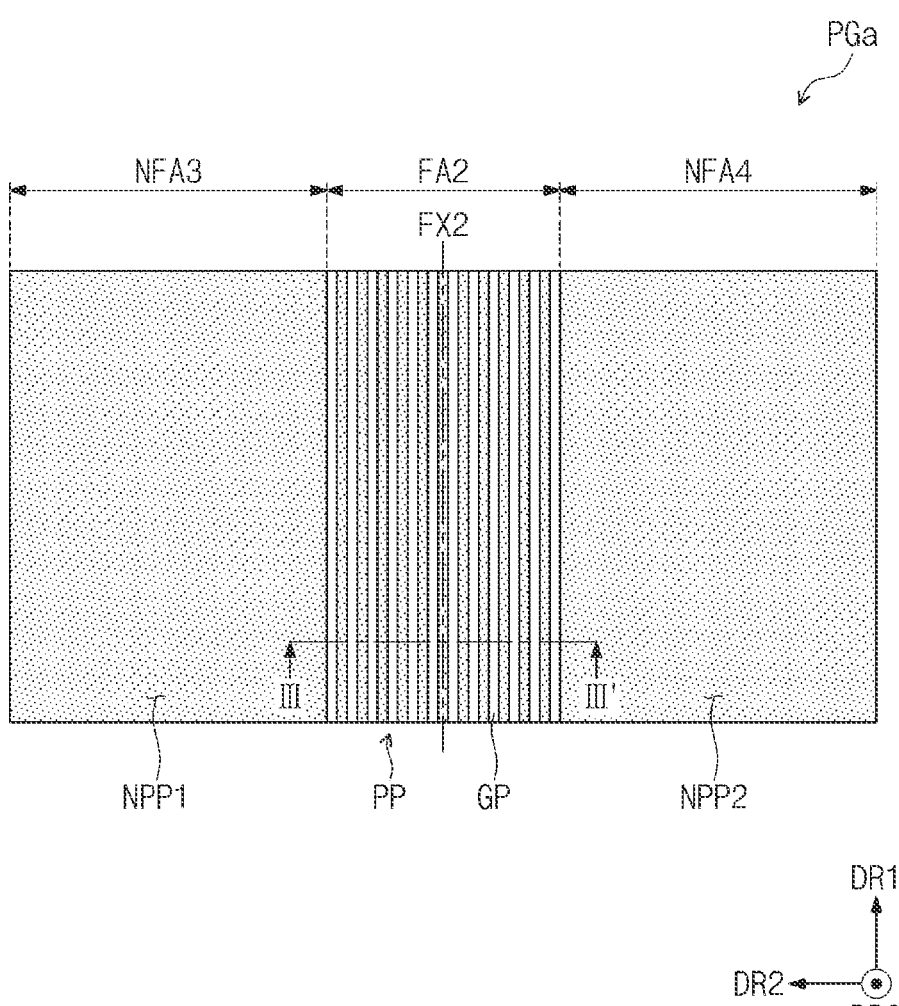
FIG. 7B is a schematic plan view of a pattern glass according to an embodiment.

FIG. 7A is an enlarged schematic cross-sectional view of portion A1 of FIG. 5A according to an embodiment. FIG. 7B is a schematic plan view of a pattern glass according to an embodiment, and FIG. 7C is a schematic cross-sectional view taken along line III-III' of FIG. 7B.

Figure 7C:
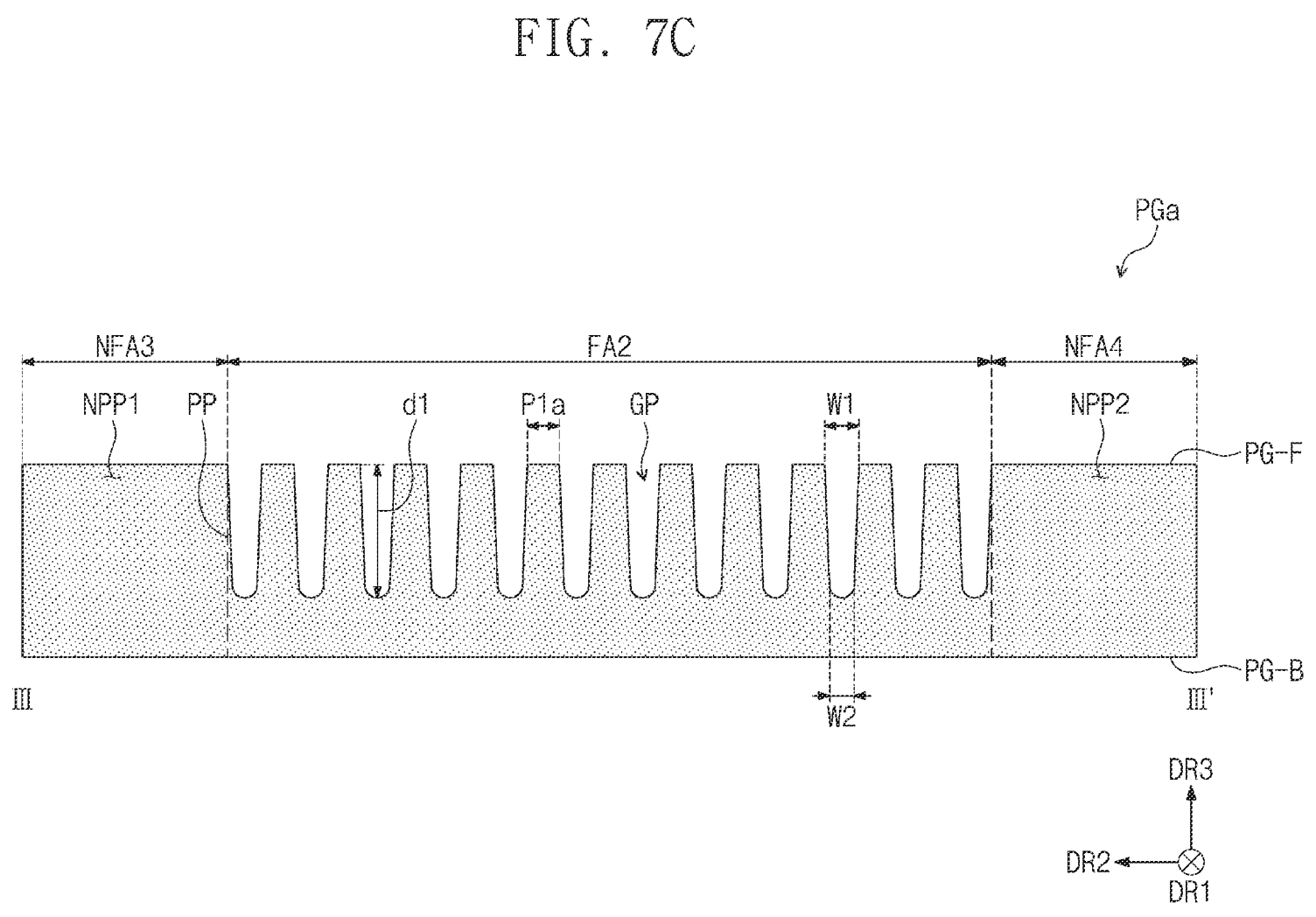

Referring to FIGS. 7A to 7C, a glass window WMa may include a pattern glass PGa, a filling layer FL, and a protective layer PL.

The pattern glass PGa may include a glass material. The pattern glass PGa may include a pattern part PP and non-pattern parts NPP1 and NPP2. The pattern part PP may correspond to the folding area FA2, and the non-pattern parts NPP1 and NPP2 may correspond to the first and second non-folding areas NFA3 and NFA4. The non-pattern parts NPP1 and NPP2 may include a first non-pattern part NPP1 corresponding to the first non-folding area NFA3 and a second non-pattern part NPP2 corresponding to the second non-folding area NFA4. The pattern part PP may be disposed between the first and second non-pattern parts NPP1 and NPP2.

The pattern glass PGa may include a top surface PG-F and a bottom surface PG-B. The top surface PG-F and the bottom surface PG-B refer to two surfaces facing each other in the pattern glass PGa and may be, for example, two surfaces facing each other in the third direction DR3.

The pattern part PP may include multiple groove patterns GP. In an embodiment, the groove patterns GP may be provided in a top surface PG-F of the pattern glass PGa. Each of the groove patterns GP may have a shape recessed from the top surface PG-F of the pattern glass PGa.

As an example, in case that the second folding axis FX2 extends in the first direction DR1, the groove patterns GP may be arranged to be spaced apart from each other in the second direction DR2. In other embodiments, in case that the second folding axis FX2 extends in the second direction DR2, the groove patterns GP may be arranged to be spaced apart from each other in the first direction DR1.

Each of the groove patterns GP may be filled with the filling layer FL. In other words, a recessed space defined by the groove patterns GP may be filled by the filling layer FL. Thus, the glass window WMa may have a flat surface due to the filling layer FL. As an example, the filling layer FL may be provided only on the pattern part PP and not be provided on the first and second non-pattern parts NPP1 and NPP2.

The filling layer FL may include a synthetic resin material. The filling layer FL may include a material having the same refractive index as that of the pattern glass PGa. As an example, the filling layer FL may include at least one selected from a urethane resin, an epoxy resin, a polyester resin, a polyether resin, an acrylate resin, an acrylonitrile-butadiene-styrene (ABS) resin, and rubber. Particularly, the filling layer FL may include at least one of phenylene, polyethylene terephthalate (PET), polyimide (PI), polyamide (PAI), polyethylene naphthalate (PEN), and polycarbonate (PC).

Referring to FIGS. 7B and 7C, the pattern part PP may include multiple groove patterns GP. As an example, the groove patterns GP may have a groove shape recessed from the top surface PG-F of the pattern glass PGa.

Each of the groove patterns GP may have a stripe shape extending in a direction parallel to the second folding axis FX2 (i.e., the first direction DR1). In other embodiments, each of the groove patterns GP may include multiple sub-groove patterns arranged to be spaced apart from each other in the first direction DR1. The groove patterns GP may be arranged to be spaced apart from each other in the second direction DR2.

Each of the groove patterns GP may have a trapezoidal shape in cross-section. A width (i.e., a first width) W1 of an upper end (a portion relatively adjacent to the top surface PG-F of the pattern glass PGa) of each of the groove patterns GP may be greater than a width (i.e., a second width) W2 of a lower end (a portion relatively adjacent to the bottom surface PG-B of the pattern glass PGa). A bottom surface of each of the groove patterns GP may have a round shape.

A size of each of the first and second widths W1 and W2 may be determined according to folding characteristics. Also, a size of each of the first and second widths W1 and W2 may be adjusted according to a depth d1 (hereinafter, referred to as a first depth) of each of the groove patterns GP. The groove patterns GP may be uniformly spaced a first interval P1a from each other in the second direction DR2.

Figure 8A:
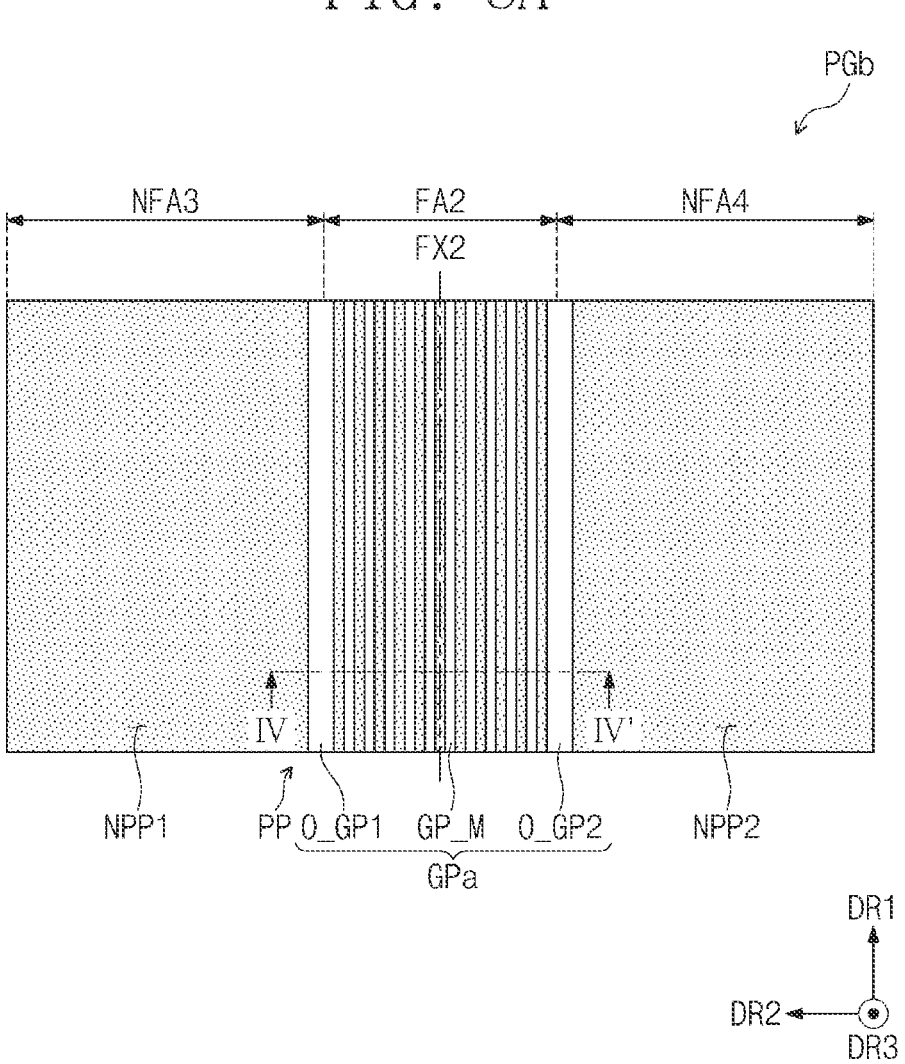
FIG. 8A is a schematic plan view of the pattern glass according to an embodiment.
Figure 8B:
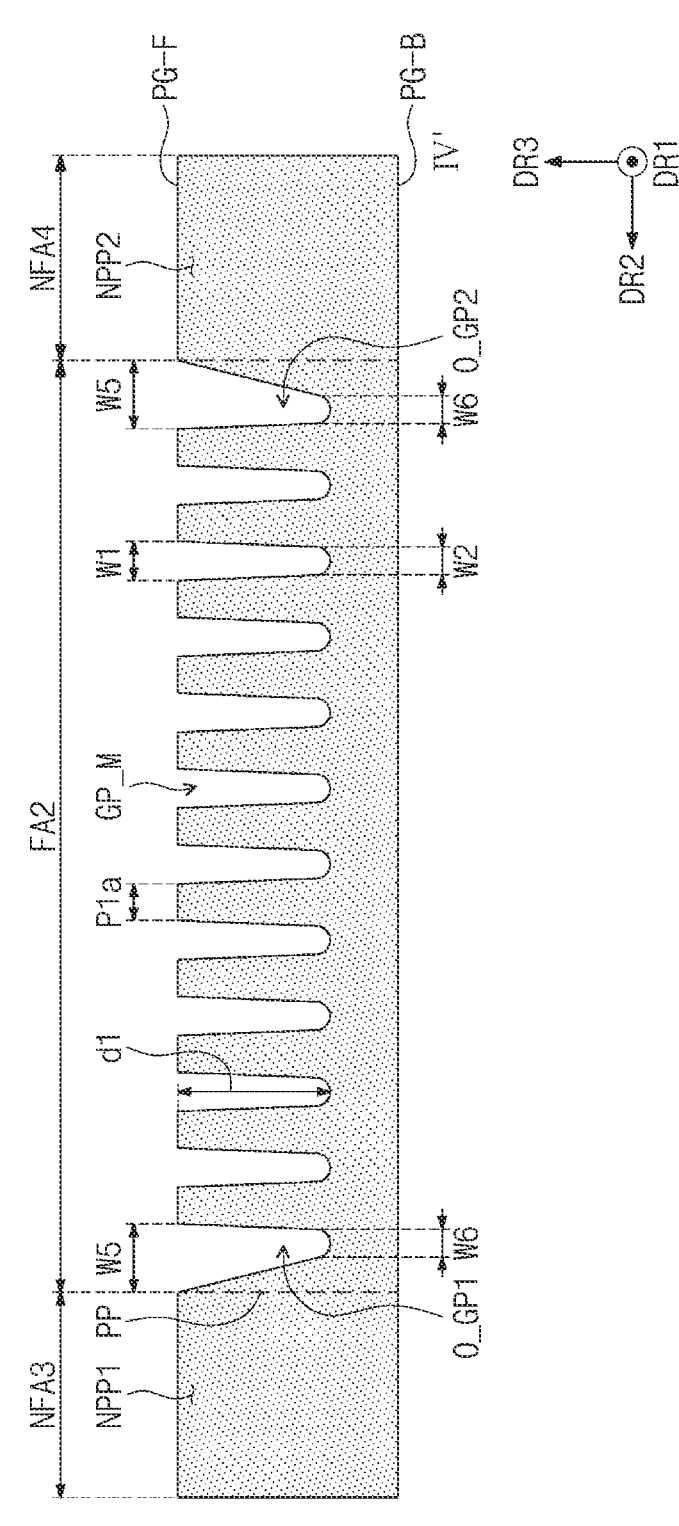
FIG. 8B is a schematic cross-sectional view taken along line IV-IV' of FIG. 8A.

FIG. 8A is a schematic plan view of the pattern glass according to an embodiment, and FIG. 8B is a schematic cross-sectional view taken along line IV-IV' of FIG. 8A.

Referring to FIGS. 8A and 8B, the pattern part PP may include multiple groove patterns GPa. As an example, the groove patterns GPa may include intermediate groove patterns GP_M and first and second outermost groove patterns O_GP1 and O_GP2. The intermediate groove patterns GP_M may be disposed between the first and second outermost groove patterns O_GP1 and O_GP2. Each of the intermediate groove patterns GP_M and the first and second outermost groove patterns O_GP1 and O_GP2 may have a groove shape recessed from a top surface PG-F of the pattern glass PGb. At least one of the first and second outermost groove patterns O_GP1 and O_GP2 may have a shape different from that of each of the intermediate groove patterns GP_M. The first and second outermost groove patterns O_GP1 and O_GP2 may have a symmetrical shape with respect to the second folding axis FX2.

Each of the intermediate groove patterns GP_M may have a width different from that of each of the first and second outermost groove patterns O_GP1 and O_GP2. A width (i.e., a first width) W1 of an upper end (a portion relatively adjacent to the top surface PG-F of the pattern glass PGb) of each of the intermediate groove patterns GP may be greater than a width (i.e., a second width) W2 of a lower end (a portion relatively adjacent to the bottom surface PG-B of the pattern glass PGb). A bottom surface of each of the intermediate groove patterns GP_M may have a round shape. A width (i.e., a fifth width) W5 of an upper end (a portion relatively adjacent to the top surface PG-F of the pattern glass PGb) of each of the first and second outermost groove patterns O_GP1 and O_GP2 may be greater than a width (i.e., a sixth width) W6 of a lower end (a portion relatively adjacent to the bottom surface PG-B of the pattern glass PGb). A bottom surface of each of the first and second outermost groove patterns O_GP1 and O_GP2 may have a round shape.

As an example, the fifth width W5 may be different from the first width W1. The fifth width W5 may be greater than the first width W1. For example, the fifth width W5 may be greater than or equal to twice the first width W1. The sixth width W6 may be greater than or equal to the second width W2.

Figure 9A:
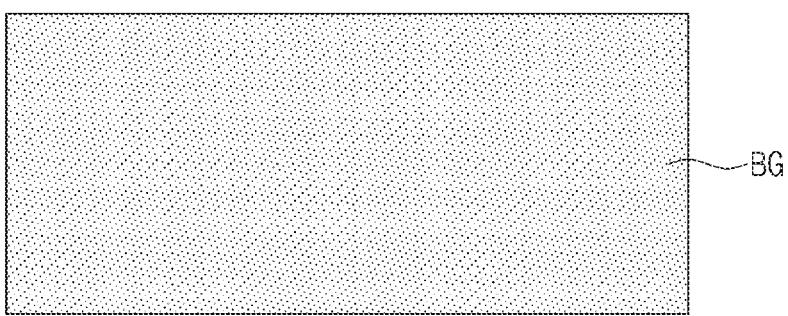
FIGS. 9A to 9C are schematic views illustrating a process of manufacturing a pattern glass according to an embodiment.
Figure 9B:
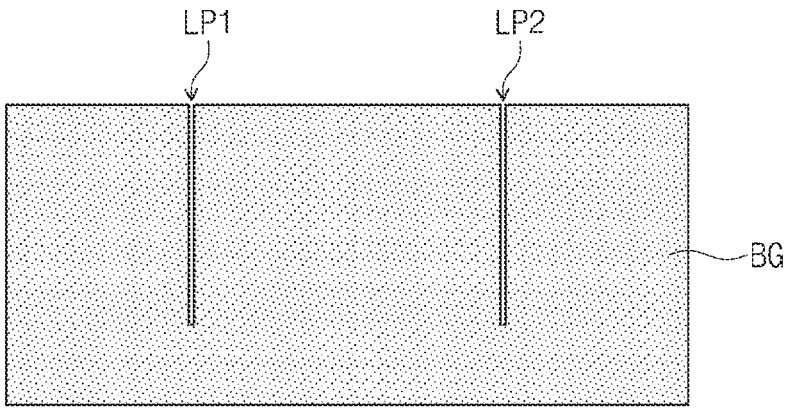
Figure 9C:
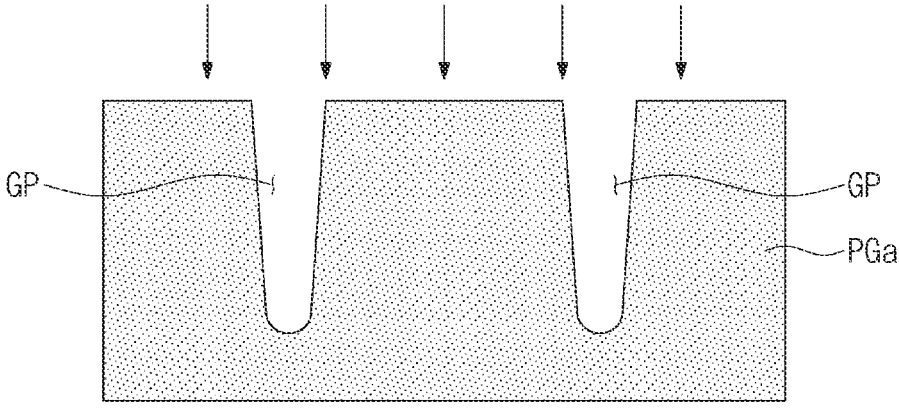
Figure 10A:
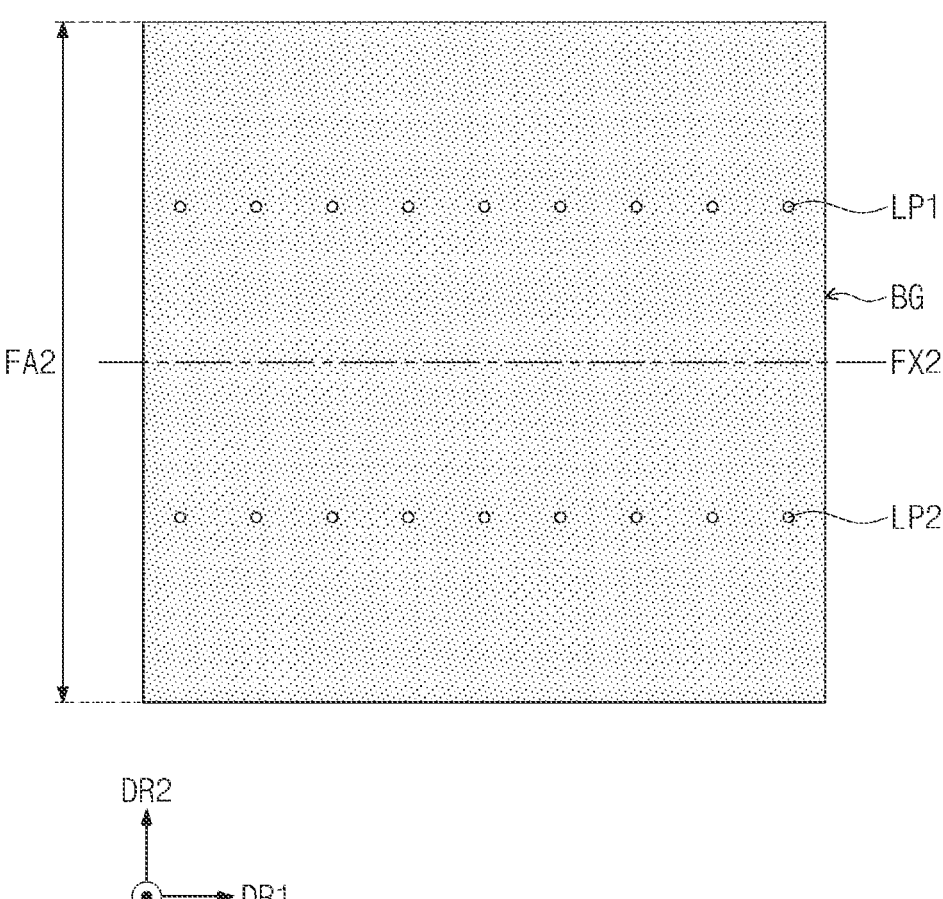
FIG. 10A is a schematic plan view of a base glass manufactured through the process of FIG. 9B.
Figure 10B:
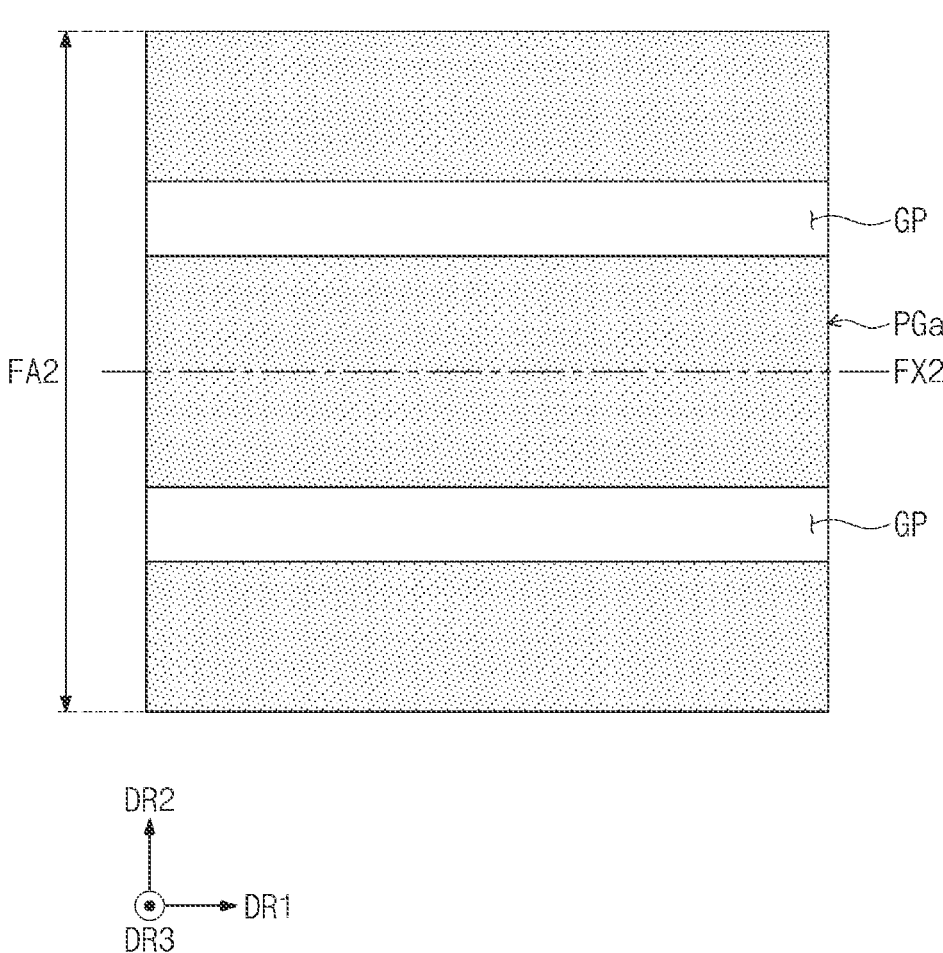
FIG. 10B is a schematic plan view of the pattern glass manufactured through the process of FIG. 9C.

FIGS. 9A to 9C are schematic views illustrating a process of manufacturing a pattern glass according to an embodiment. FIG. 10A is a schematic plan view of a base glass manufactured through the process of FIG. 9B, and FIG. 10B is a schematic plan view of the pattern glass manufactured through the process of FIG. 9C.

Referring to FIG. 9A, a base glass BG may be prepared for manufacturing a glass window WM (see FIG. 5B).

Referring to FIGS. 9B and 10A, laser patterns may be formed by irradiating microwave pulse laser to a surface of the base glass BG corresponding to a folding area FA2. Although two laser patterns (i.e., first and second laser patterns LP1 and LP2) are illustrated in FIGS. 9B and 10A, the laser patterns may be provided to correspond to positions at which the groove patterns GP of FIG. 5B are to be formed, respectively.

The first laser patterns LP1 may be arranged in a first direction DR1 parallel to a second folding axis FX2. The second laser patterns LP2 may be spaced apart from the first laser patterns LP1 in the second direction DR2 and may be arranged in the first direction DR1. Each of the first and second laser patterns LP1 and LP2 may have a circular shape on a plane.

Each of the first and second laser patterns LP1 and LP2 may have a shape recessed from a surface of the base glass BG. As an example, each of the first and second laser patterns LP1 and LP2 may be a cylindrical groove.

The microwave pulse laser may be picosecond laser or femtosecond laser. The picosecond laser refers to laser having a wavelength period in a picosecond unit, and the femtosecond laser refers to a laser having a wavelength period in a femtosecond unit. In the forming of the first and second laser patterns LP1 and LP2, since the microwave pulse laser may be used, each of the first and second laser patterns LP1 and LP2 may be formed in a deep and narrow groove shape. In case that the microwave pulse laser is used, an impact applied to the base glass BG may be less even in case that the laser process is performed, and thus, cracks may not occur around the first and second laser patterns LP1 and LP2.

Thereafter, referring to FIGS. 9C and 10B, the base glass BG on which the first and second laser patterns LP1 and LP2 are formed may be etched to form the pattern glass PGa provided with the groove patterns GP. Each of the groove patterns GP may have a stripe shape extending in the first direction DR1. Also, the groove patterns GP may be spaced apart from each other in the second direction DR2.

An etchant such as NaOH or KOH may be used in the etching process of etching the base glass BG. In case that the etching process is performed using the etchant, each of the first and second laser patterns LP1 and LP2 of the base glass BG may be anisotropically etched. As the base glass BG may be etched around the first and second laser patterns LP1 and LP2, the stripe-shaped groove patterns GP may be formed.

In case that the etching process is completed, a process of strengthening the pattern glass PGa may be performed. The pattern glass PGa may increase in compressive strength by the strengthening process.

FIG. 9B illustrates a structure in which multiple laser patterns are formed in a row to form each of the groove patterns GP as an example, but the disclosure is not limited thereto. The laser patterns may be provided in multiple rows according to a width of each groove pattern GP.

Figure 11A:
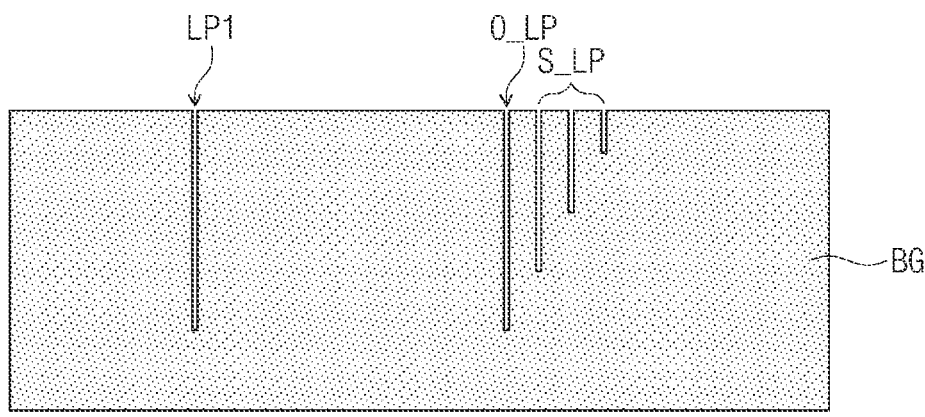
FIGS. 11A and 11B are schematic views illustrating a process of manufacturing the pattern glass according to an embodiment.
Figure 11B:
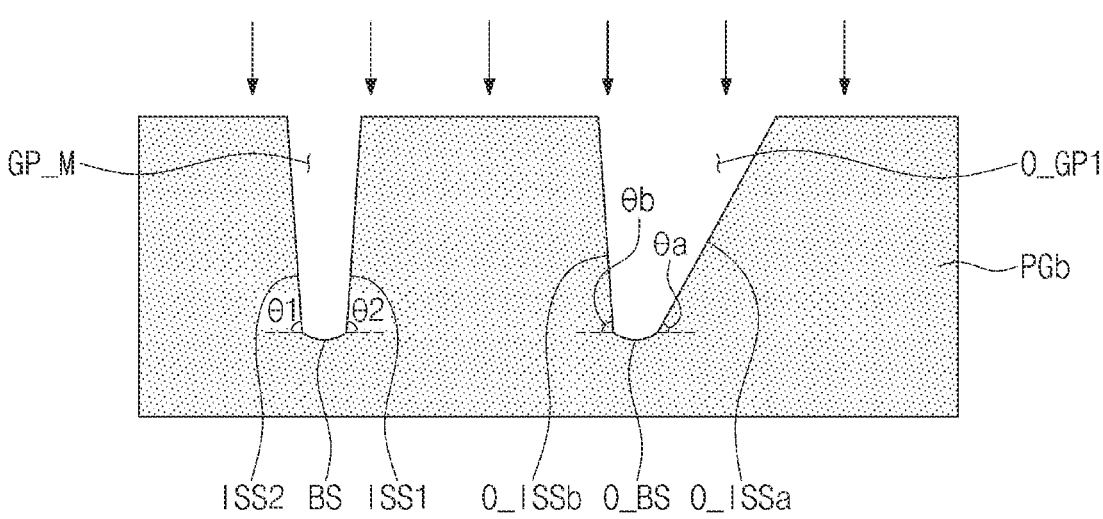
Figure 12A:
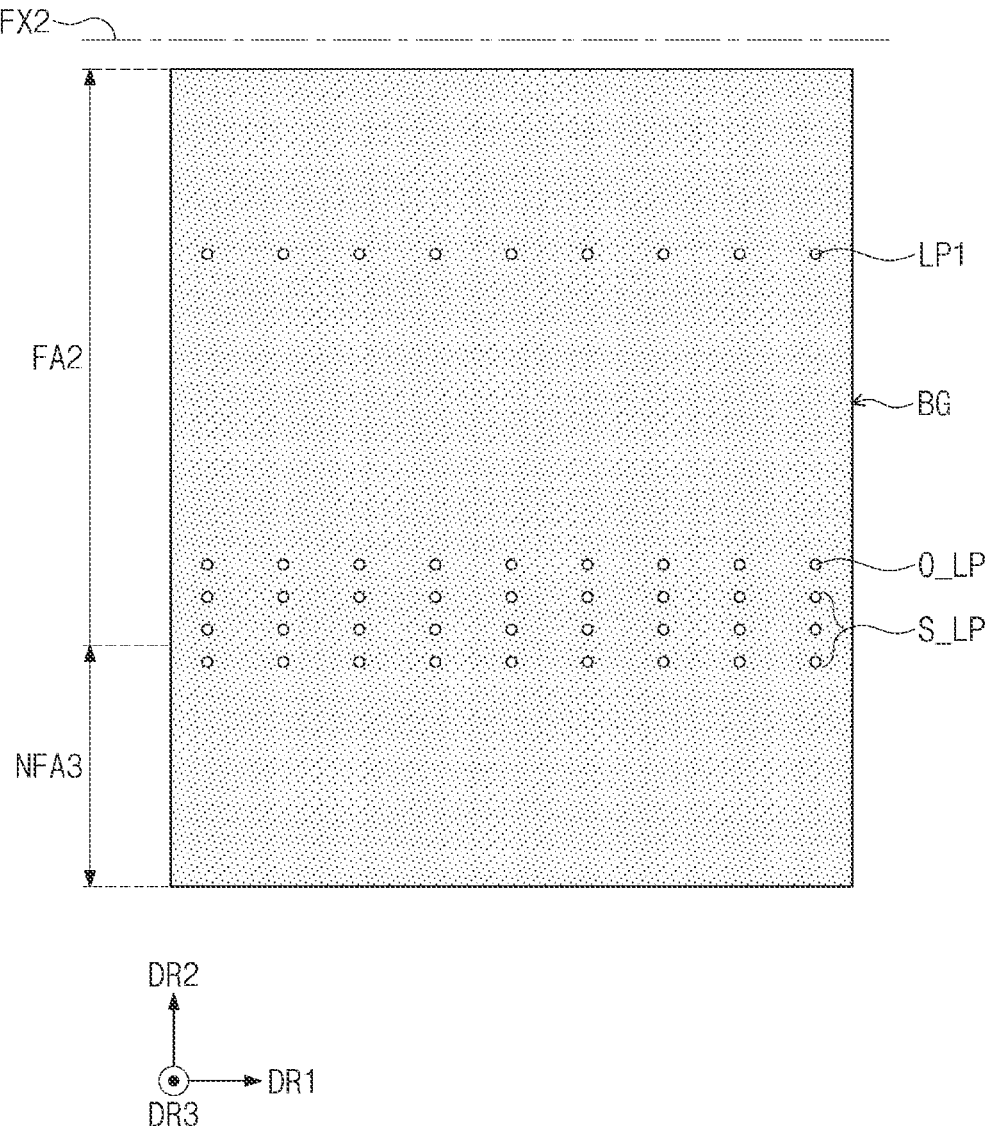
FIG. 12A is a schematic plan view of the base glass manufactured through the process of FIG. 11A.
Figure 12B:
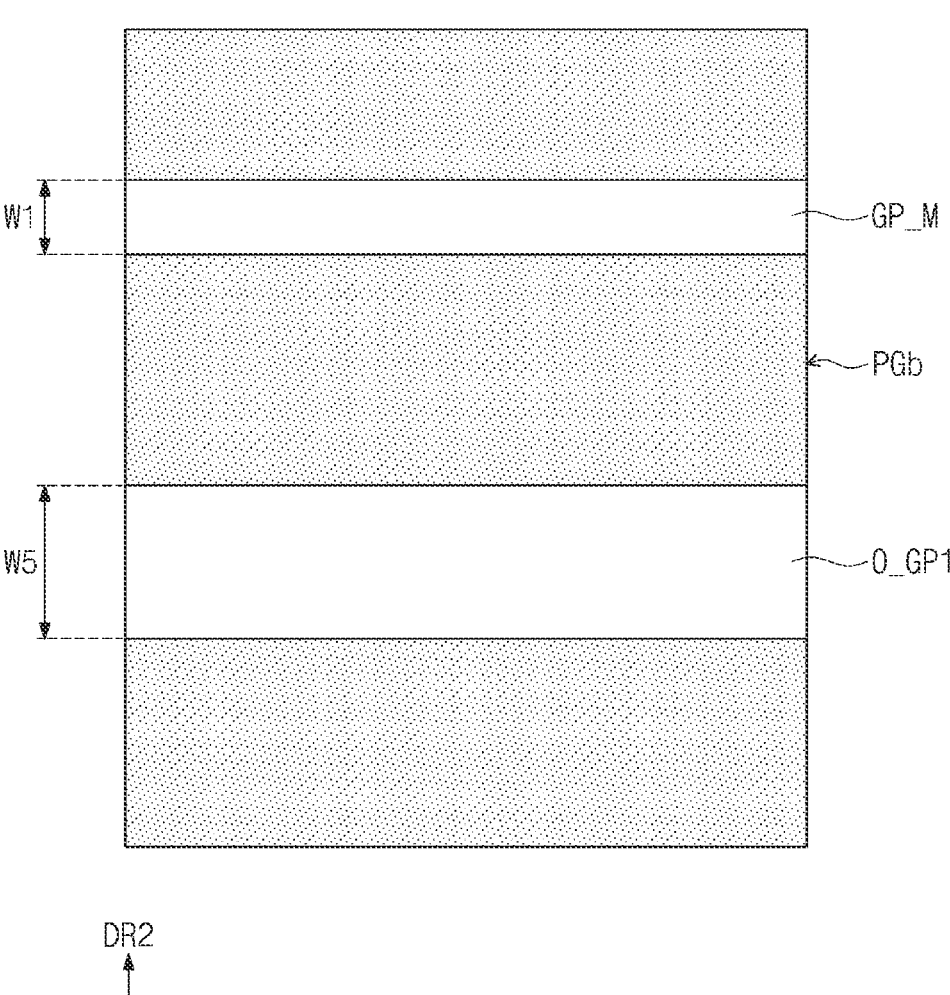
FIG. 12B is a schematic plan view of the pattern glass manufactured through the process of FIG. 11B.

FIGS. 11A and 11B are schematic views illustrating a process of manufacturing the pattern glass according to an embodiment. FIG. 12A is a schematic plan view of the base glass manufactured through the process of FIG. 11A, and FIG. 12B is a schematic plan view of the pattern glass manufactured through the process of FIG. 11B.

Referring to FIGS. 11A and 12A, first laser patterns LP1 and second laser patterns O_LP may be formed by irradiating the microwave pulse laser to a surface of the base glass BG corresponding to the folding area FA2. In case that the second laser patterns O_LP are the outermost laser patterns adjacent to the non-pattern part NPP1 or NPP2 (see FIG. 5B), sub-laser patterns S_LP may be further formed to be adjacent to the second laser patterns O_LP.

The sub-laser patterns SLP may have different depths. For example, the depth of each of the sub-laser patterns S_LP may gradually decrease as a distance from the second folding axis FX2 increases. The depth of each of the sub-laser patterns S_LP may be adjusted using an irradiation time or intensity of the microwave pulse laser.

Some of the sub-laser patterns S_LP may overlap the folding area FA2, and some of the sub-laser patterns S_LP may overlap the first non-folding area NFA3.

Thereafter, referring to FIGS. 11B and 12B, the base glass BG on which the first and second laser patterns LP1 and O_LP and the sub-laser patterns S_LP may be formed may be etched to form a pattern glass PGb provided with an intermediate groove pattern GP_M and a first outmost groove pattern O_GP1. The first outermost groove pattern O_GP1 may have a width greater than that of the intermediate groove pattern GP_M.

The pattern glass PGb may include a bottom surface BS and first and second inner surfaces ISS1 and ISS2, which define the intermediate groove pattern GP_M. The pattern glass PGb may include an outermost bottom surface O_BS and first and second outermost inner surfaces O_ISSa and O_ISSb, which define a first outermost groove pattern O_GP1. The first and second inner surfaces ISS1 and ISS2 have a symmetrical shape with respect to the bottom surface BS. For example, a first inclination angle θ1 of the first inner surface ISS1 with respect to the bottom surface BS may be the same as a second inclination angle θ2 of the second inner surface ISS2 with respect to the floor surface BS.

The first and second outermost inner surfaces O_ISSa and O_ISSb have an asymmetric structure based on the outermost bottom surface O_BS. For example, a third inclination angle θa of the first outermost inner surface O_ISSa with respect to the outermost bottom surface O_BS may be less than a fourth inclination angle θb of the second outermost inner surface O_ISSb with respect to the outermost floor surface O_BS. The third inclination angle θa of the first outermost inner surface O_ISSa may be about 40° to about 70°, and the fourth inclination angle θb of the second outermost inner surface O_ISSb may be about 70° to about 90°. However, the sizes of the third and fourth inclination angles θa and θb are not particularly limited. As an example, the fourth inclination angle θb may be the same as each of the first inclination angle θ1 and the second inclination angle θ2.

The first outermost inner surface O_ISSa may overlap the first non-folding area NFA3. Due to the first outermost inner surface O_ISSa, a thickness of the pattern glass PGb in the first non-pattern part NPP1 adjacent to the pattern part PP may gradually increase. Thus, stress applied to the pattern glass PGb at a boundary between the pattern part PP and the first non-pattern part NPP1 may be reduced.

FIGS. 13A to 13K are schematic views illustrating a process of manufacturing a glass window according to an embodiment. FIGS. 14A to 14T are schematic views illustrating a process of manufacturing a glass window according to an embodiment.

Figure 13A:
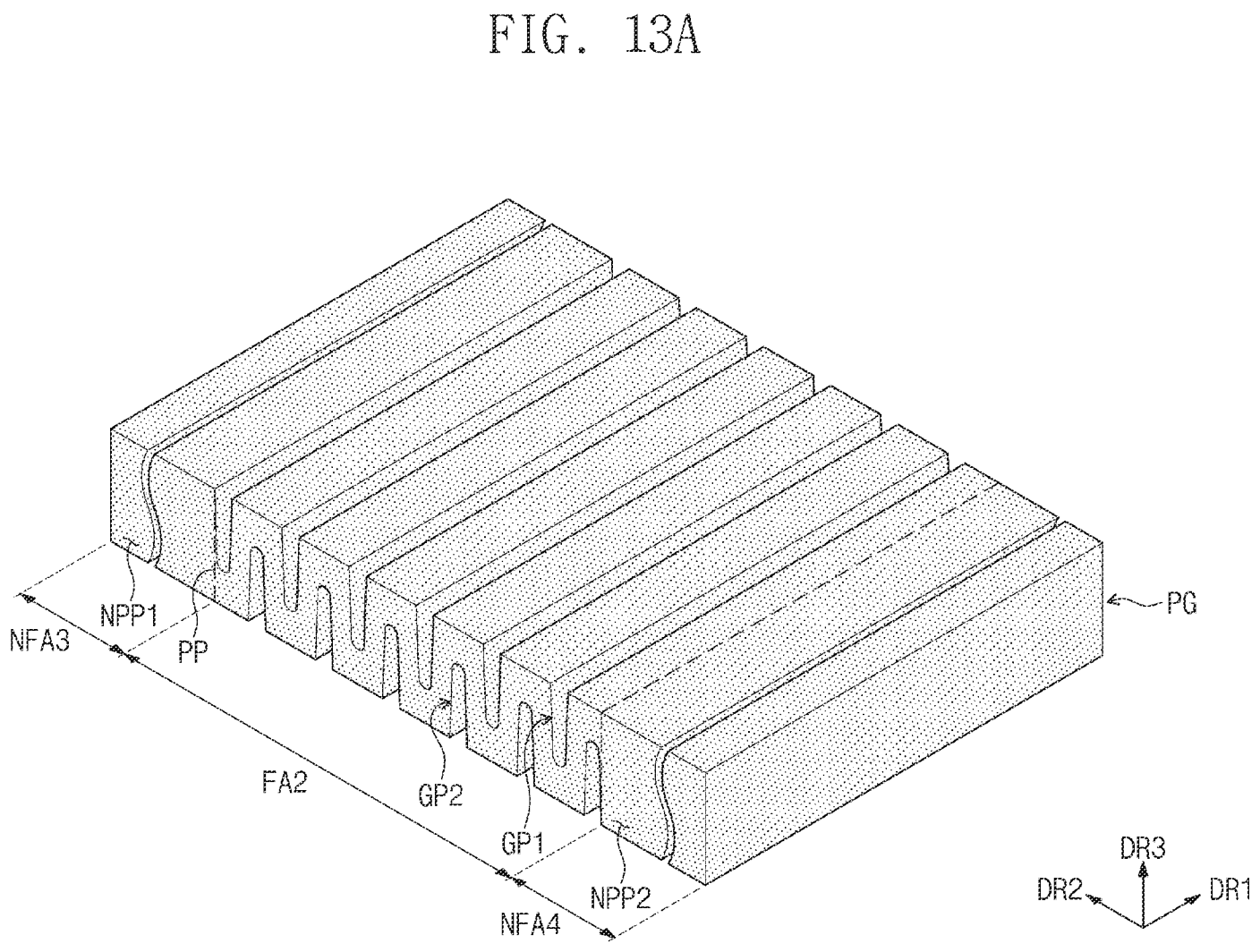
Figure 13B:
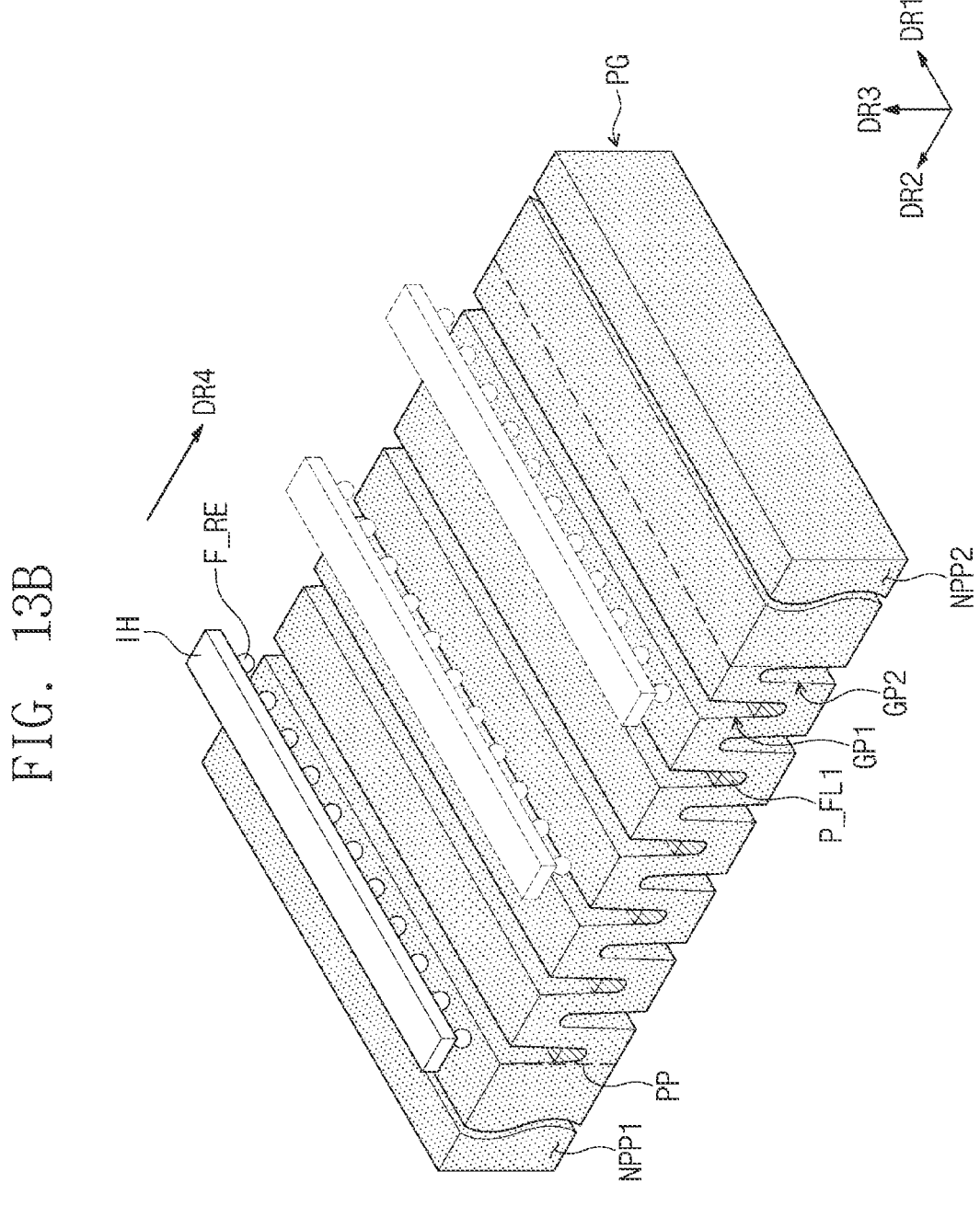
Figure 13C:
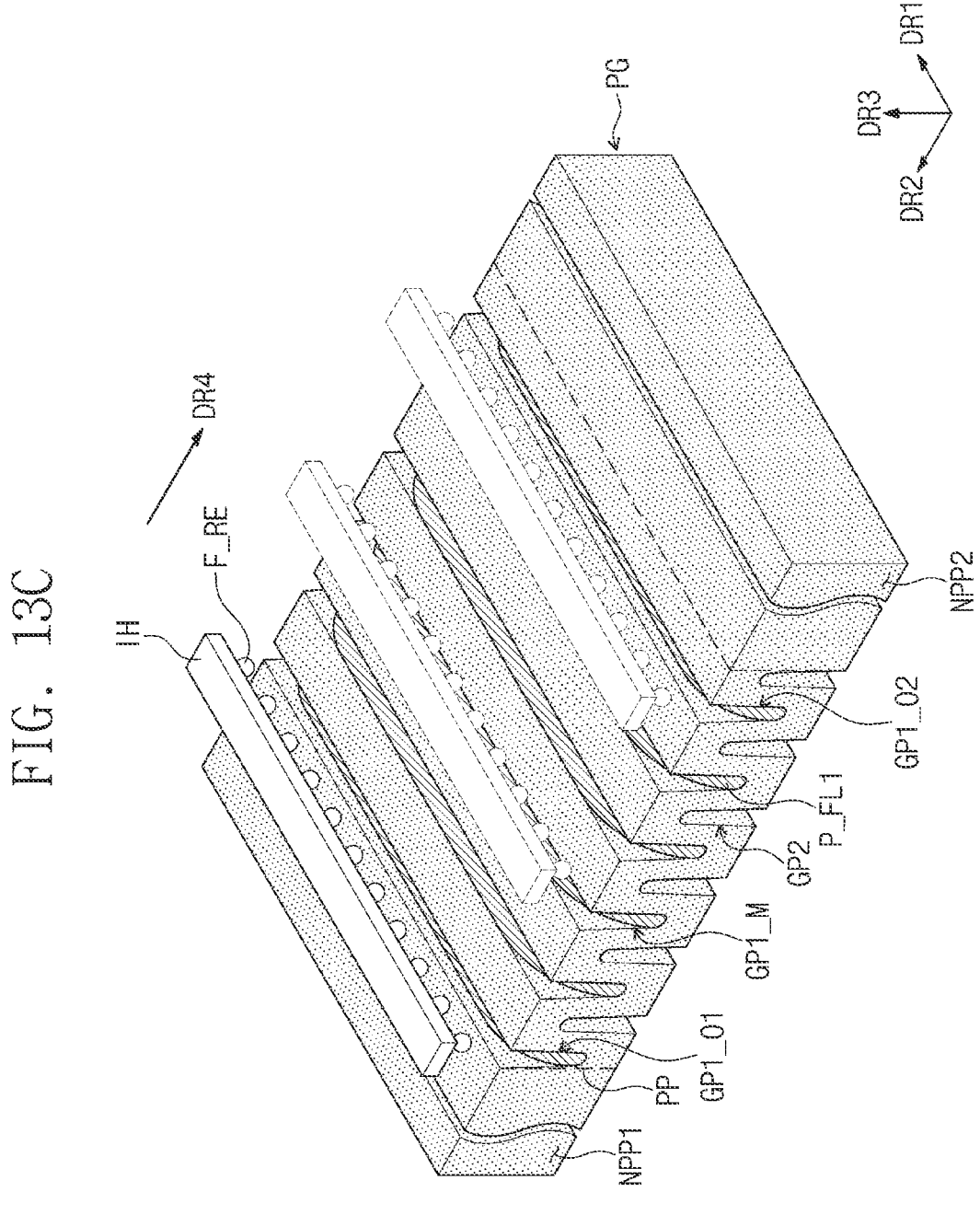
Figure 13D:
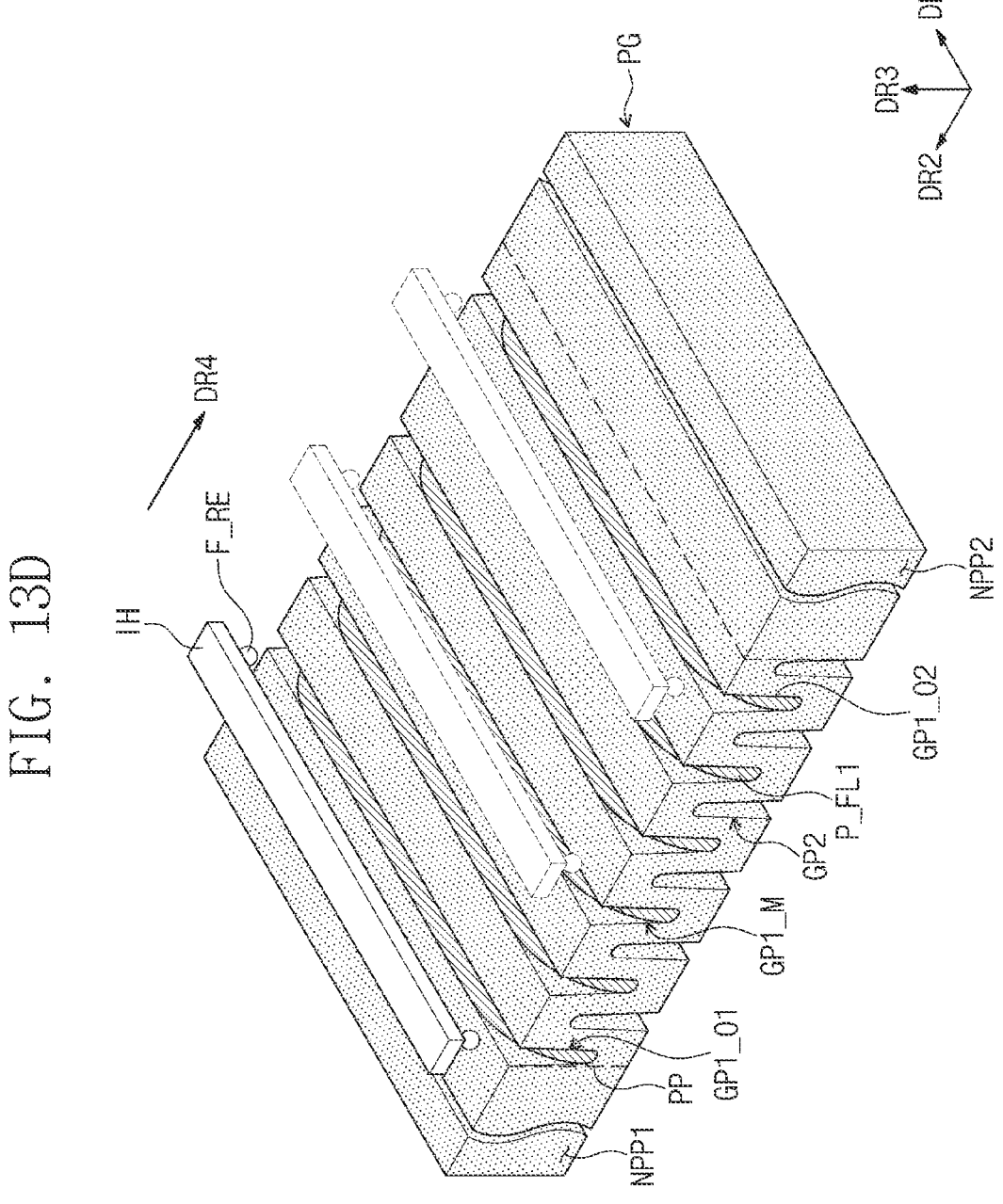
Figure 13E:
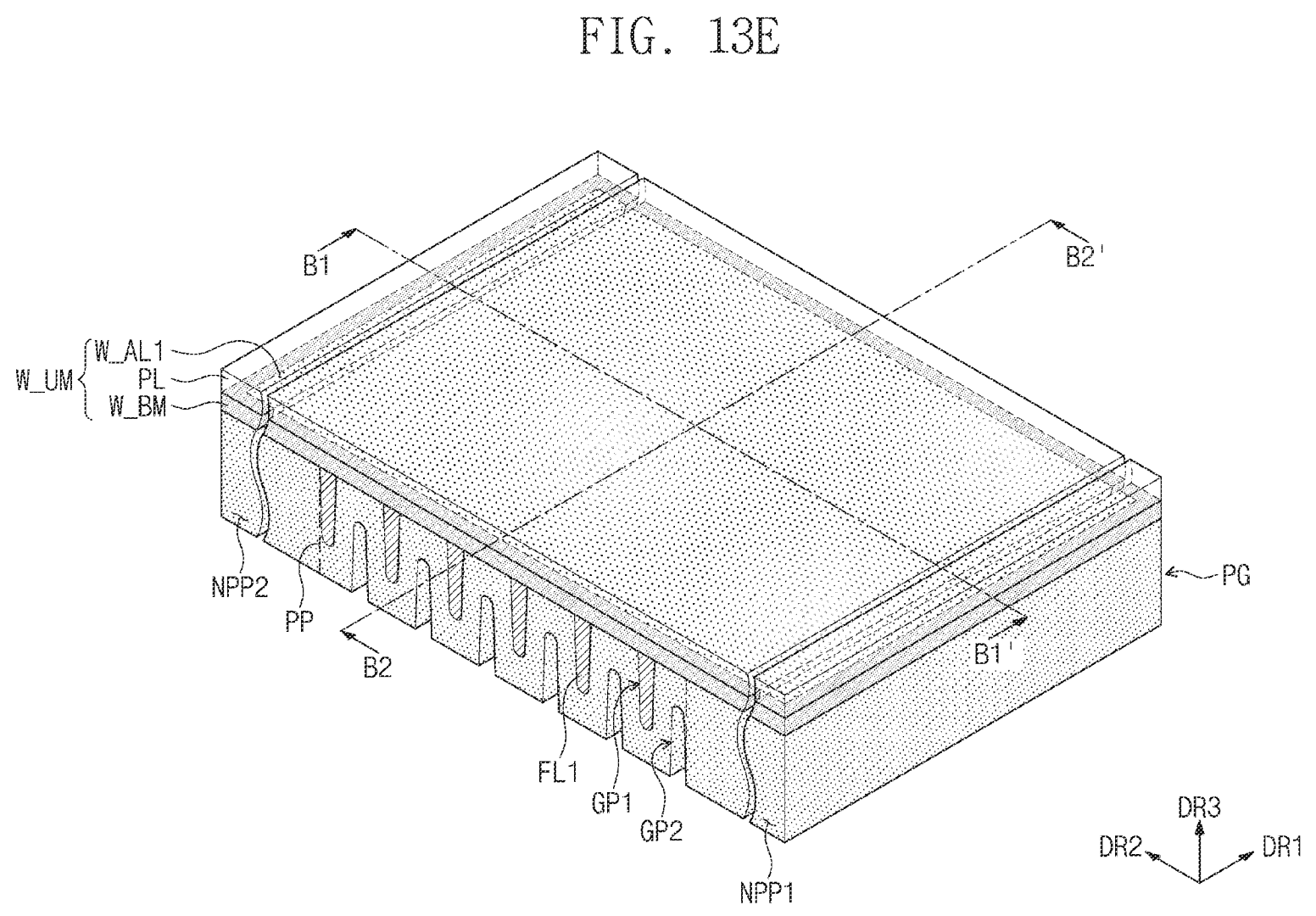
Figure 13F:
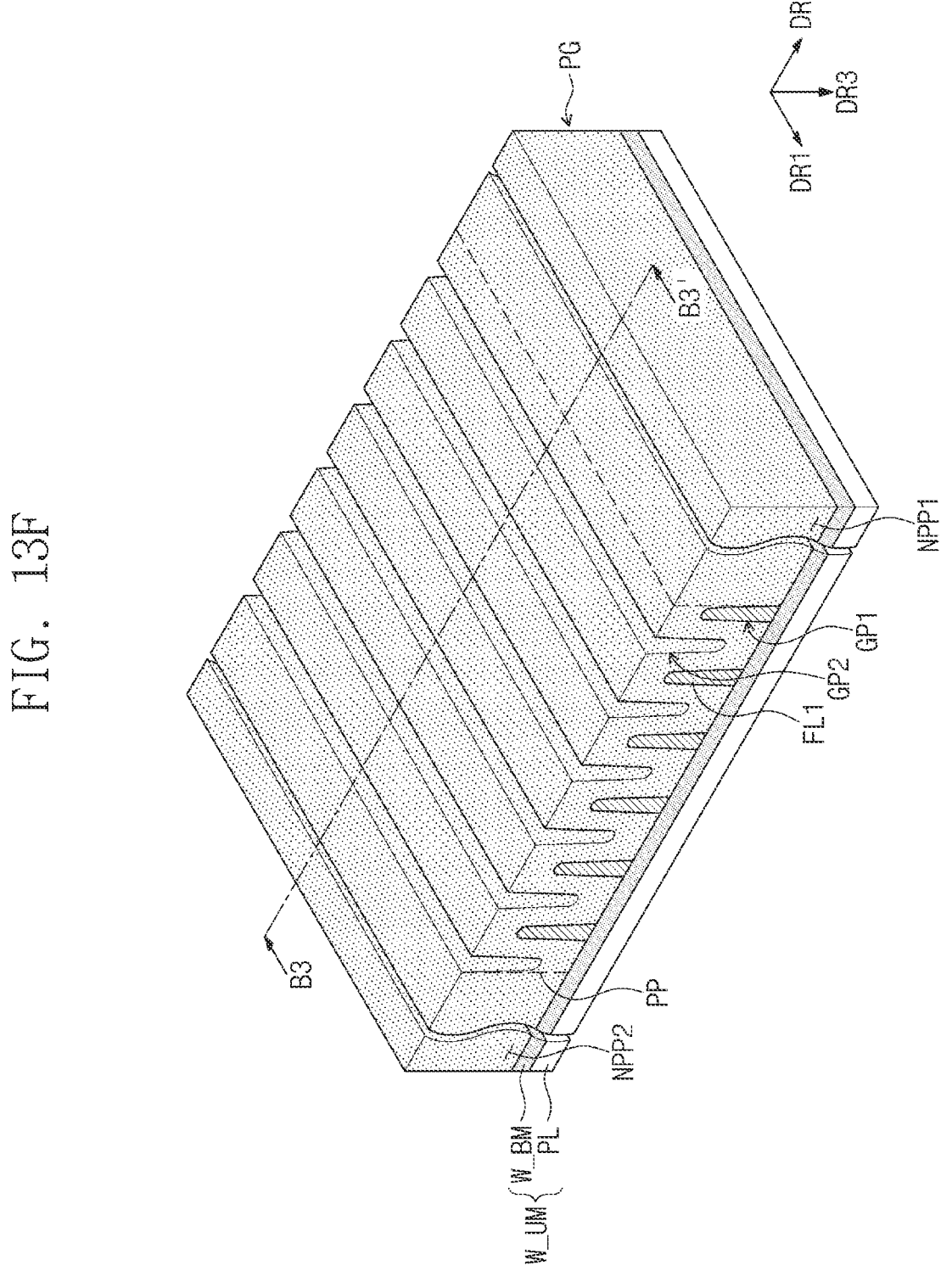
Figure 13G:
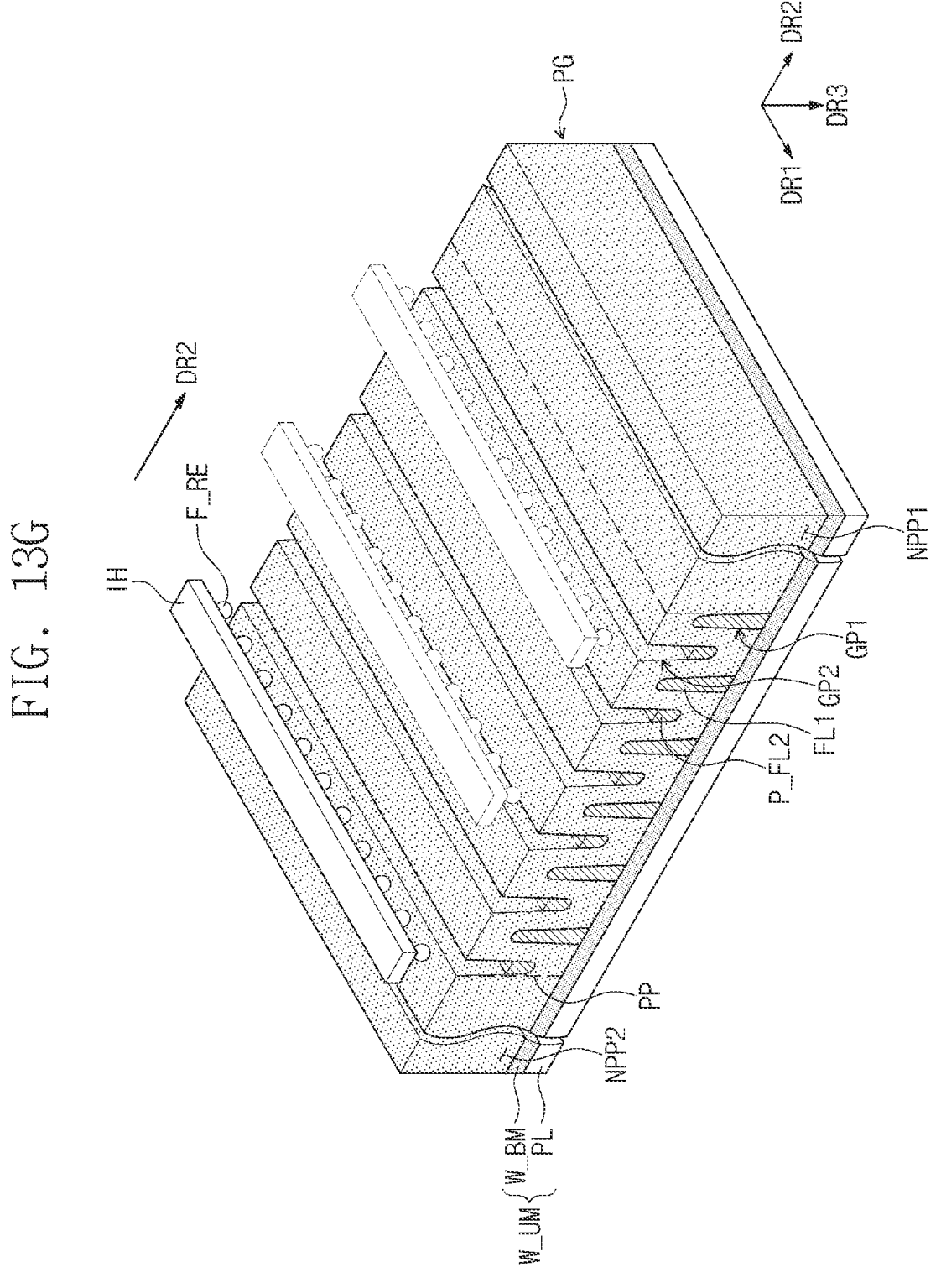
Figure 13H:
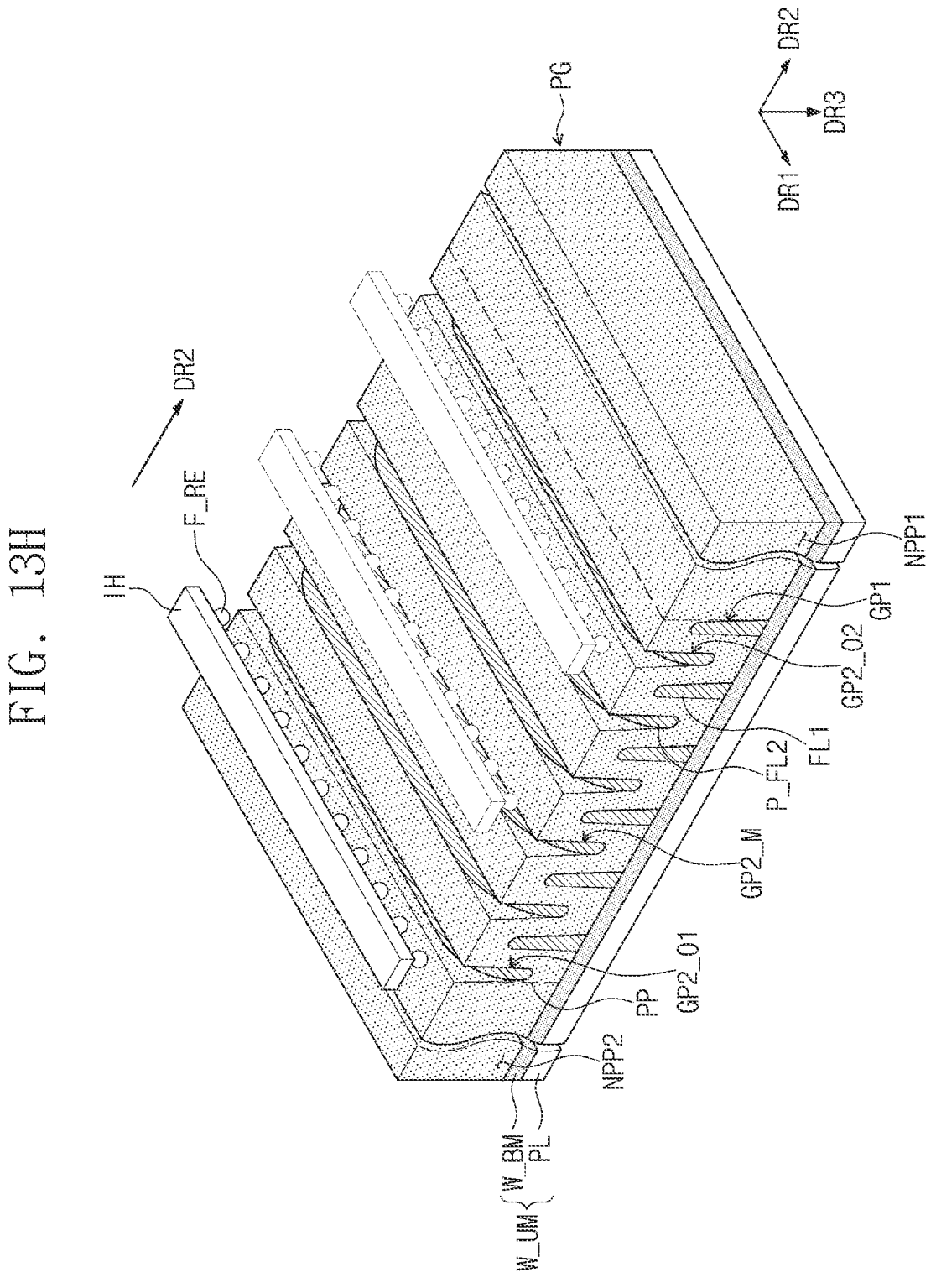
Figure 13I:
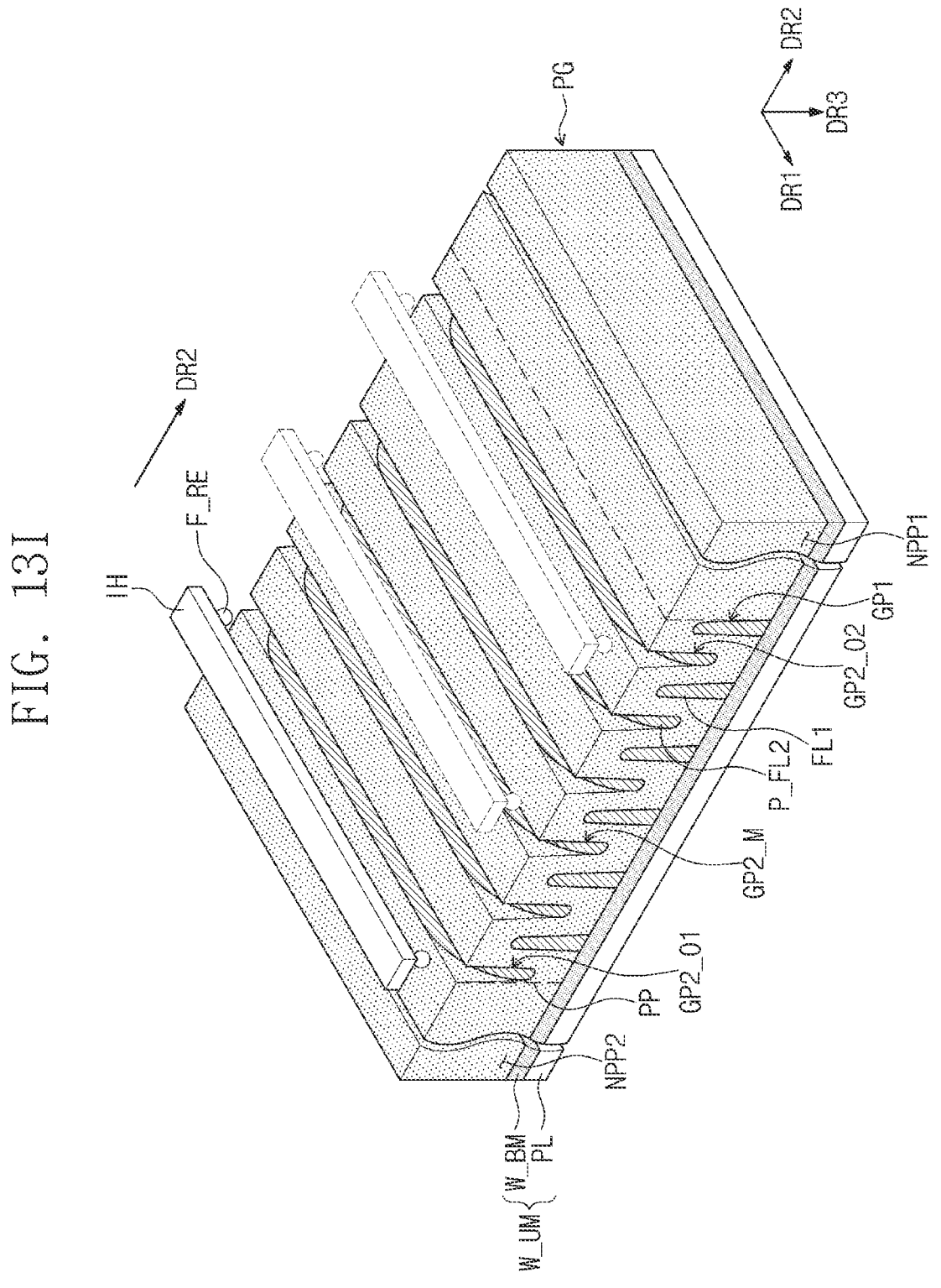
Figure 13J:
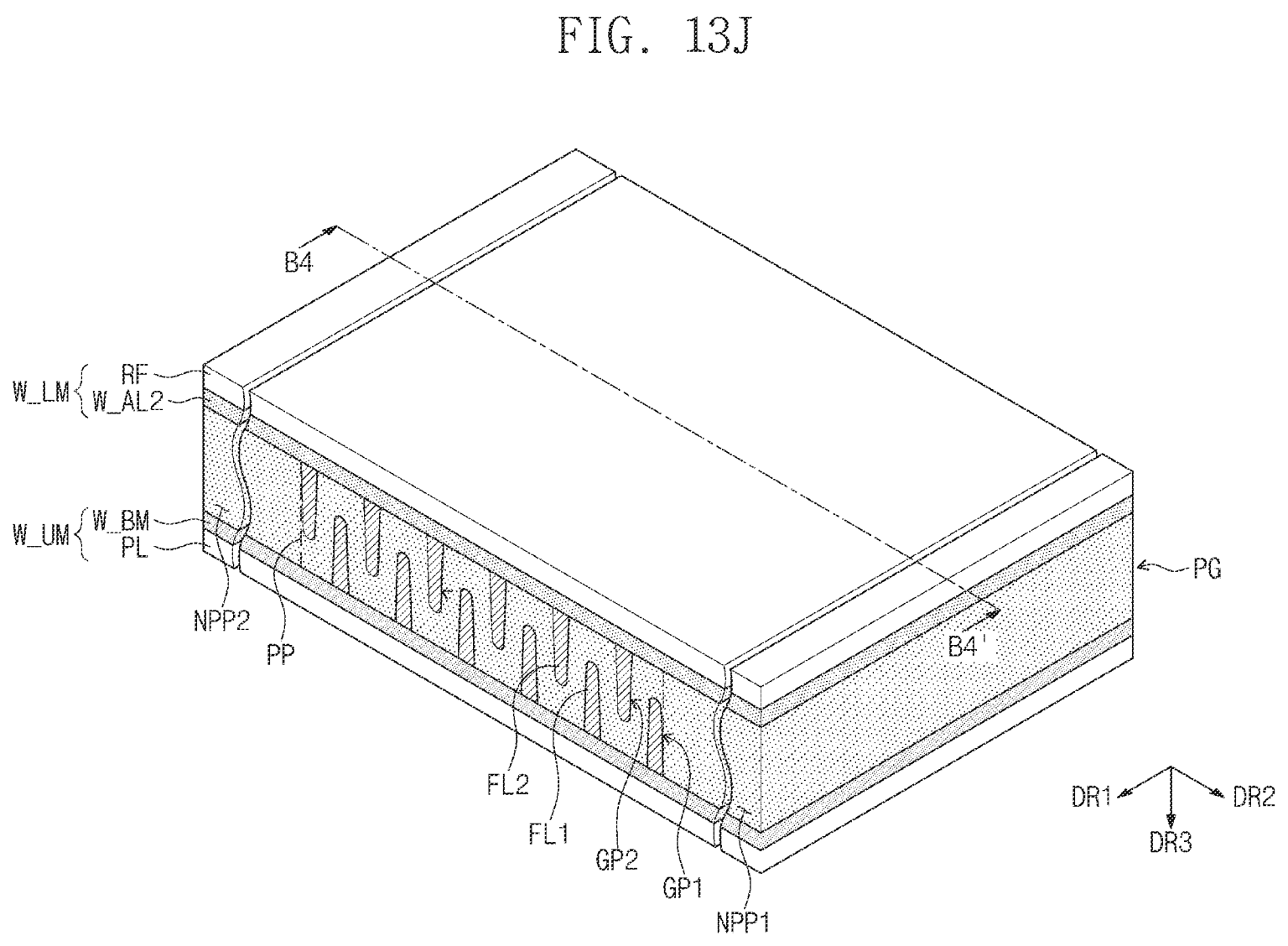
Figure 13K:
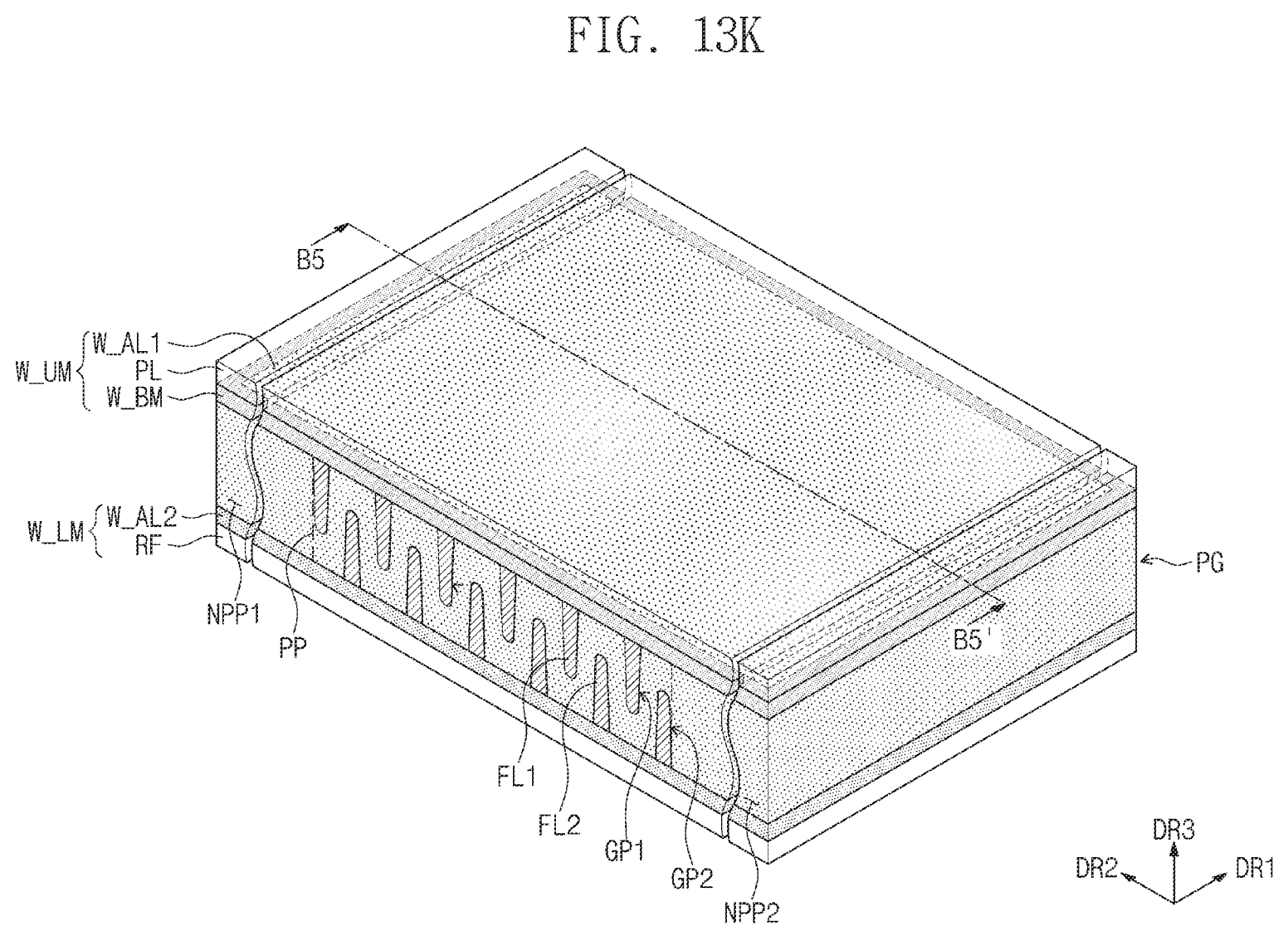
Figure 14A:
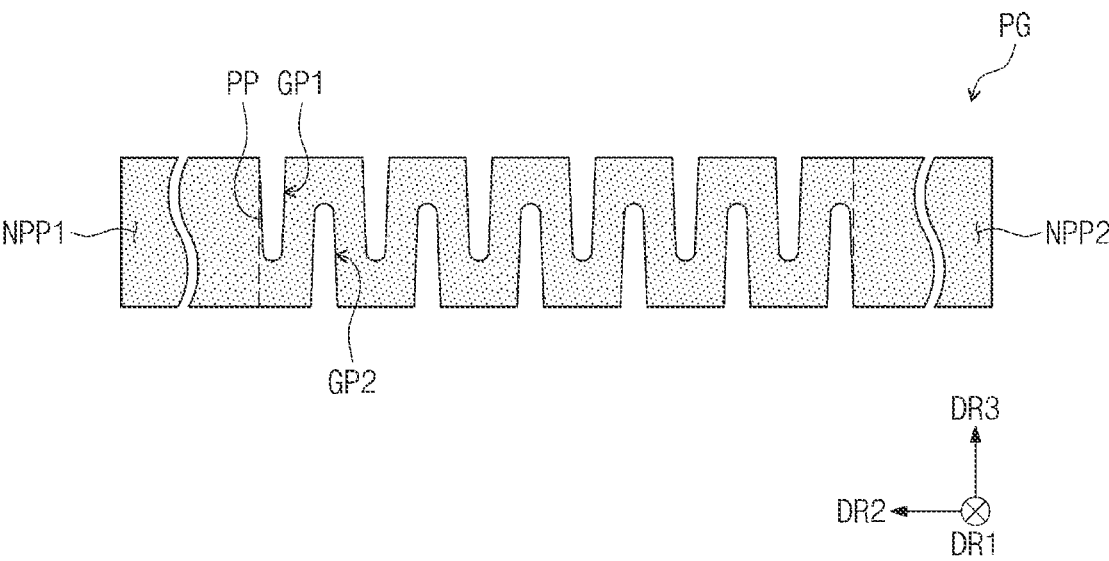
FIGS. 14A to 14T are schematic views illustrating a process of manufacturing a glass window according to an embodiment.
Figure 14B:
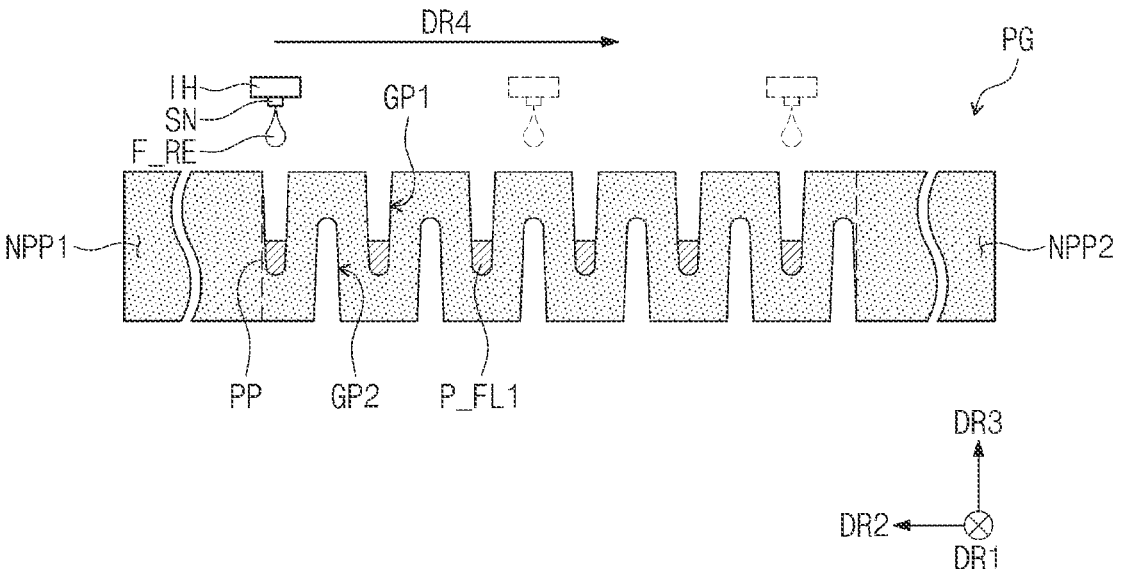
Figure 14C:
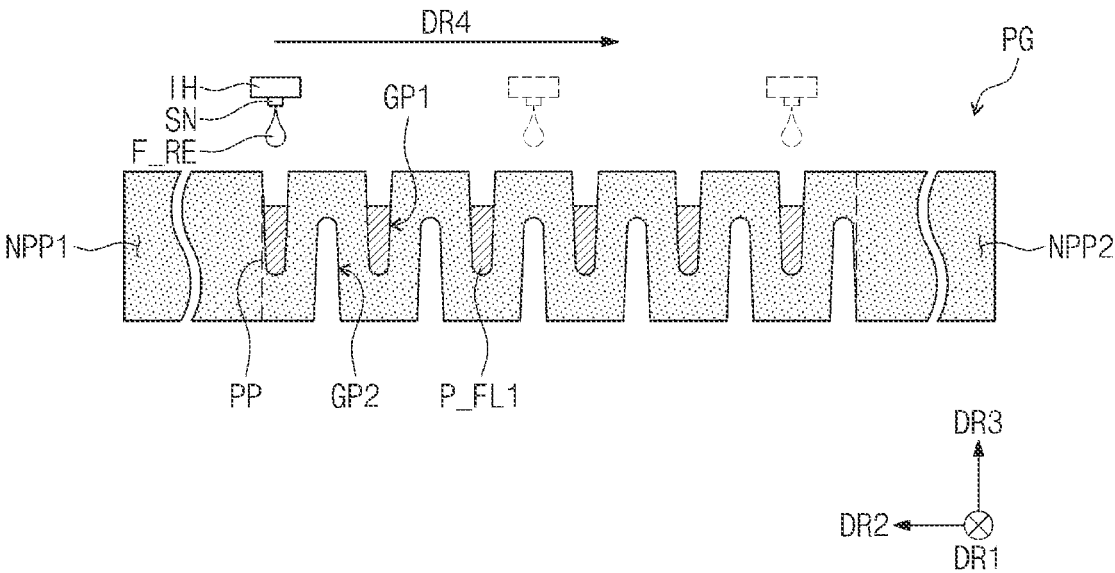
Figure 14D:
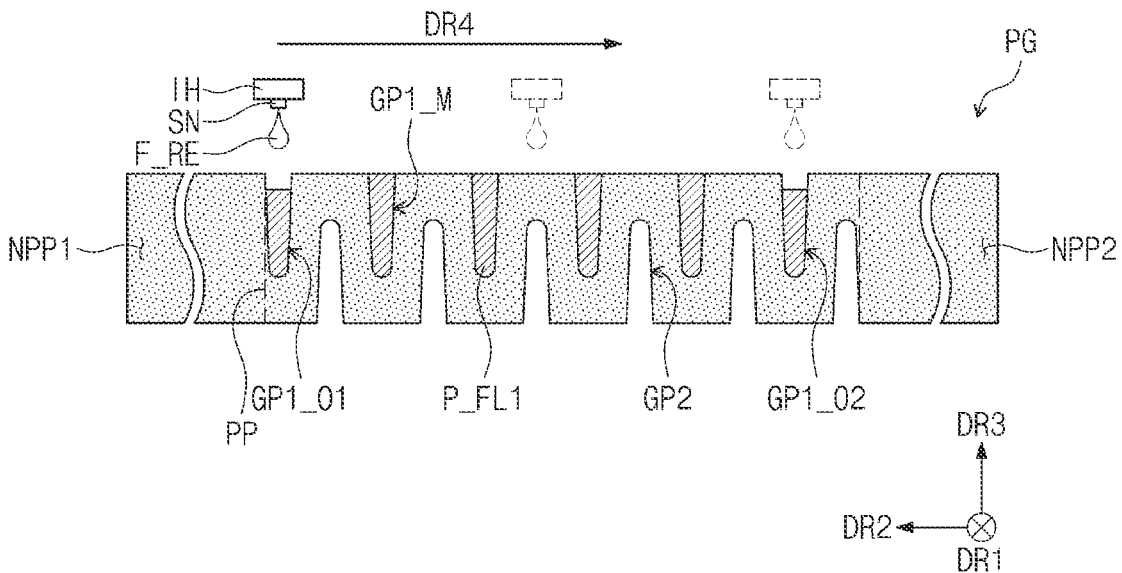
Figure 14E:
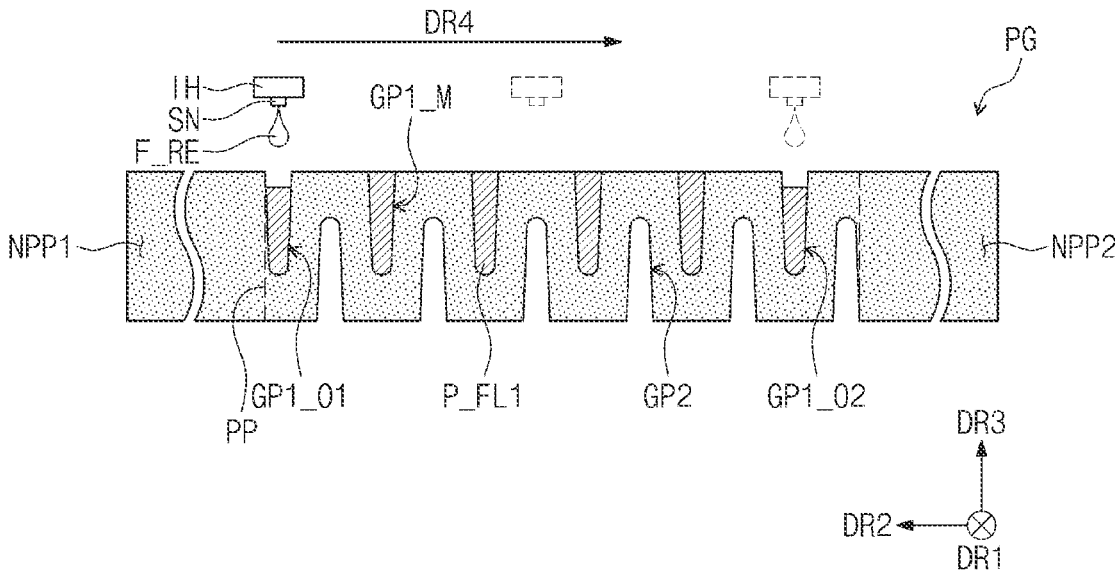
Figure 14F:
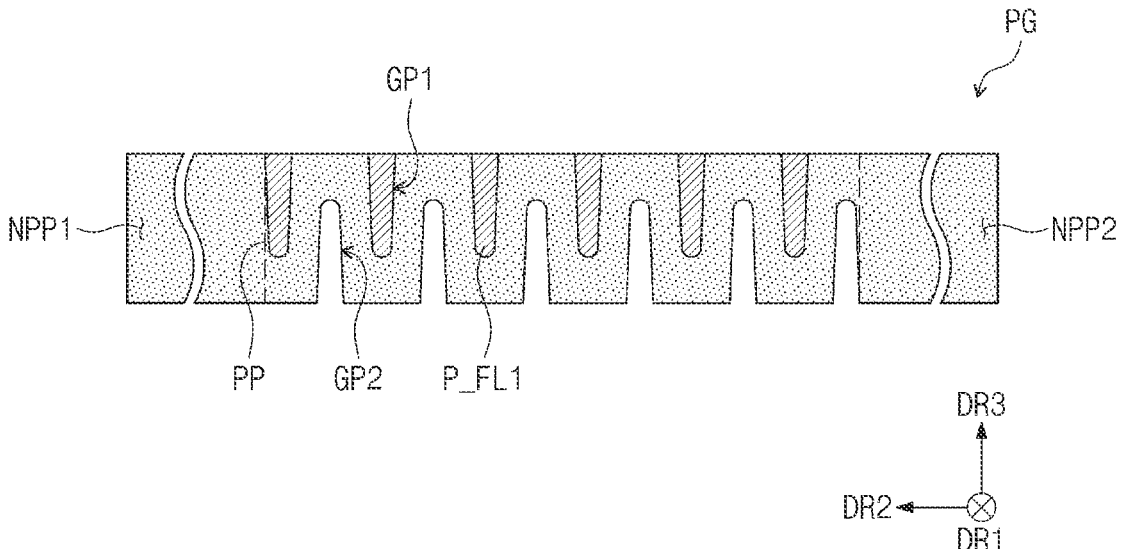
Figure 14G:
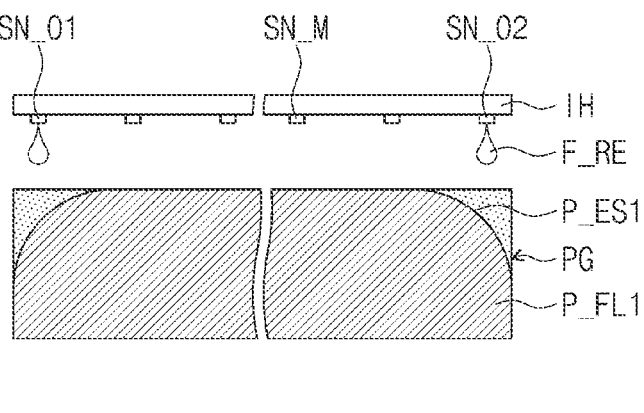
Figure 14G:
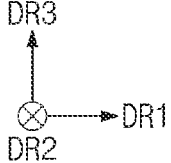
Figure 14H:
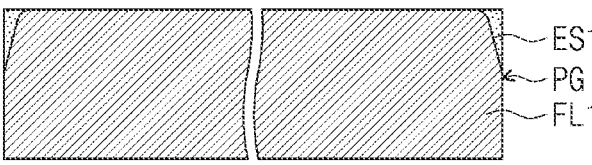
Figure 14H:
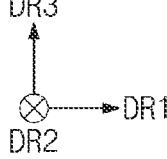
Figure 14I:
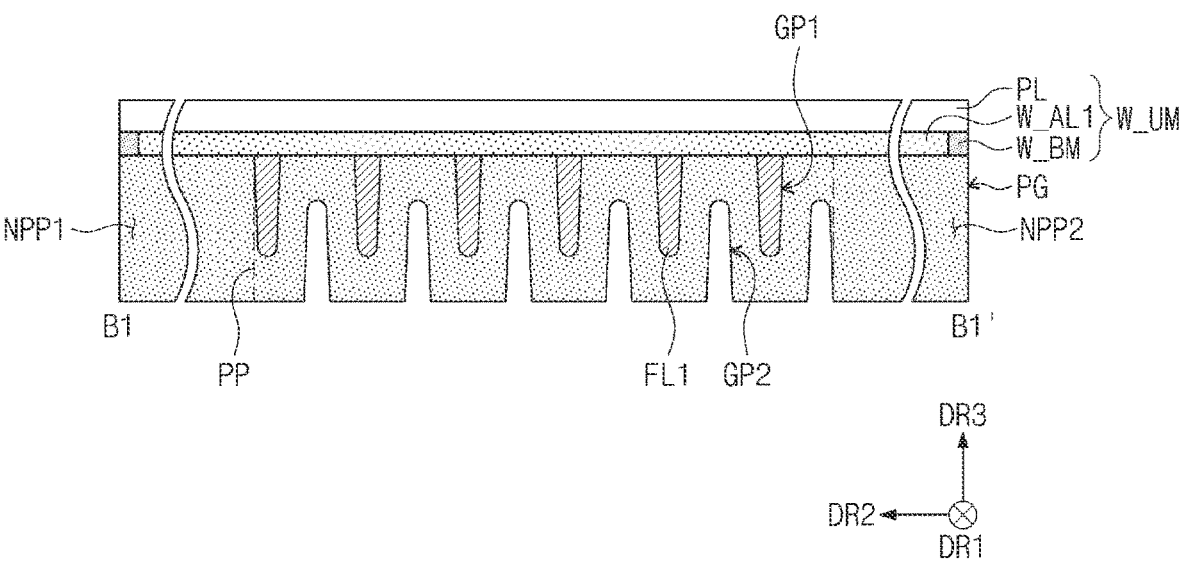
Figure 14J:
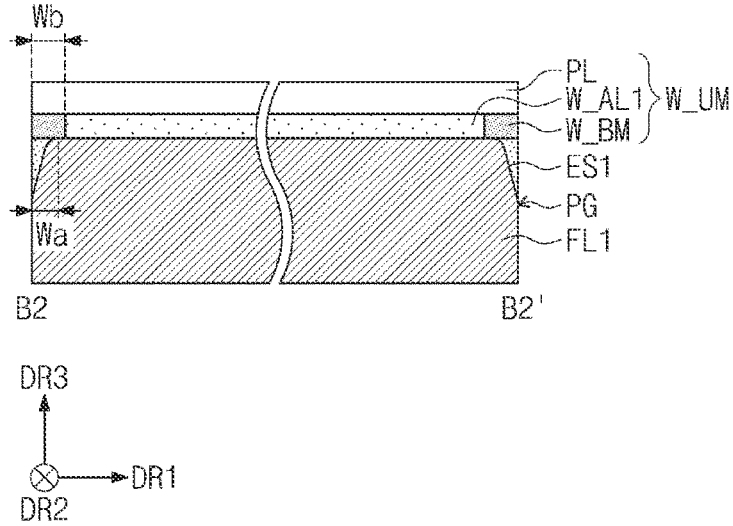
Figure 14K:
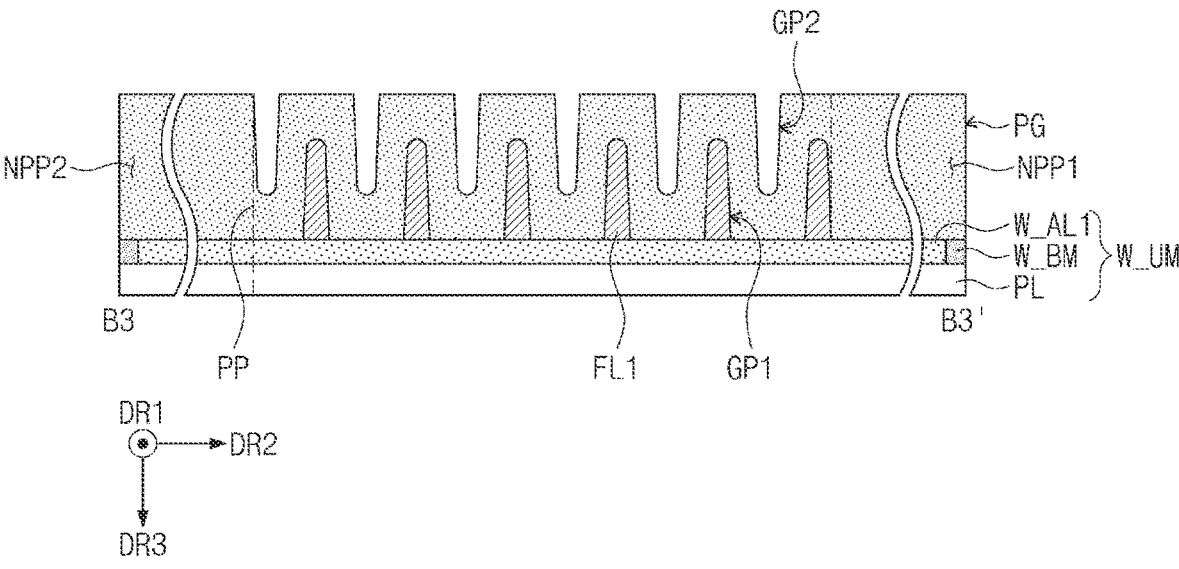
Figure 14L:
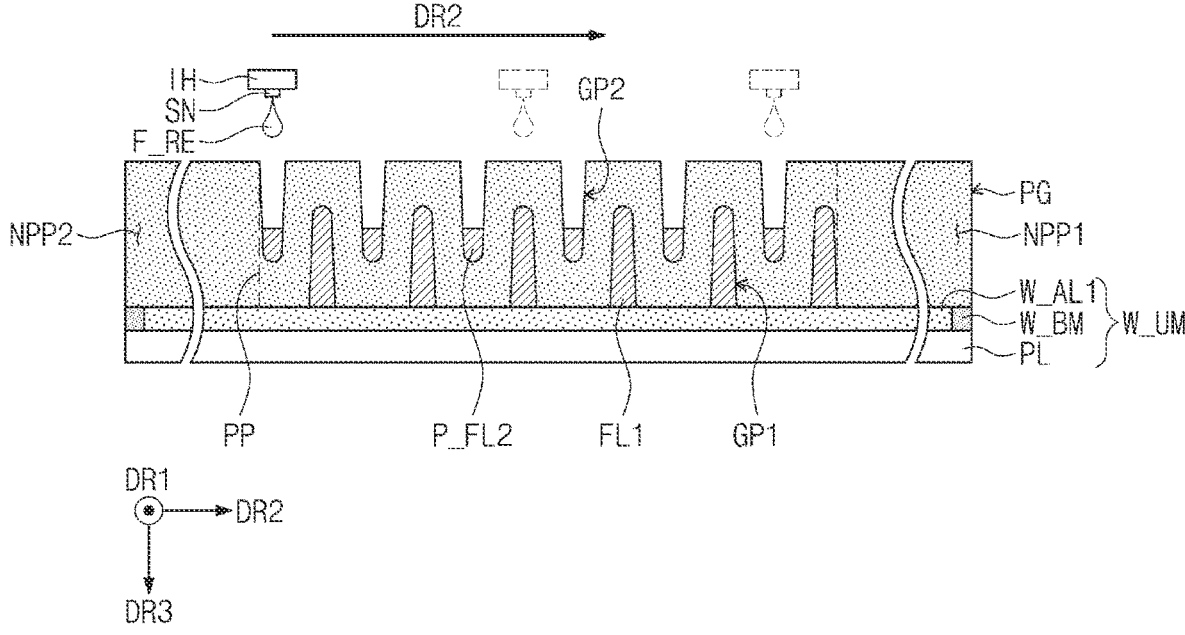
Figure 14M:
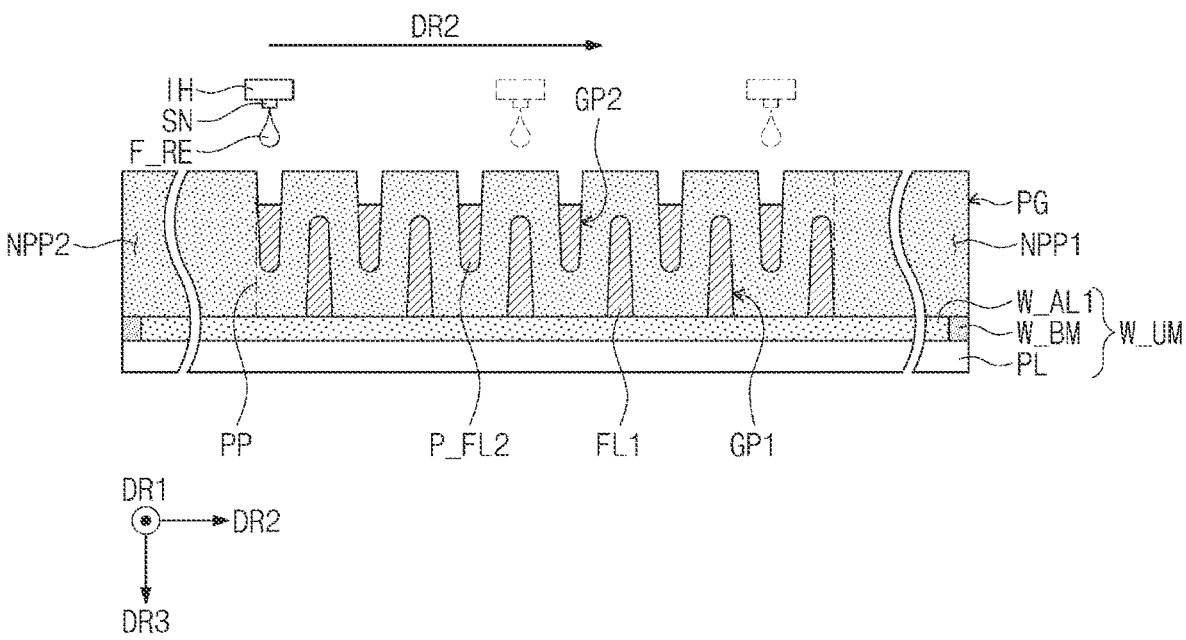
Figure 14N:
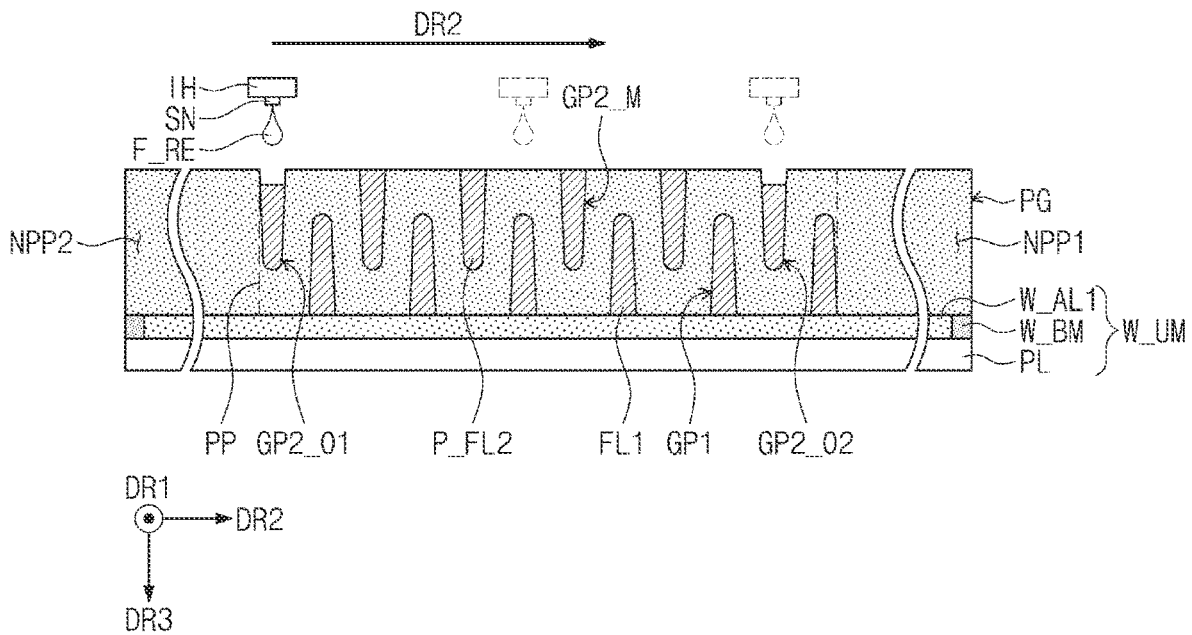
Figure 14O:
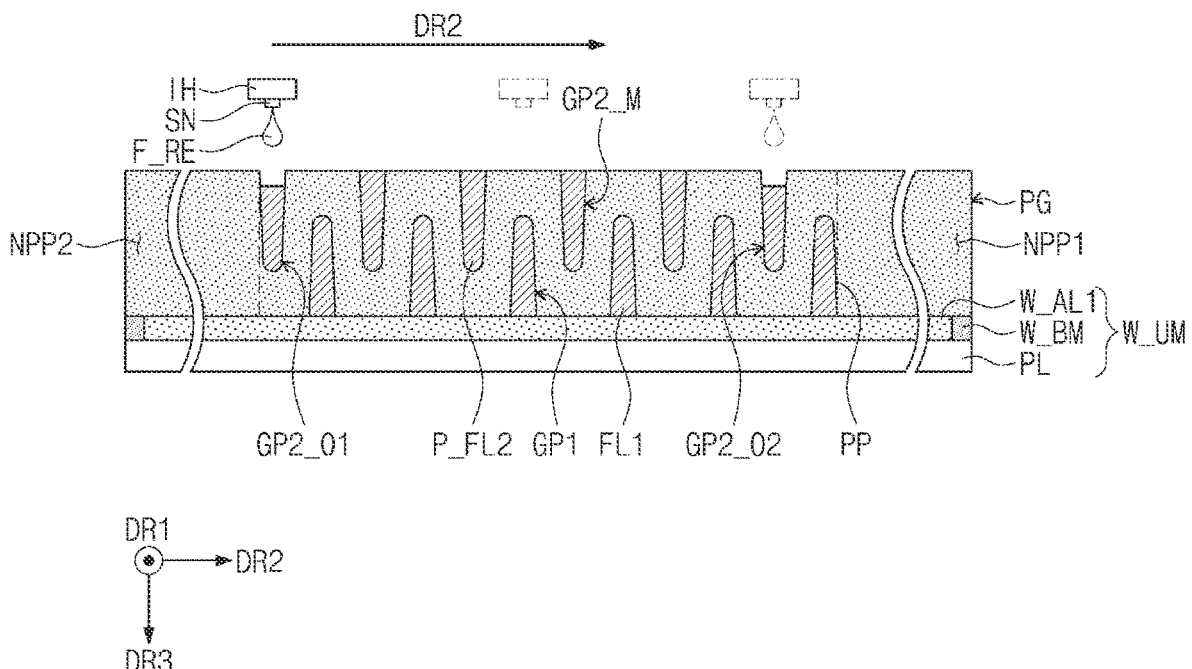
Figure 14P:
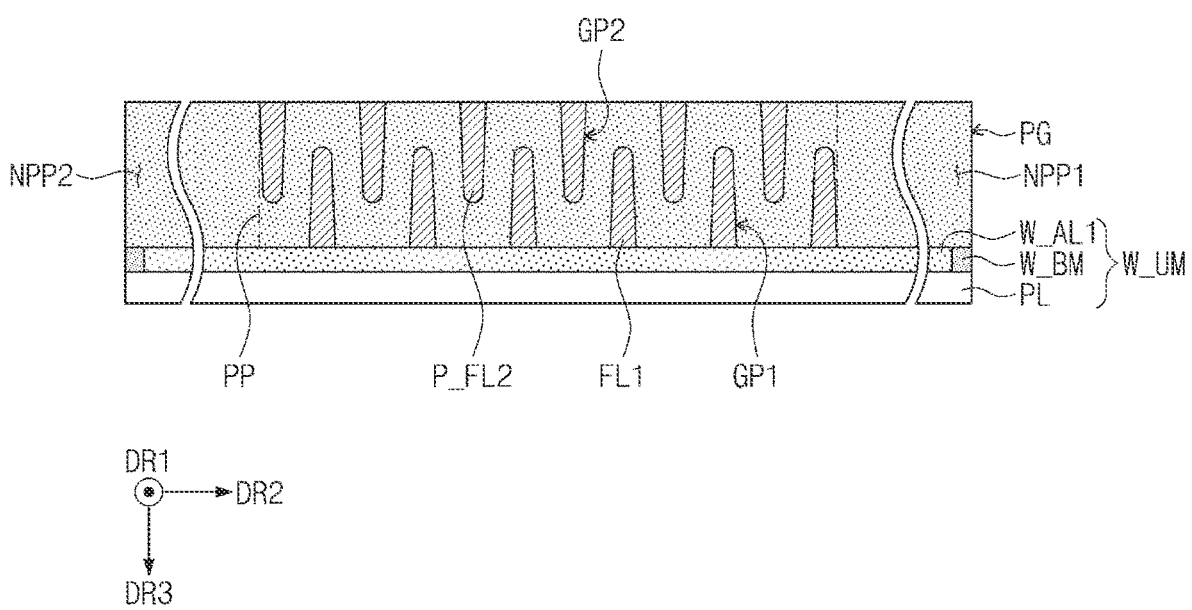
Figure 14Q:
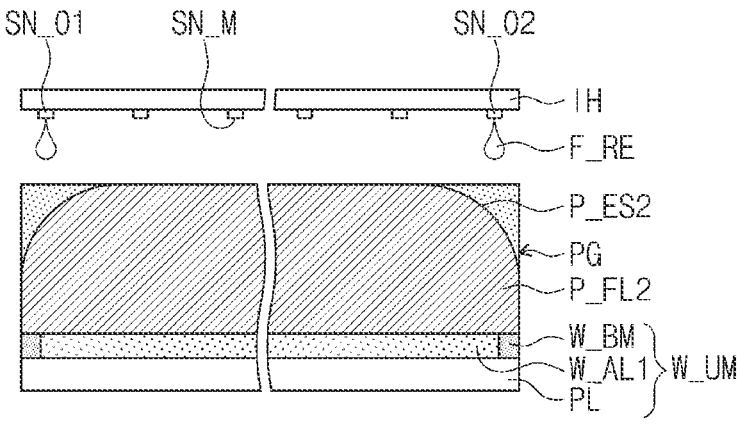
Figure 14Q:
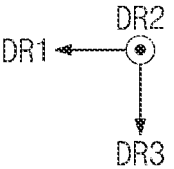
Figure 14R:
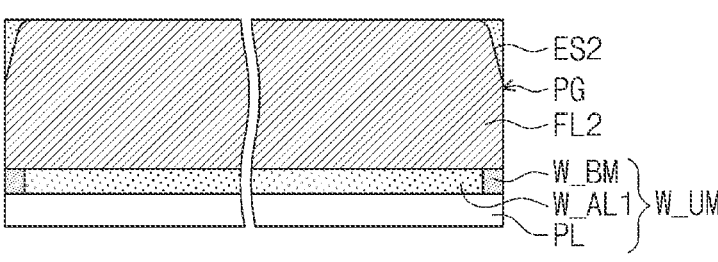
Figure 14R:
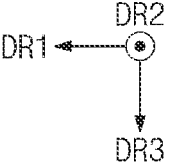
Figure 14S:
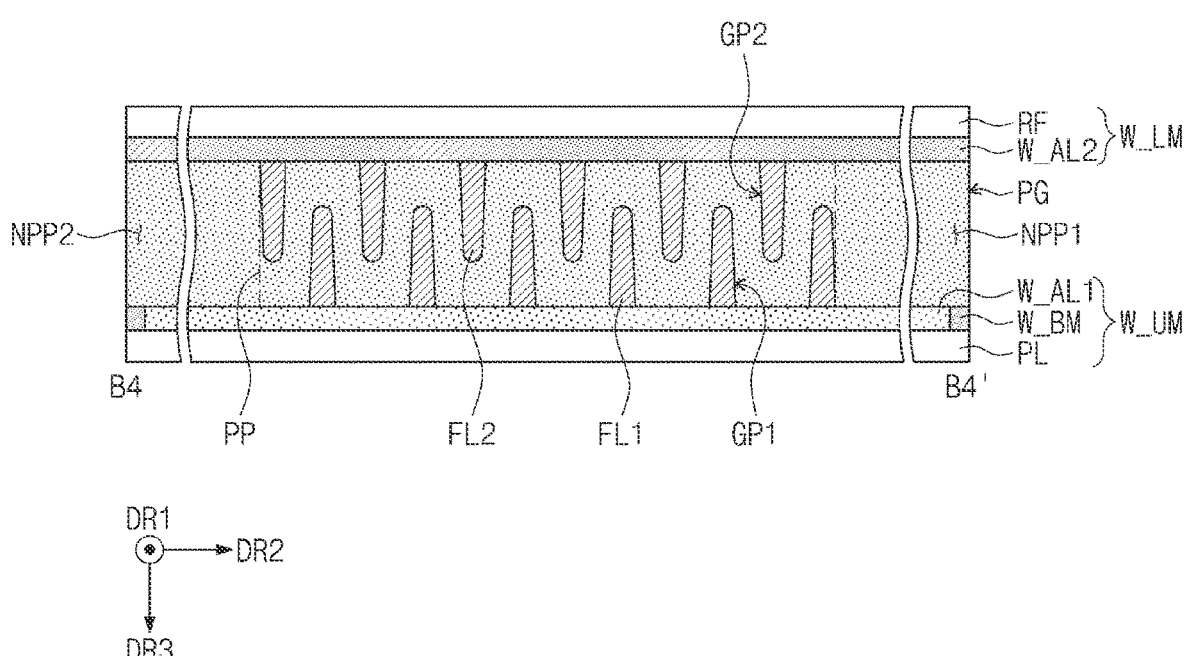
Figure 14T:
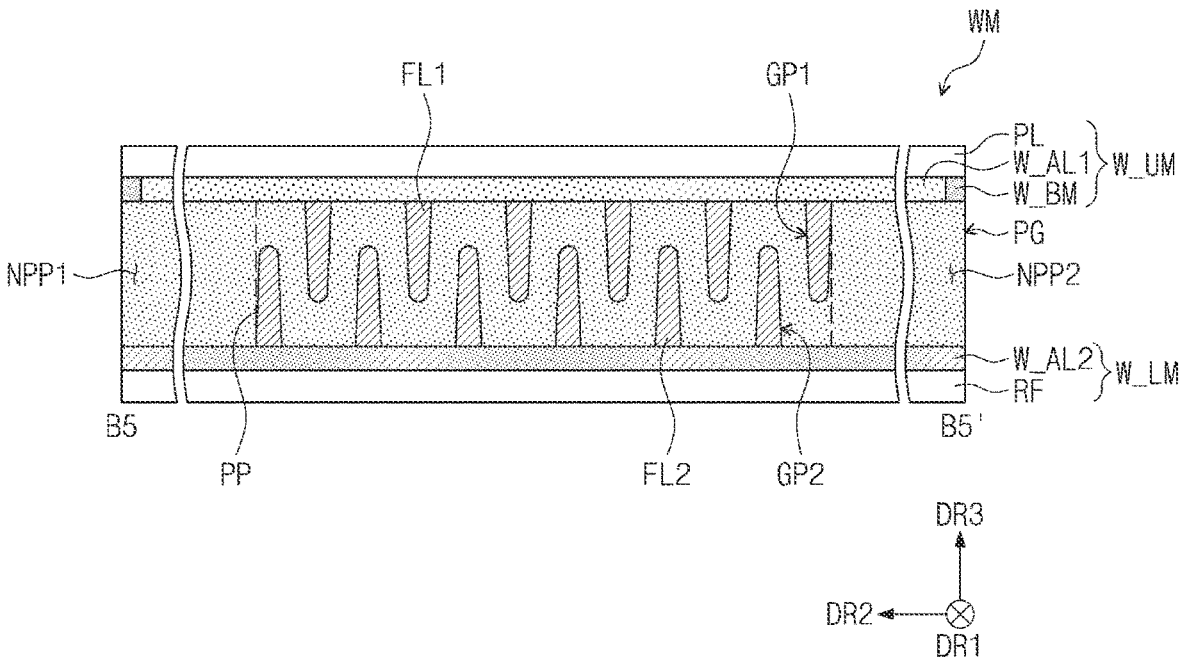

Particularly, FIG. 14A is a cross-sectional view of the pattern glass of FIG. 13A. FIGS. 14B to 14D are views illustrating a first basic filling process of FIG. 13B. FIGS. 14E to 14F are views illustrating a first additional filling process of FIG. 13C. FIGS. 14G to 14H are views illustrating a second additional filling process of FIG. 13D. FIG. 14I is a cross-sectional view taken along line B1-B1' of FIG. 13E. FIG. 14J is a cross-sectional view taken along line B2-B2' of FIG. 13E. FIG. 14K is a cross-sectional view taken along line B3-B3' of FIG. 13F. FIGS. 14I to 14N are views illustrating a second basic filling process of FIG. 13G. FIGS. 14O to 14P are views illustrating a third additional filling process of FIG. 13H. FIGS. 14Q to 14R are views illustrating a fourth additional filling process of FIG. 13I. FIG. 14S is a cross-sectional view taken along line B4-B4' of FIG. 13J. FIG. 14T is a cross-sectional view taken along line B5-B5' of FIG. 13K.

Referring to FIGS. 13A and 14A, the pattern glass PG may include a pattern part PP and non-pattern parts NPP1 and NPP2. The pattern part PP may be disposed to correspond to the folding area FA2. The non-pattern parts NPP1 and NPP2 may include a first non-pattern part NPP1 corresponding to the first non-folding area NFA3 and a second non-pattern part NPP2 corresponding to the second non-folding area NFA4. The pattern part PP may be disposed between the first and second non-pattern parts NPP1 and NPP2.

The pattern part PP may include multiple first groove patterns GP1 and second groove patterns GP2. As an example, the first groove patterns GP1 may have a groove shape recessed from the top surface PG-F (see FIG. 5B) of the pattern glass PG. The second groove patterns GP2 may have a groove shape recessed from the bottom surface PG-B (see FIG. 5B) of the pattern glass PG.

Referring to FIGS. 13B and 14B to 14D, a first preliminary filling layer P_FL1 may be formed on the pattern part PP. The first preliminary filling layer P_FL1 may be formed through the first basic filling process of primarily (initial) filling a filling resin F_RE into the first groove patterns GP1.

The first basic filling process may include multiple first unit filling processes. In FIGS. 14B to 14D, three times of the first unit filling processes are illustrated as an example, but the number of times of the first unit filling process is not limited thereto. For example, the number of times of the first unit filling process may be two times, four times, or five times. Each of the first unit filling processes may include a process of injecting the filling resin F_RE in an inkjet manner.

The filling resin F_RE used in the first unit filling process using the inkjet manner may be a low-viscosity liquid crystal resin. As an example, the filling resin F_RE may have a viscosity of about 3 cPs to about 15 cPs and surface tension of about 20 dyne/cm to about 30 dyne/cm. Since the filling resin F_RE may be formed in the pattern part PP provided to correspond to the folding area FA2, the filling resin F_RE may have a modulus of about 50 kPa or less to prevent folding characteristics of the glass window WM from being deteriorated. As an example, the modulus of the filling resin F_RE may be about 25 kPa or less.

The filling resin F_RE may have substantially the same refractive index as the pattern glass PG. For example, in case that the pattern glass PG has a refractive index of about 1.490 to about 1.520, the filling resin F_RE may have a refractive index that matches a refractive index of the pattern glass PG at the third decimal place.

The filling resin F_RE may include at least one selected from a urethane resin, an epoxy resin, a polyester resin, a polyether resin, an acrylate resin, an acrylonitrile-butadiene-styrene (ABS) resin, and rubber. Particularly, the filling resin F_RE may include at least one of phenylene, polyethylene terephthalate (PET), polyimide (PI), polyamide (PAI), polyethylene naphthalate (PEN), and polycarbonate (PC).

The same inkjet head IH may be used in the first unit filling processes. The inkjet head IH may have a structure elongated in an extending direction of the first groove patterns GP1 (i.e., the first direction DR1). FIG. 13B illustrates one inkjet head IH, but the disclosure is not limited thereto. In other embodiments, multiple inkjet heads arranged in the first direction DR1 may be provided.

Multiple injection (e.g., spray, jetting) nozzles SN may be disposed in the inkjet head IH. The injection nozzles SN may be disposed to be spaced apart from each other in the first direction DR1. A discharge amount per unit time of the filling resin F_RE discharged from each of the injection nozzles SN may be the same. The discharge amount per unit time of the filling resin F_RE injected through each of the injection nozzles SN in each of the first unit filling processes may be the same. A process time of each of the first unit filling processes may be the same. Since a small amount of filling resin F_RE may be injected several times through the first unit filling processes without injecting a large amount of filling resin F_RE at once, the filling resin F_RE may be prevented from overflowing between the first groove patterns GP1 in the pattern part PP.

The inkjet head IH may inject the filling resin F_RE while moving in a direction (e.g., a fourth direction DR4 opposite to the second direction DR2).

A height of the first preliminary filling layer P_FL1 may increase whenever the first unit filling processes are performed. In case that the first unit filling processes are completed, the first preliminary filling layer P_FL1 filled into the first groove patterns GP1 may be formed on the pattern part PP. However, after the completion of the first basic filling process, the first preliminary filling layer P_FL1 may have a non-uniform height. For example, the first preliminary filling layer P_FL1 filled into the first and second outermost groove patterns GP1_O1 and GP1_O2 that are farthest from the second folding axis FX2 (see FIG. 5B) among the first groove patterns GP1 may have a height less than that of the first preliminary filling layer P_FL1 filled into other groove patterns (hereinafter, referred to as intermediate groove patterns GP1_M).

Referring to FIGS. 13C, 14E, and 14F, the first additional filling process of additionally filling the filling rein F_RE into the first and second outermost groove patterns GP1_O1 and GP1_O2 may be performed.

During the first additional filling process, the inkjet head IH may inject the filling resin F_RE only to positions corresponding to the first and second outermost groove patterns GP1_O1 and GP1_O2 and may not inject the filling resin F_RE to positions corresponding to the intermediate groove patterns GP1_M. Thus, only the relatively unfilled first and second outermost groove patterns GP1_O1 and GP1_O2 may be supplemented with the filling resin F_RE. Thus, a height of the first preliminary filling layer P_FL1 may be uniform as a whole, and a height difference between the first preliminary filling layer P_FL1 and the top surface PG-F of the pattern glass PG may be reduced and removed. As an example, the height difference may be about 5 μm or less.

Referring to FIGS. 13D, 14G, and 14H, a second additional filling process of additionally filling the filling resin F_RE into both ends of the first groove patterns GP1 may be performed. Before performing the second additional filling process, an edge surface P_ES1 of each of both ends of the first preliminary filling layer P_FL1 may have a relatively gentle slope due to a liquid-phase contact angle of the filling resin F_RE having a low viscosity.

During the second additional filling process, the filling resin F_RE may be injected from only two injection nozzles (hereinafter, referred to as first and second outermost injection nozzles SN_O1 and SN_O2 corresponding to both the ends of the first groove patterns GP1 among the injection nozzles provided in the inkjet head IH, and the filling resin F_RE may not be injected from other injection nozzles (hereinafter, referred to as intermediate injection nozzles SN_M). Thus, the filling resin F_RE may be supplemented only on both the ends of the first preliminary filling layer P_FL1 having the relatively gentle slope. Thus, the first filling layer FL1 having an overall uniform height may be formed.

The edge surface ES1 may be provided as an inclined surface that is inclined with respect to a top surface of the first filling layer FL1 at both the ends of the first filling layer FL1. As an example, the edge surfaces ES1 at both the ends of the first filling layer FL1 may have an inclined angle greater than that of the edge surfaces P_ES1 of both the ends of the first preliminary filling layer P_FL1 with respect to the top surface of the first filling layer FL1.

Referring to FIGS. 13E, 14I, and 14J, a window upper film W_UM may be physically connected to the top surface PG-F of the pattern glass PG on which the first filling layer FL1 is formed. The window upper film W_UM may include a protective layer PL, a window light blocking layer W_BM, and a first window adhesive layer W_AL1. The first window adhesive layer W_AL1 may be disposed on a surface of the protective layer PL facing the pattern glass PG. The window light blocking layer W_BM may be formed on a surface of the protective layer PL to surround the first window adhesive layer W_AL1. In other embodiments, the window light blocking layer W_BM may be disposed along an edge of the protective layer PL between the first window adhesive layer W_AL1 and the protective layer PL.

The window light blocking layer W_BM may be disposed to cover the edge surface ES1 of the first filling layer FL1. A width Wb of the window light blocking layer W_BM may be greater than a width Wa of the edge surface ES1. As an example, the window light blocking layer W_BM may have a width Wb of about 0.8 mm to about 1 mm. However, the width Wb of the window light blocking layer W_BM is not limited to the above-described numerical value. The width Wb may be determined according to a size of the glass window WM and a width of the peripheral area NAA (see FIG. 4) of the display module DM (see FIG. 4) disposed below the glass window WM.

The window upper film W_UM may be physically connected to the top surface PG-F of the pattern glass PG and the first filling layer FL1 by the first window adhesive layer W_AL1. In the disclosure, since the first filling layer FL1 may be formed through the first and second additional filling processes, a height difference of about 5 μm or less may occur between the top surface PG-F of the pattern glass PG and the first filling layer FL1. Therefore, in case that the window upper film W_UM is physically connected to the pattern glass PG, air bubbles may be prevented from being generated between the first window adhesive layer W_AL1 and the pattern glass PG, and as a result, the pattern part PP may be prevented from being visually recognized.

Referring to FIGS. 13F and 14K, the pattern glass PG to which the window upper film W_UM may be physically connected may be turned over. The window upper film W_UM may be disposed below the pattern glass PG, and the bottom surface PG-B of the pattern glass PG may be disposed above the top surface PG-F of the pattern glass PG.

Thereafter, referring to FIGS. 13G and 14L to 14N, a second preliminary filling layer P_FL2 may be formed on the pattern part PP. The second preliminary filling layer P_FL2 may be formed through a second basic filling process of primarily filling the filling resin F_RE into the second groove patterns GP2.

The second basic filling process may include multiple second unit filling processes. FIGS. 14L to 14N illustrate three times of the second unit filling processes as an example, the number of times of the second unit filling processes is not limited thereto. For example, the number of times of the second unit filling process may be two times, four times, or five times. Each of the second unit filling processes may include a process of injecting the filling resin F_RE in an inkjet manner. The same inkjet head IH may be used in the second unit filling processes. The same inkjet head as the inkjet head IH used in each of the first unit filling processes may be used in each of the second unit filling processes.

As an example, it has been illustrated that the number of times of the second unit filling process is the same as that of the first unit filling process, but the disclosure is not limited thereto. For example, in case that a depth of each of the second groove patterns GP2 is less than that of each of the first groove patterns GP2, the number of times of the second unit filling processes may be less than the number of times of first unit filling processes. In case that a depth of each of the second groove patterns GP2 is greater than that of each of the first groove patterns GP2, the number of times of the second unit filling processes may be greater than the number of times of first unit filling processes.

Multiple injection nozzles SN may be disposed in the inkjet head IH. The injection nozzles SN may be disposed to be spaced apart from each other in the first direction DR1. A discharge amount per unit time of the filling resin F_RE discharged from each of the injection nozzles SN may be the same. The discharge amount per unit time of the filling resin F_RE injected through each of the injection nozzles SN in each of the second unit filling processes may be the same.

The inkjet head IH may inject the filling resin F_RE to the second groove patterns GP2 while moving in a direction (e.g., the second direction DR2).

A height of the second preliminary filling layer P_FL2 may increase whenever the second unit filling processes are performed. In case that the second unit filling processes are completed, the second preliminary filling layer P_FL2 filled into the second groove patterns GP2 may be formed on the pattern part PP. However, after the completion of the second basic filling process, the second preliminary filling layer P_FL2 may have a non-uniform height. For example, the second preliminary filling layer P_FL2 filled into the third and fourth outermost groove patterns GP2_O1 and GP2_O2 that are farthest from the second folding axis FX2 (see FIG. 5B) among the second groove patterns GP2 may have a height less than that of the second preliminary filling layer P_FL2 filled into other groove patterns (hereinafter, referred to as intermediate groove patterns GP2_M).

Referring to FIGS. 13H, 14O, and 14P, the third additional filling process of additionally filling the filling rein F_RE into the third and fourth outermost groove patterns GP2_O1 and GP2_O2 may be performed.

During the third additional filling process, the inkjet head IH may inject the filling resin F_RE only to positions corresponding to the third and fourth outermost groove patterns GP2_O1 and GP2_O2 and may not inject the filling resin F_RE to positions corresponding to the intermediate groove patterns GP2_M. Thus, only the relatively unfilled third and fourth outermost groove patterns GP2_O1 and GP2_O2 may be supplemented with the filling resin F_RE. Thus, a height of the second preliminary filling layer P_FL2 may be uniform as a whole, and a height difference between the second preliminary filling layer P_FL2 and the top surface of the pattern glass PG may be reduced and removed. As an example, the height difference may be about 5 μm or less.

Referring to FIGS. 13I, 14Q, and 14R, a fourth additional filling process of additionally filling the filling resin F_RE into both ends of the second groove patterns GP2 may be performed. Before performing the fourth additional filling process, an edge surface P_ES2 of each of both ends of the second preliminary filling layer P_FL2 may have a relatively gentle slope due to a liquid-phase contact angle of the filling resin F_RE having a low viscosity.

During the fourth additional filling process, the filling resin F_RE may be injected from only two injection nozzles (hereinafter, referred to as first and second outermost injec-tion nozzles SN_O1 and SN_O2 corresponding to both the ends of the second groove patterns GP2 among the injection nozzles provided in the inkjet head IH, and the filling resin F_RE may not be injected from other injection nozzles (hereinafter, referred to as intermediate injection nozzles SN_M). Thus, the filling resin F_RE may be supplemented only on both the ends of the second preliminary filling layer P_FL2 having the relatively gentle slope. Thus, the second filling layer FL2 having an overall uniform height may be formed. Thus, the edge surface ES2 at each of both the ends of the second filling layer FL2 may have an inclined angle greater than that of the edge surface P_ES2 of each of both the ends of the second preliminary filling layer P_FL2.

Referring to FIGS. 13J and 14S, a window lower film W_LM may be physically connected to the bottom surface PG-B of the pattern glass PG on which the second filling layer FL2 is formed. The window lower film W_LM may include a release paper film RF and a second window adhesive layer W_AL2. The second window adhesive layer W_AL2 may be disposed on a surface of the release paper film RF facing the pattern glass PG.

The window lower film W_LM may be physically connected to the bottom surface PG-B of the pattern glass PG and the second filling layer FL2 by the second window adhesive layer W_AL2. In the disclosure, since the second filling layer FL2 may be formed through the third and fourth additional filling processes, a height difference of about 5 μm or less may occur between the bottom surface PG-B of the pattern glass PG and the second filling layer FL2. Therefore, in case that the window lower film W_LM is physically connected to the pattern glass PG, air bubbles may be prevented from being generated between the second window adhesive layer W_AL2 and the pattern glass PG, and as a result, the pattern part PP may be prevented from being visually recognized.

Referring to FIGS. 13K and 14T, the pattern glass PG to which the window lower film W_LM is physically connected may be turned over. As a result, the window lower film W_LM may be disposed below the pattern glass PG, and the window upper film W_UM may be disposed above the pattern glass PG. Thus, the glass window WM may be completed.

FIGS. 15A to 15H are schematic views illustrating a process of manufacturing a glass window according to an embodiment. FIGS. 16A to 16M are schematic views illustrating a process of manufacturing a glass window according to an embodiment.

Figure 15A:
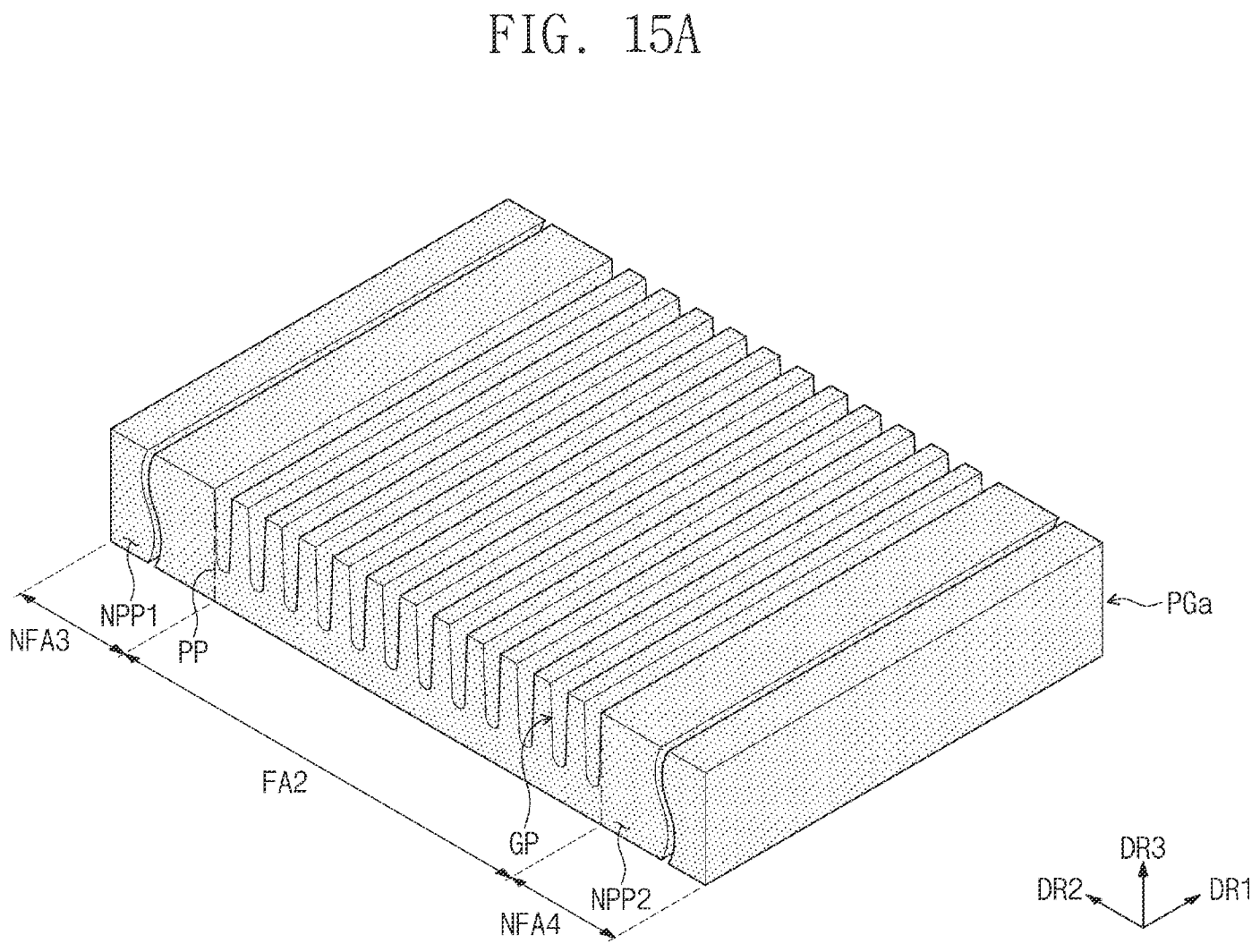
Figure 15B:
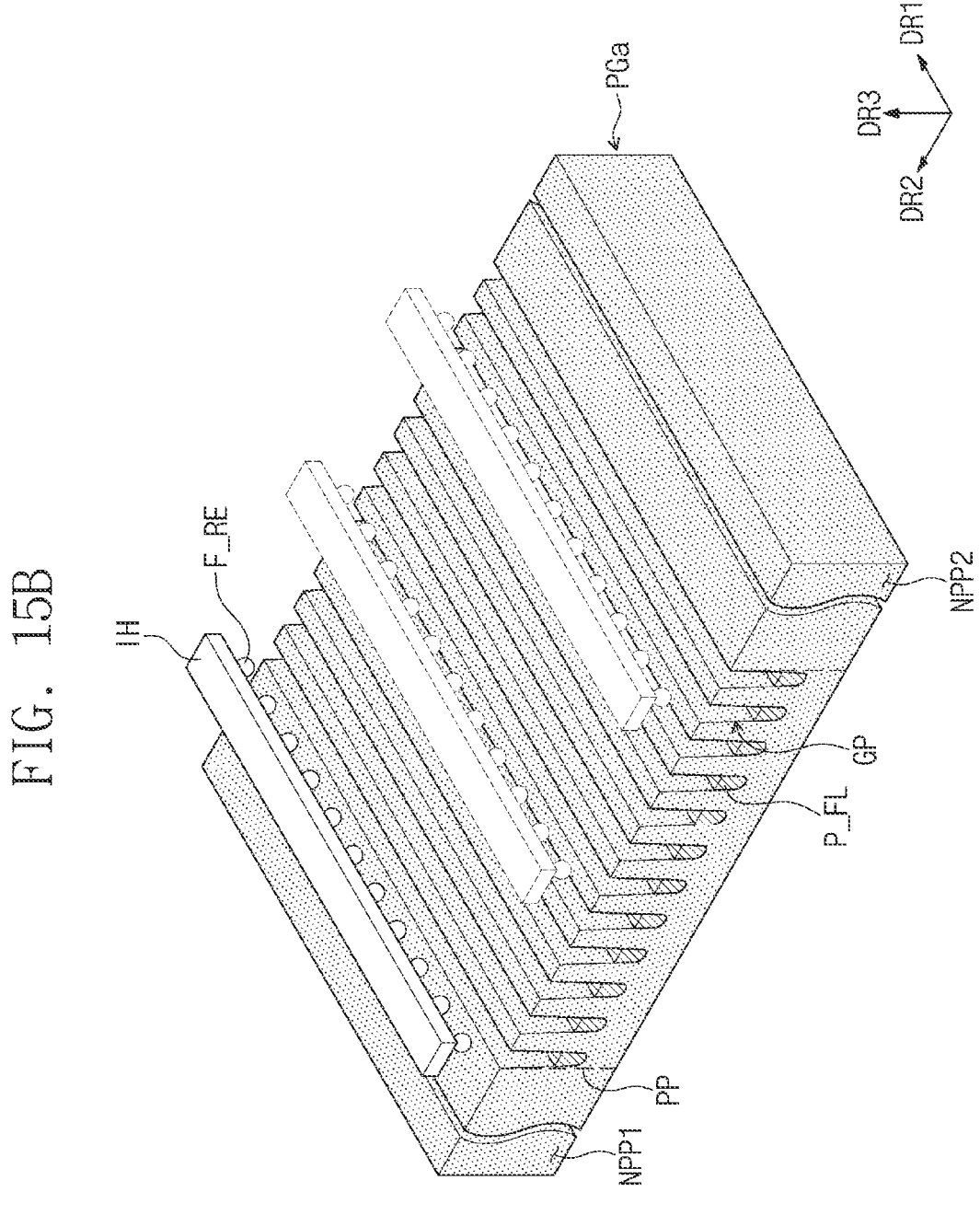
Figure 15C:
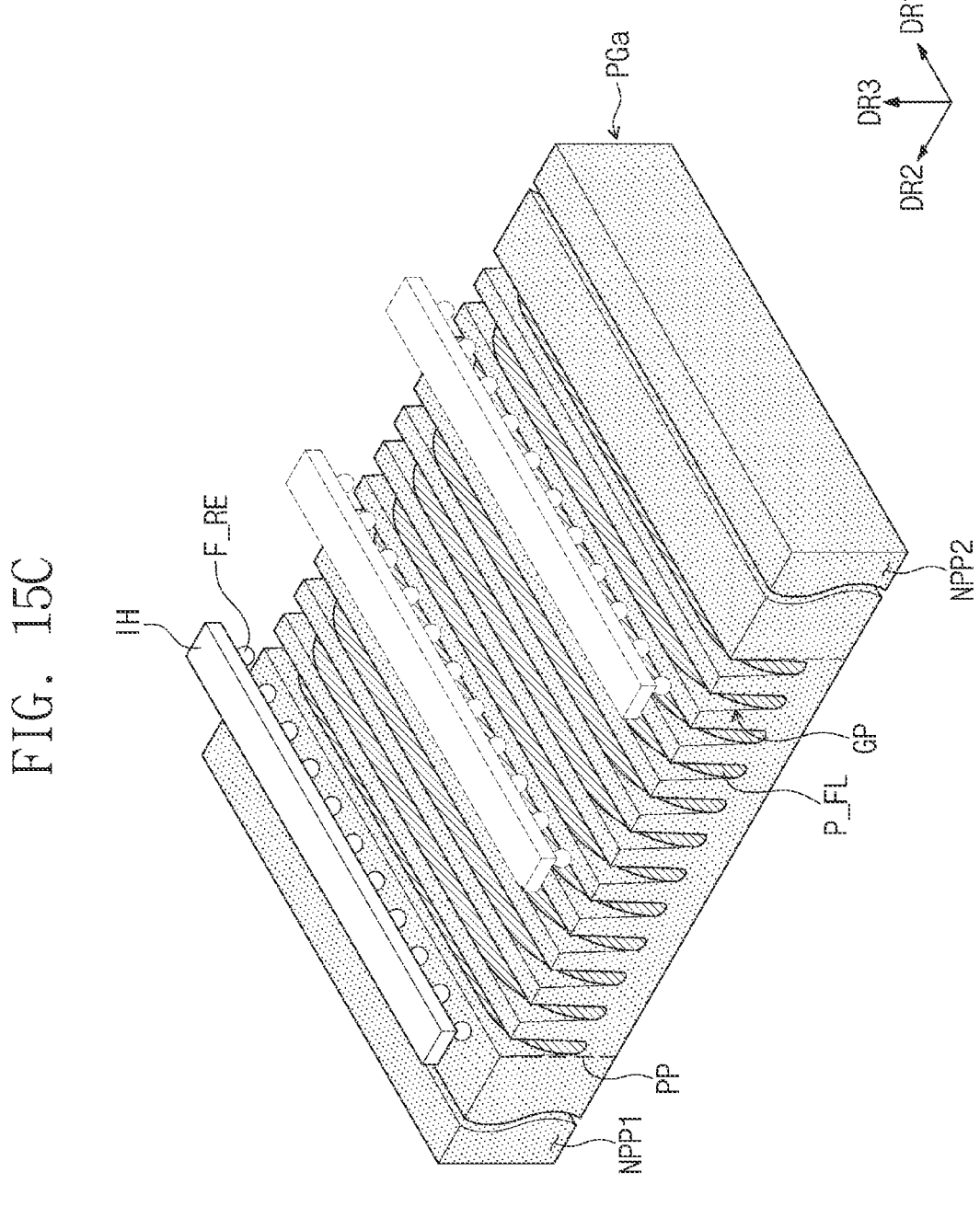
Figure 15D:
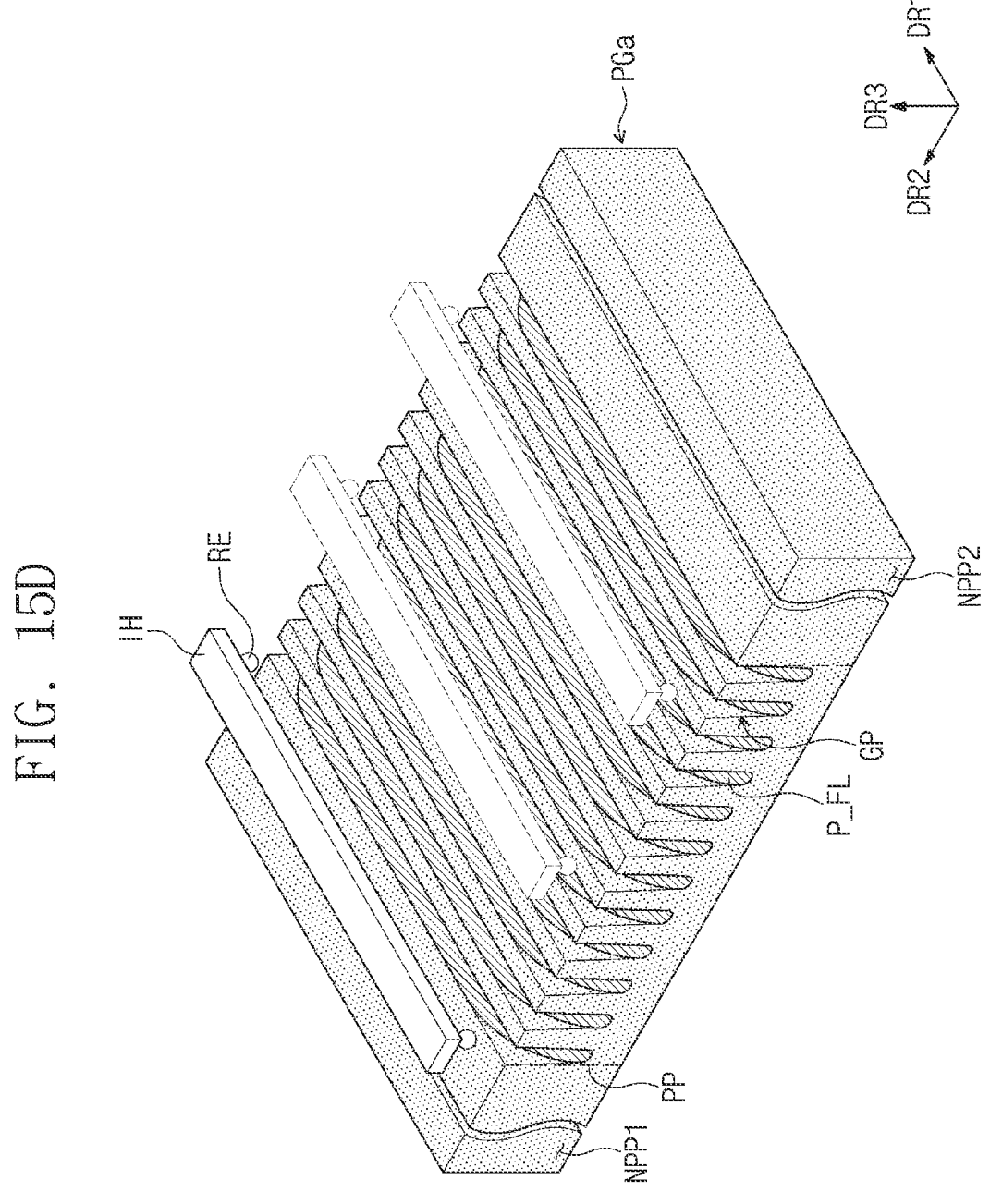
Figure 15E:
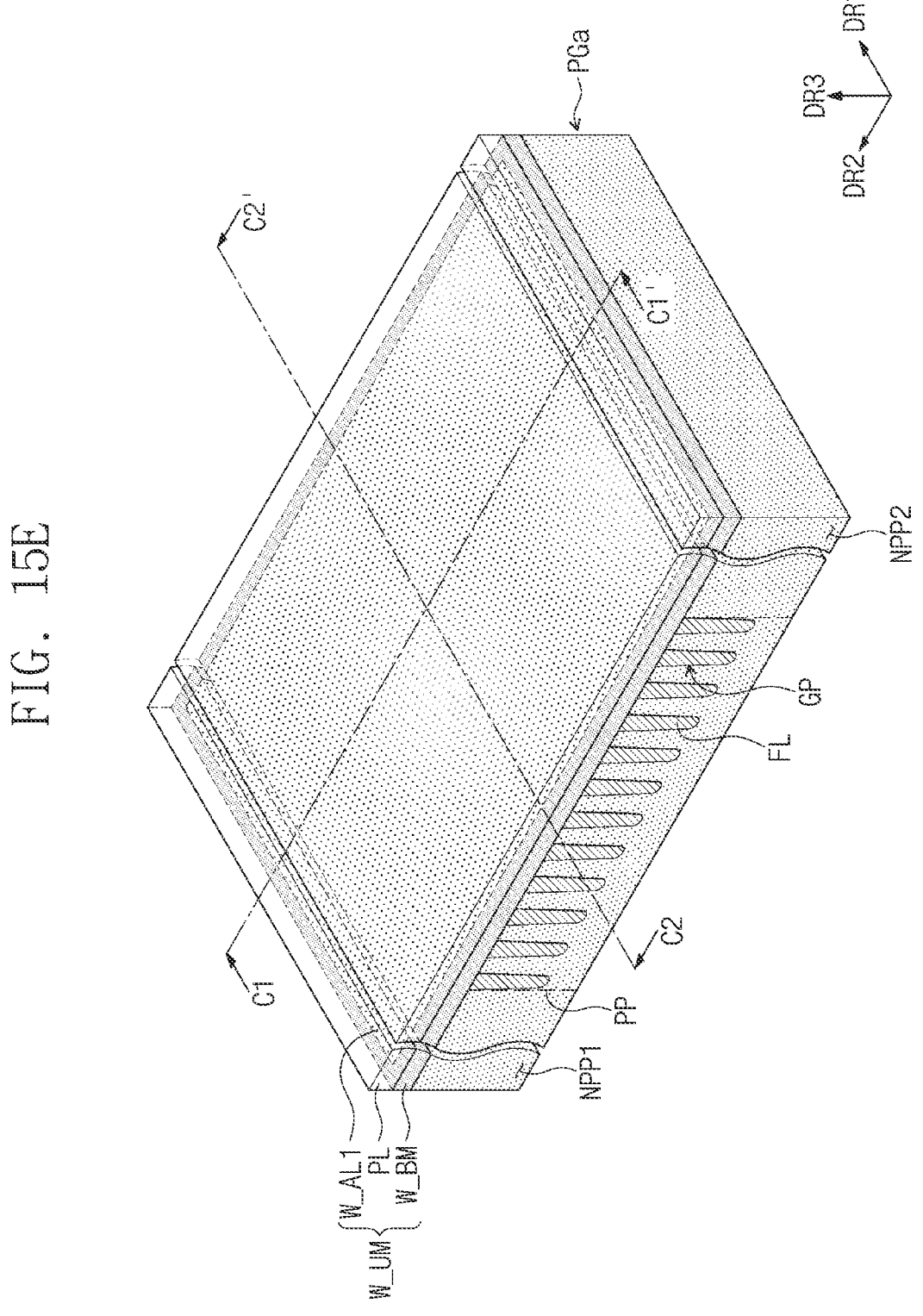
Figure 15F:
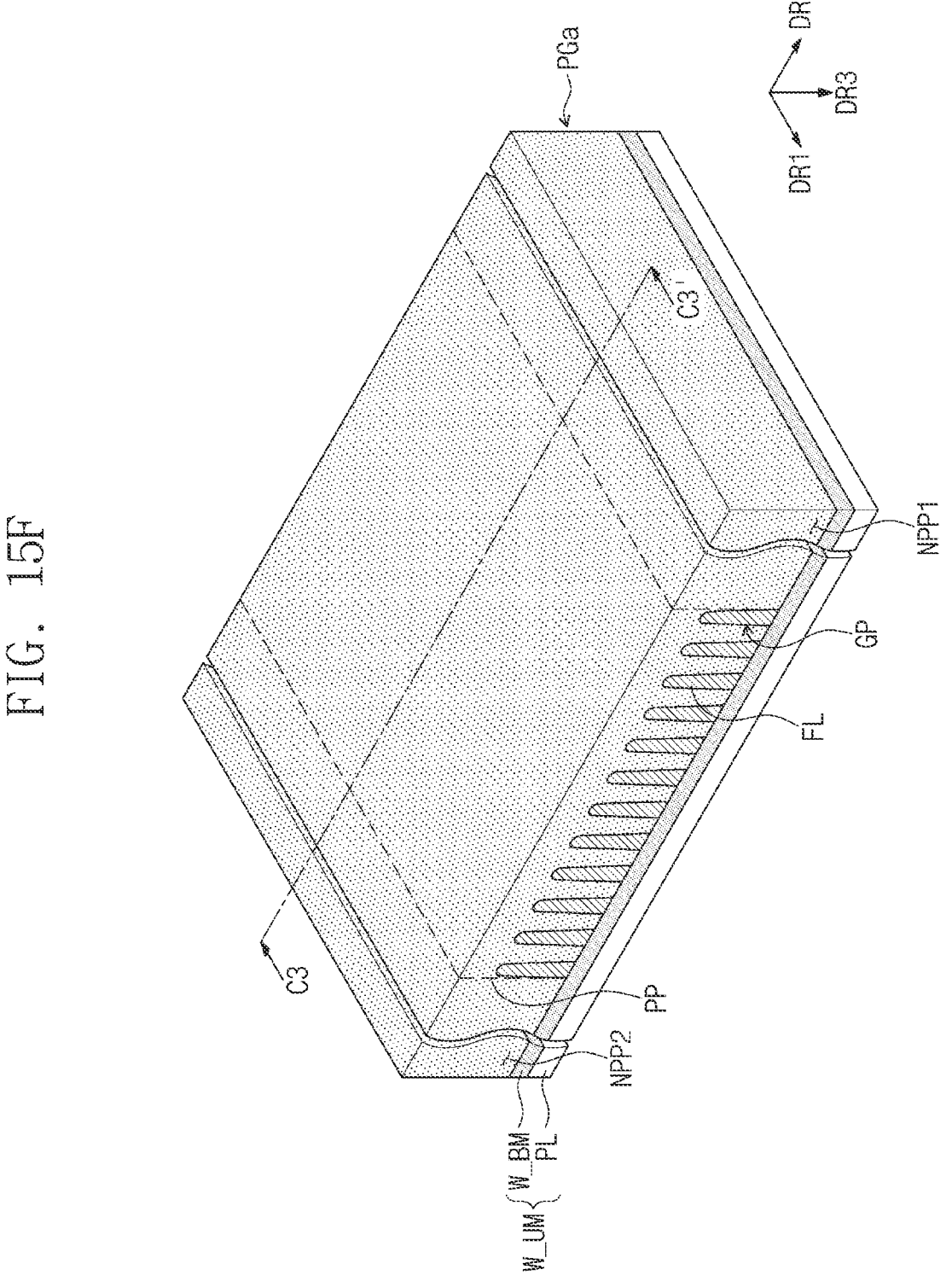
Figure 15G:
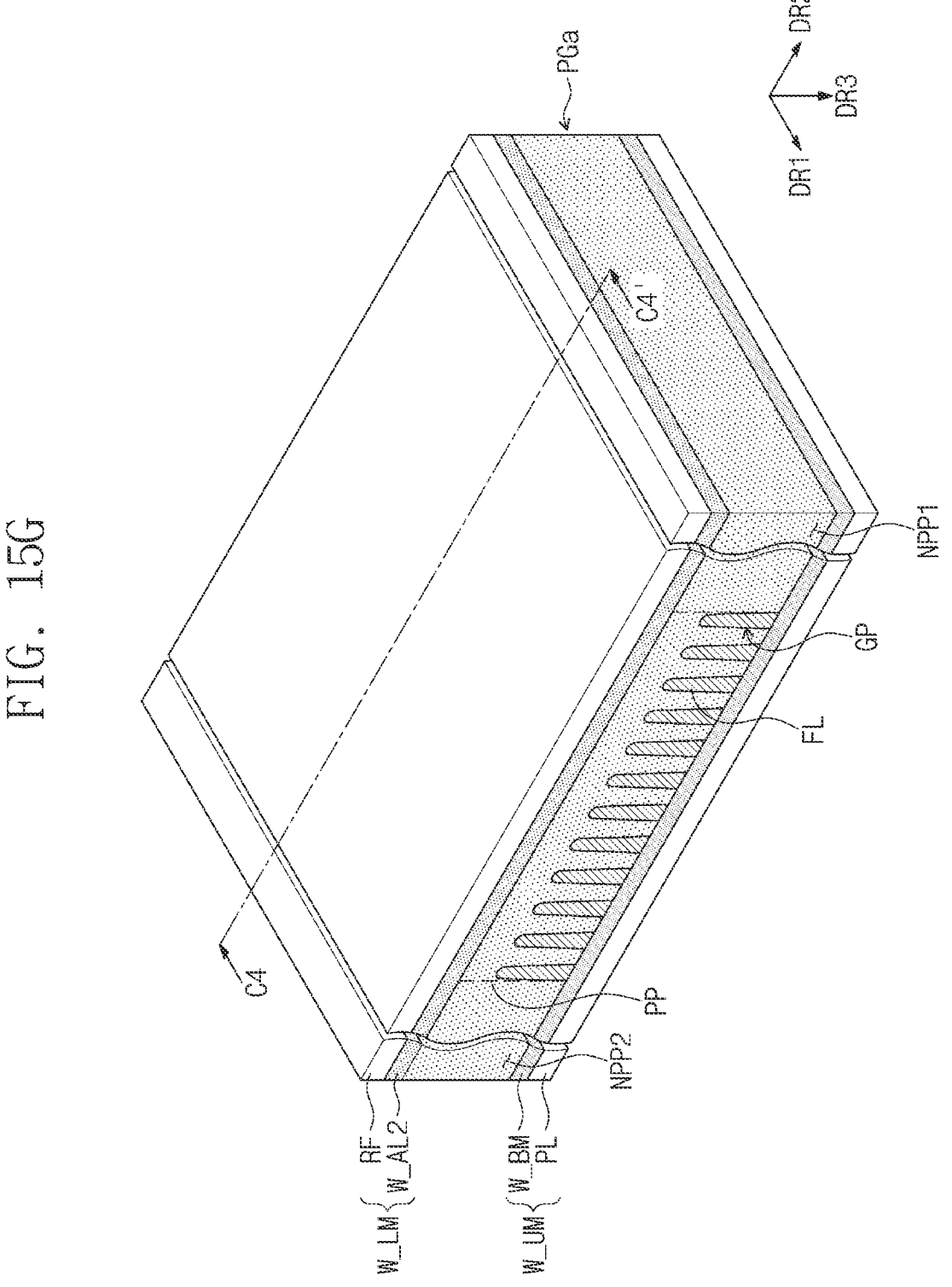
Figure 15H:
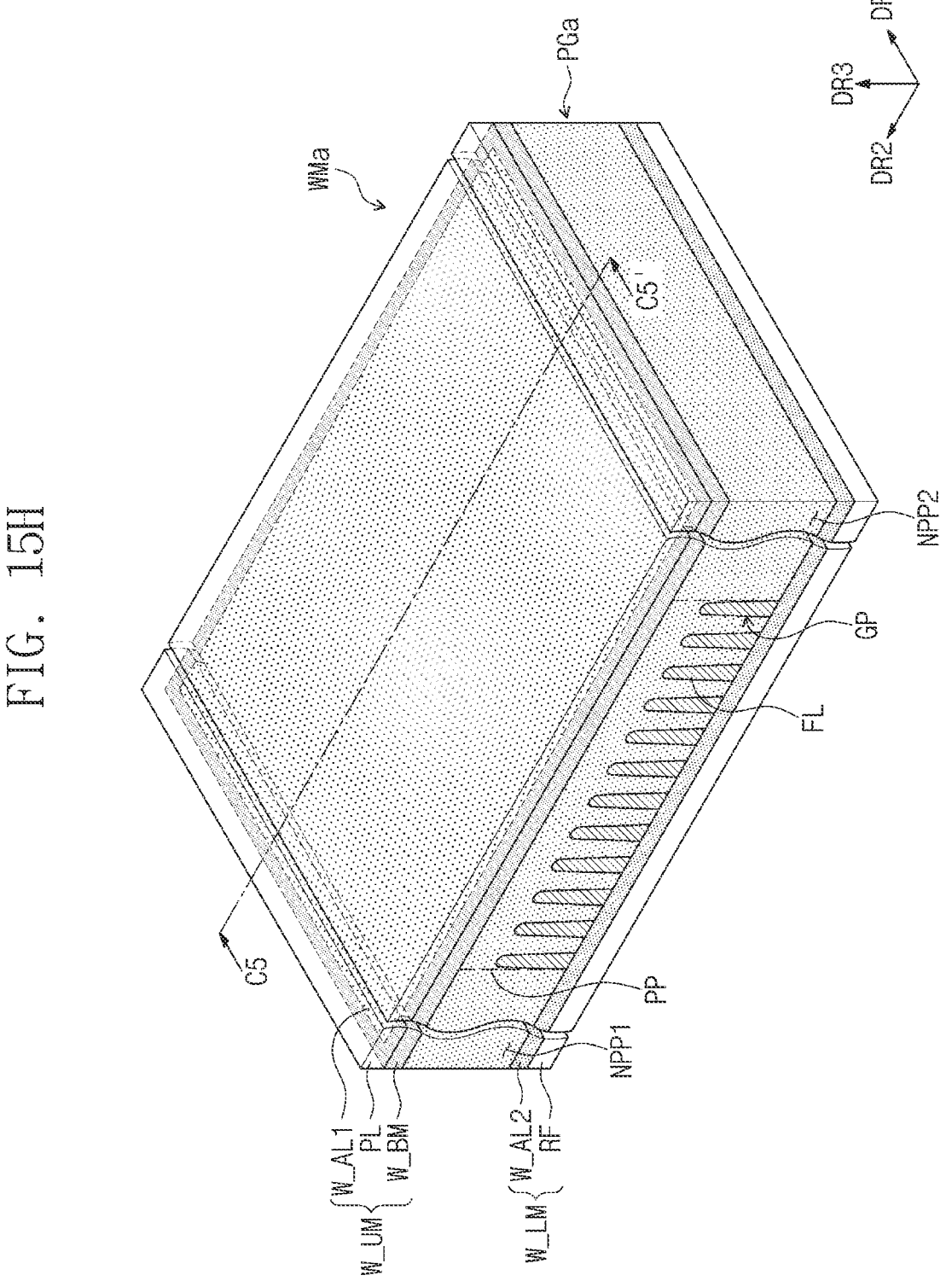
Figure 16A:
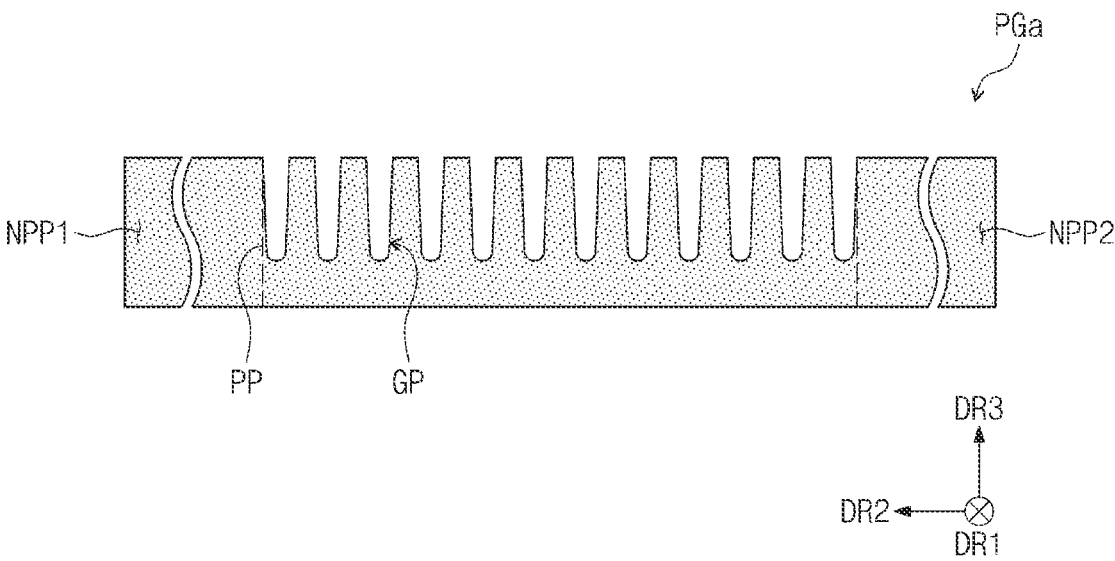
FIGS. 16A to 16M are schematic views illustrating a process of manufacturing a glass window according to an embodiment.
Figure 16B:
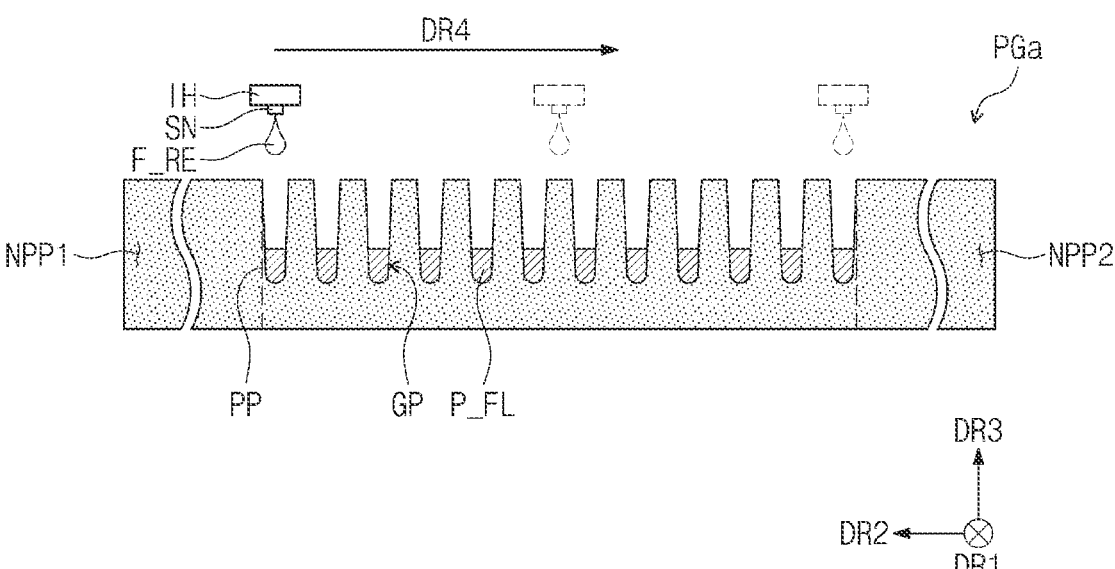
Figure 16C:
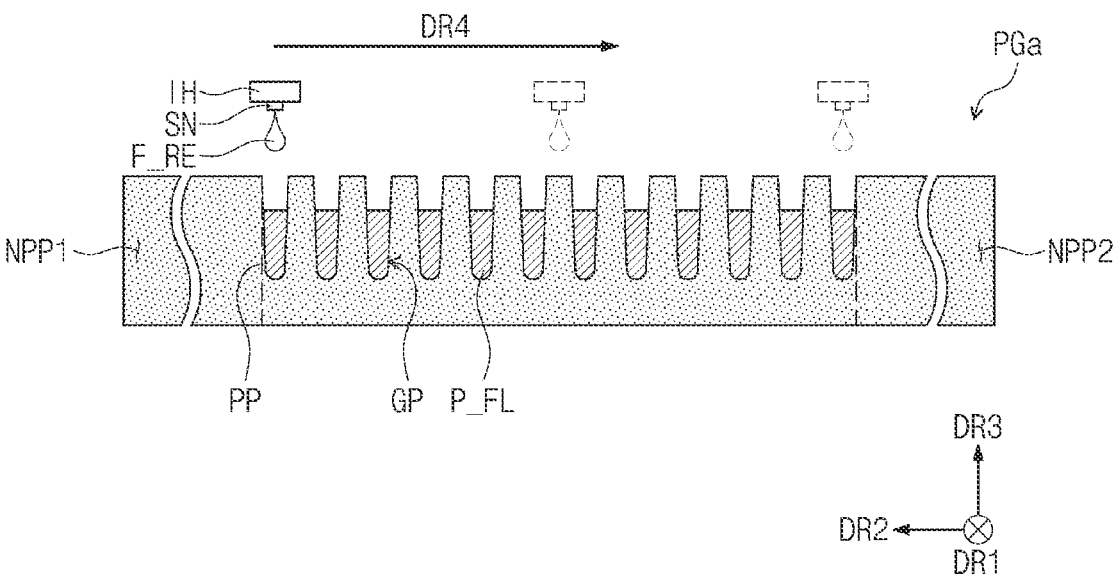
Figure 16D:
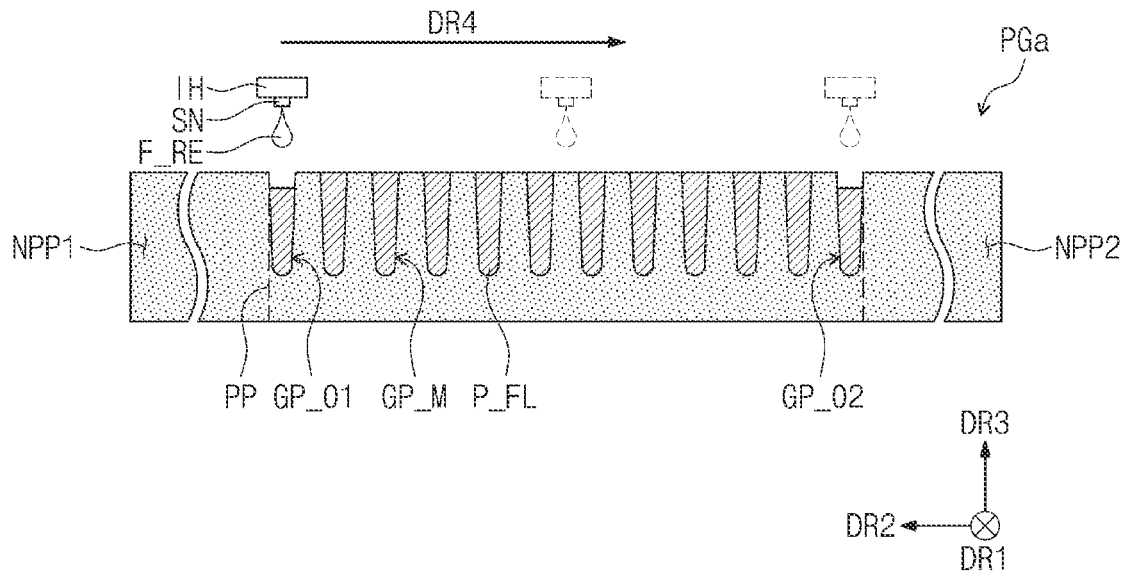
Figure 16E:
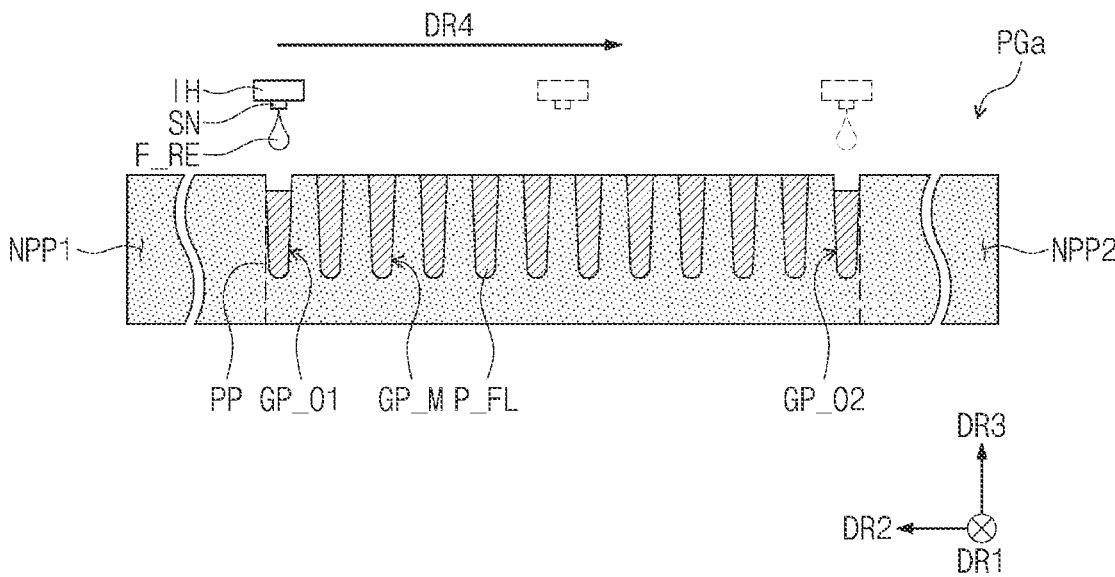
Figure 16F:
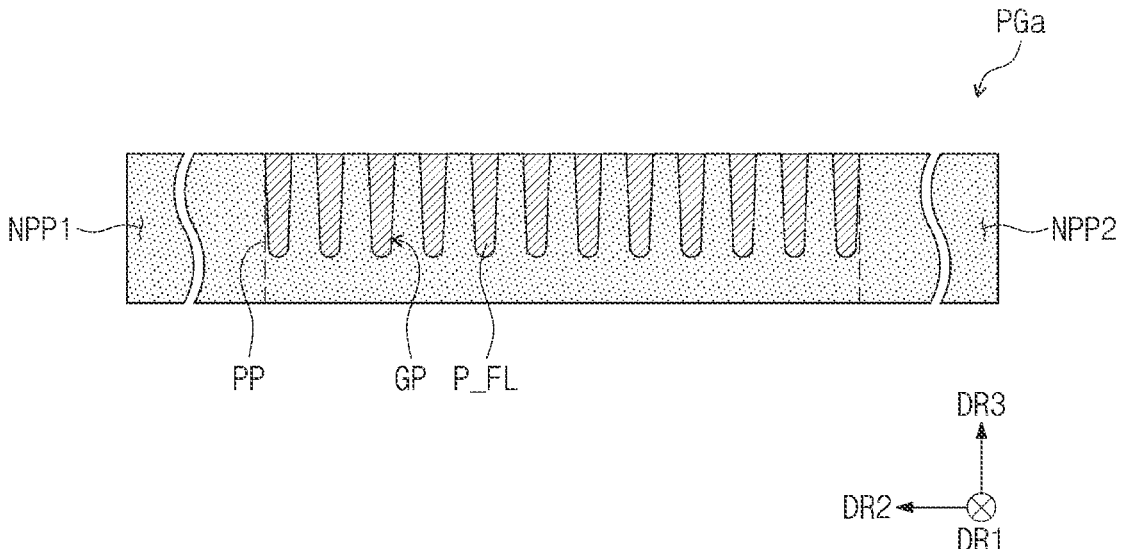
Figure 16G:
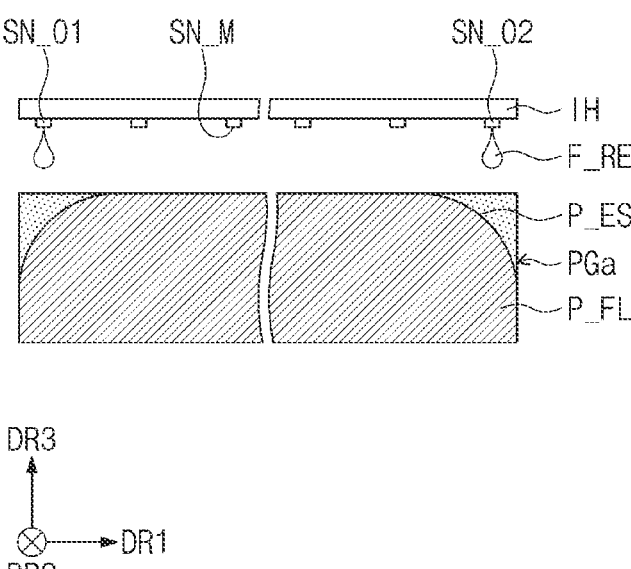
Figure 16H:
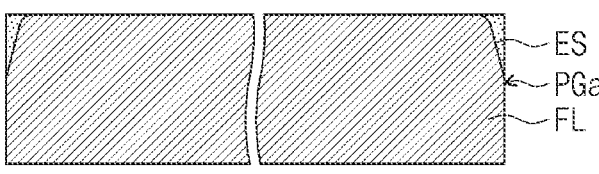
Figure 16H:
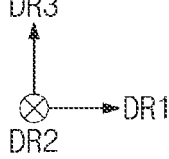
Figure 16I:
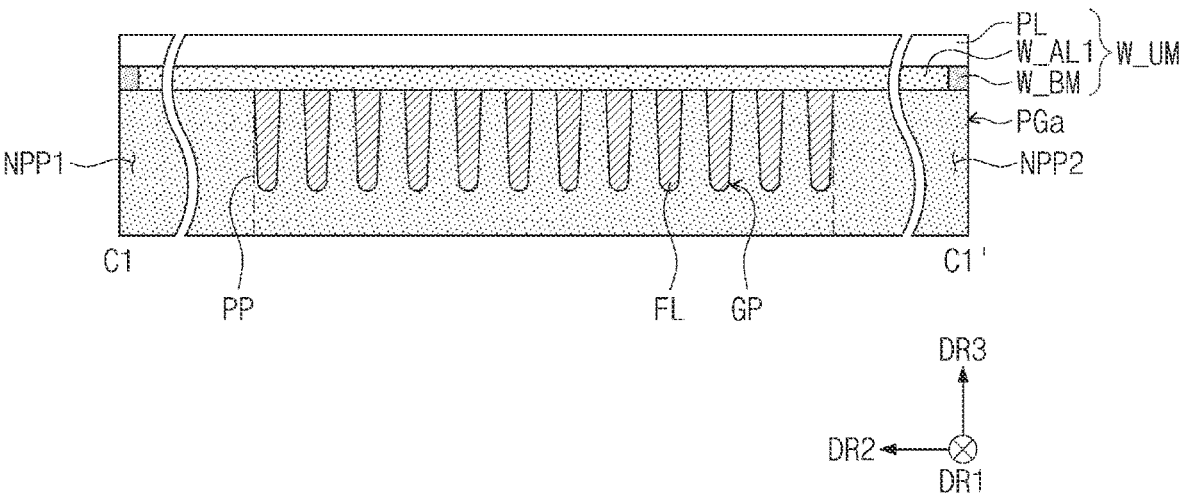
Figure 16J:
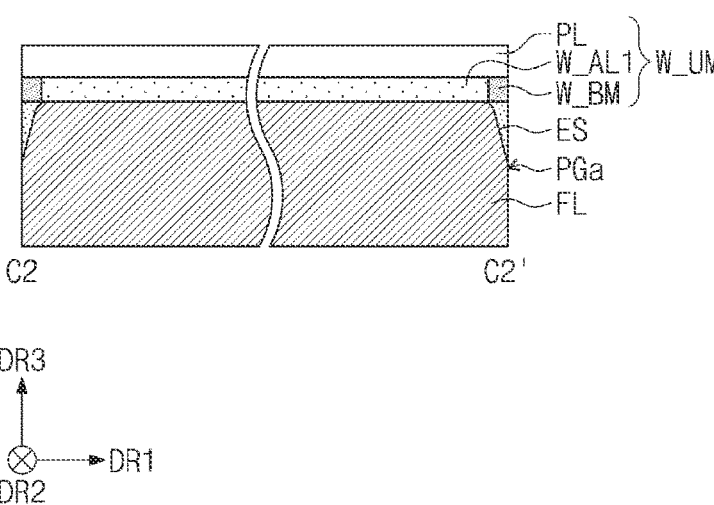
Figure 16K:
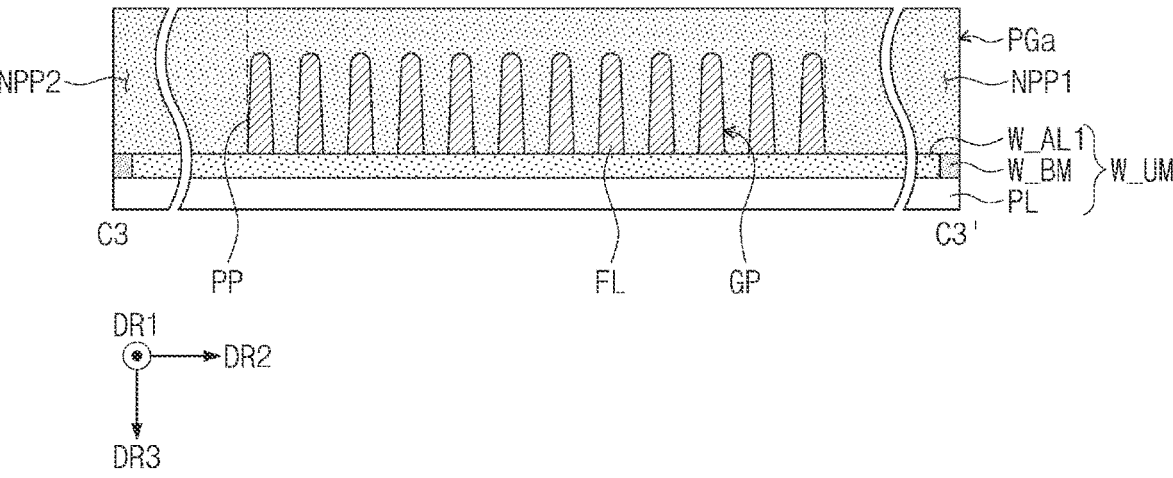

Particularly, FIG. 16A is a cross-sectional view of the pattern glass of FIG. 15A. FIGS. 16B to 16D are views illustrating a first basic filling process of FIG. 15B. FIGS. 16E to 16F are views illustrating a first additional filling process of FIG. 15C. FIGS. 16G to 16H are views illustrating a second additional filling process of FIG. 15D. FIG. 16I is a cross-sectional view taken along line C1-C1' of FIG. 15E. FIG. 16J is a cross-sectional view taken along line C2-C2' of FIG. 15E. FIG. 16K is a cross-sectional view taken along line C3-C3' of FIG. 15F. FIG. 16I is a cross-sectional view taken along line C4-C4' of FIG. 15G. FIG. 16M is a cross-sectional view taken along line C5-C5' of FIG. 15H.

Referring to FIGS. 15A and 16A, the pattern glass PG may include a pattern part PP and non-pattern parts NPP1 and NPP2. The pattern part PP may be disposed to correspond to the folding area FA2. The non-pattern parts NPP1 and NPP2 may include a first non-pattern part NPP1 corresponding to the first non-folding area NFA3 and a second non-pattern part NPP2 corresponding to the second non-folding area NFA4. The pattern part PP may be disposed between the first and second non-pattern parts NPP1 and NPP2. The pattern part PP may include groove patterns GP. As an example, the groove patterns GP may have a groove shape recessed from the top surface PG-F (see FIG. 7B) of the pattern glass PGa.

Referring to FIGS. 15B and 16B to 16D, a preliminary filling layer P_FL may be formed on the pattern part PP. The preliminary filling layer P_FL may be formed through the first basic filling process of primarily filling the filling resin F_RE into the first groove patterns GP.

The first basic filling process may include multiple first unit filling processes. In FIGS. 16B to 16D, three times of the first unit filling processes are illustrated as an example, but the number of times of the first unit filling process is not limited thereto. For example, the number of times of the first unit filling process may be two times, four times, or five times. Each of the first unit filling processes may include a process of injecting the filling resin F_RE in an inkjet manner. The same inkjet head IH may be used in the first unit filling processes. The inkjet head IH may have a structure elongated in an extending direction of the groove patterns GP (i.e., the first direction DR1). FIG. 15B illustrates one inkjet head IH, but the disclosure is not limited thereto. In other embodiments, multiple inkjet heads arranged in the first direction DR1 may be provided.

Multiple injection nozzles SN may be disposed in the inkjet head IH. The injection nozzles SN may be disposed to be spaced apart from each other in the first direction DR1. A discharge amount per unit time of the filling resin F_RE discharged from each of the injection nozzles SN may be the same. The discharge amount per unit time of the filling resin F_RE injected through each of the injection nozzles SN in each of the first unit filling processes may be the same.

The inkjet head IH may inject the filling resin F_RE while moving in a direction (e.g., a fourth direction DR4 opposite to the second direction DR2).

A height of the preliminary filling layer P_FL may increase whenever the first unit filling processes are performed. In case that the first unit filling processes are completed, the preliminary filling layer P_FL filled into the groove patterns GP may be formed on the pattern part PP. However, after the first basic filling process is completed, the preliminary filling layer P_FL may have a non-uniform height. For example, the preliminary filling layer P_FL filled into the first and second outermost groove patterns GP_O1 and GP_O2 that are farthest from the second folding axis FX2 (see FIG. 5B) among the groove patterns GP may have a height less than that of the preliminary filling layer P_FL filled into other groove patterns (hereinafter, referred to as intermediate groove patterns GP_M).

Particularly, in case that the first and second outermost groove patterns GP_O1 and GP_O2 have different shapes or different widths from those of the intermediate groove patterns GP_M, a difference between the height of the preliminary filling layer P_FL filled into the first and second outermost groove patterns GP_O1 and GP_O2 and the height of the preliminary filling layer P_FL filled into the intermediate groove patterns GP_M may further increase.

Referring to FIGS. 15C, 16E, and 16F, the first additional filling process of additionally filling the filling rein F_RE into the first and second outermost groove patterns GP_O1 and GP_O2 may be performed.

During the first additional filling process, the inkjet head IH may inject the filling resin F_RE only to positions corresponding to the first and second outermost groove patterns GP_O1 and GP_O2 and may not inject the filling resin F_RE to positions corresponding to the intermediate groove patterns GP_M. Thus, the relatively unfilled first and second outermost groove patterns GP_O1 and GP_O2 may be supplemented with the filling resin F_RE. Thus, a height of the preliminary filling layer P_FL may be uniform as a whole, and a height difference between the preliminary filling layer P_FL and the top surface of the pattern glass PGa may be reduced and removed. As an example, the height difference may be about 5 μm or less.

Referring to FIGS. 15D, 16G, and 16H, a second additional filling process of additionally filling the filling resin F_RE into both ends of the groove patterns GP may be performed. Before performing the second additional filling process, each of both the ends of the preliminary filling layer P_FL may have a gentle slope.

During the second additional filling process, the filling resin F_RE may be injected from only two injection nozzles (i.e., first and second outermost injection nozzles SN_O1 and SN_O2 corresponding to both the ends of the groove patterns GP among the injection nozzles provided in the inkjet head IH, and the filling resin F_RE may not be injected from other injection nozzles (i.e., intermediate injection nozzles SN_M). Thus, the filling resin F_RE may be supplemented only on the ends of the preliminary filling layer P_FL having the relatively gentle slope. Thus, the filling layer FL having an overall uniform height may be formed. Thus, the edge surface ES at each of both the ends of the filling layer FL may have an inclined angle greater than that of the edge surface P_ES of each of both the ends of the preliminary filling layer P_FL.

Referring to FIGS. 15E, 16I, and 16J, a window upper film W_UM may be physically connected to the top surface PG-F of the pattern glass PGa on which the filling layer FL is formed. The window upper film W_UM may include a protective layer PL, a window light blocking layer W_BM, and a first window adhesive layer W_AL1. The first window adhesive layer W_AL1 may be disposed on a surface of the protective layer PL facing the pattern glass PGa. The window light blocking layer W_BM may be formed on a surface of the protective layer PL to surround the first window adhesive layer W_AL1. In other embodiments, the window light blocking layer W_BM may be disposed along an edge of the protective layer PL between the first window adhesive layer W_AL1 and the protective layer PL.

The window light blocking layer W_BM may be disposed to cover the edge surface ES of the filling layer FL. As an example, the window light blocking layer W_BM may have a width of about 0.8 mm to about 1 mm. However, the width of the window light blocking layer W_BM is not limited thereto. The width of the window light blocking layer W_BM may be determined according to a size of the glass window WM and a width of the peripheral area NAA (see FIG. 4) of the display module DM (see FIG. 4) disposed below the glass window WM.

The window upper film W_UM may be physically connected to the top surface PG-F of the pattern glass PGa and the filling layer FL by the first window adhesive layer W_AL1. In the disclosure, since the filling layer FL may be formed through the first and second additional filling processes, a height difference of about 5 μm or less may occur between the top surface PG-F of the pattern glass PGa and the filling layer FL. Therefore, in case that the window upper film W_UM is physically connected to the pattern glass PGa, air bubbles may be prevented from being generated between the first window adhesive layer W_AL1 and the pattern glass PGa, and as a result, the pattern part PP may be prevented from being visually recognized.

Referring to FIGS. 15F and 16K, the pattern glass PGa to which the window upper film W_UM is physically connected may be turned over. The window upper film W_UM may be disposed below the pattern glass PGa, and the bottom surface PG-B of the pattern glass PGa may be disposed above the top surface PG-F of the pattern glass PGa.

Figure 16L:
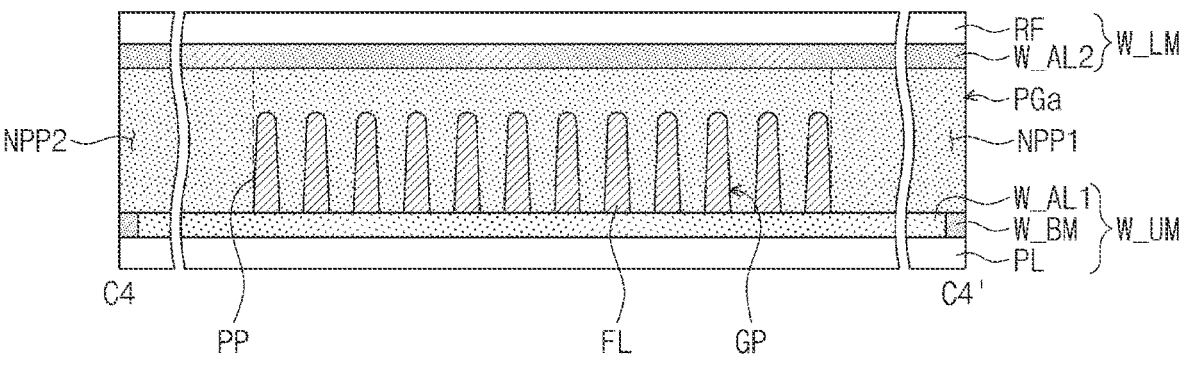
Figure 16L:
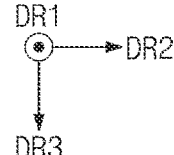
Figure 16M:
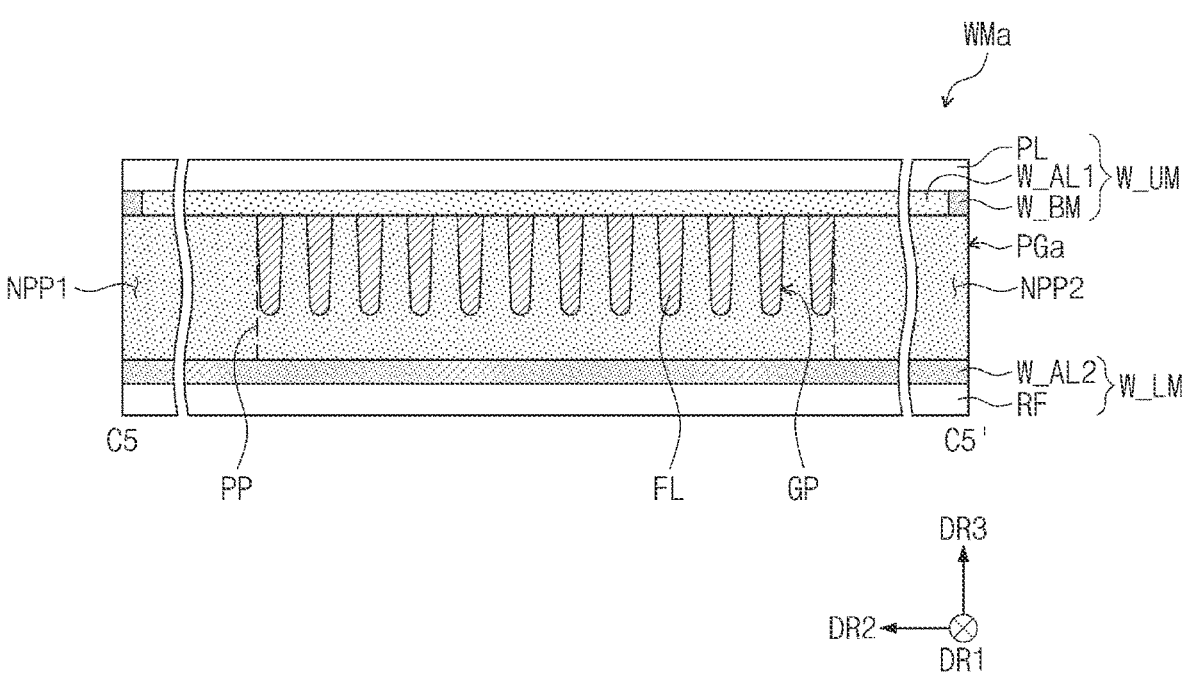

Referring to FIGS. 15G and 16L, the window lower film W_LM may be physically connected to the bottom surface PG-B of the pattern glass PGa. The window lower film W_LM may include a release paper film RF and a second window adhesive layer W_AL2. The second window adhesive layer W_AL2 may be disposed on a surface of the release paper film RF facing the pattern glass PGa. The window lower film W_LM may be physically connected to the bottom surface PG-B of the pattern glass PGa by the second window adhesive layer W_AL2.

Referring to FIGS. 15H and 16M, the pattern glass PGa to which the window lower film W_LM is physically connected may be turned over. The window lower film W_LM may be disposed below the pattern glass PGa, and the window upper film W_UM may be disposed above the pattern glass PGa. Thus, the glass window WMa may be completed.

Figure 17A:
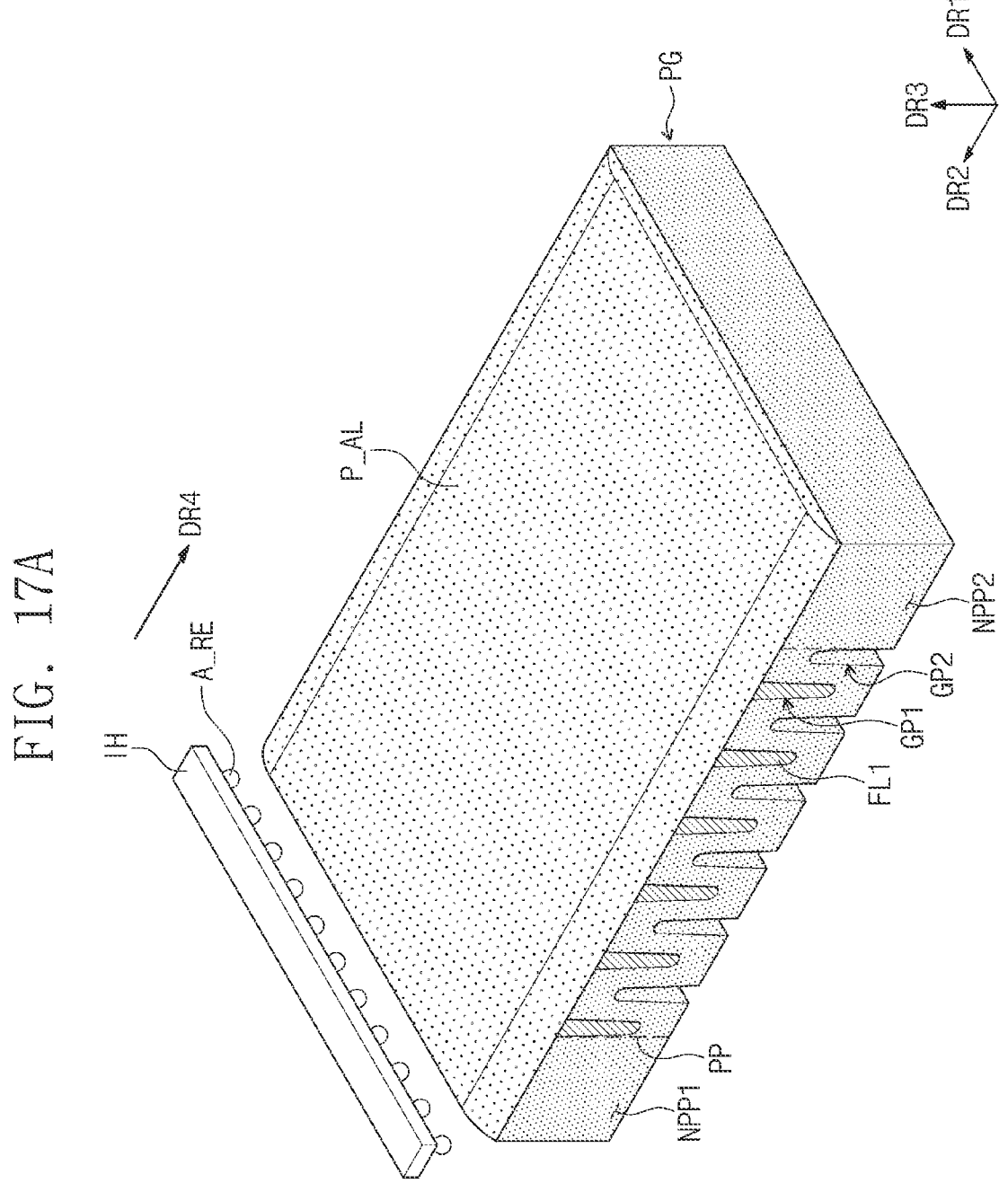
Figure 17B:
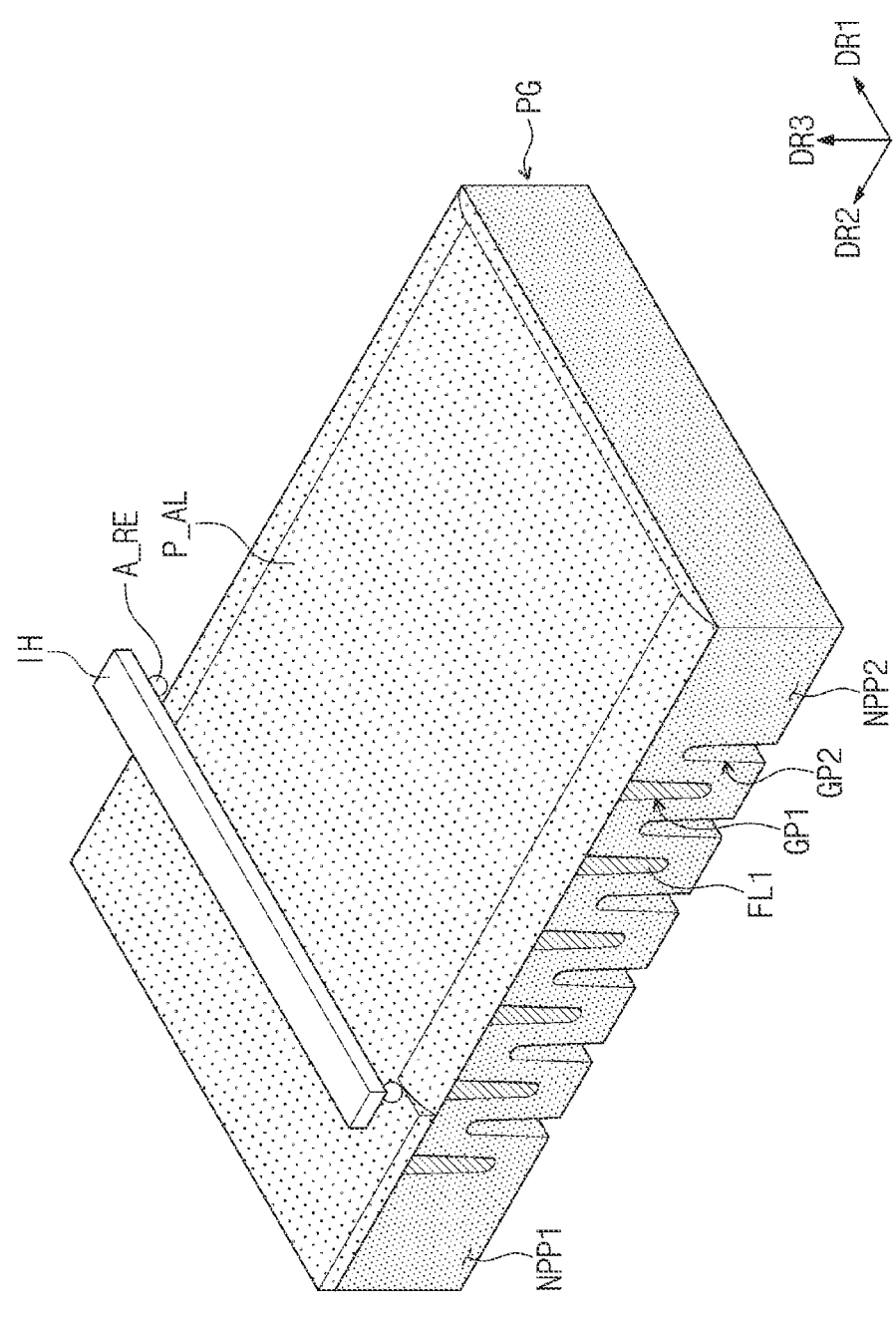
Figure 17C:
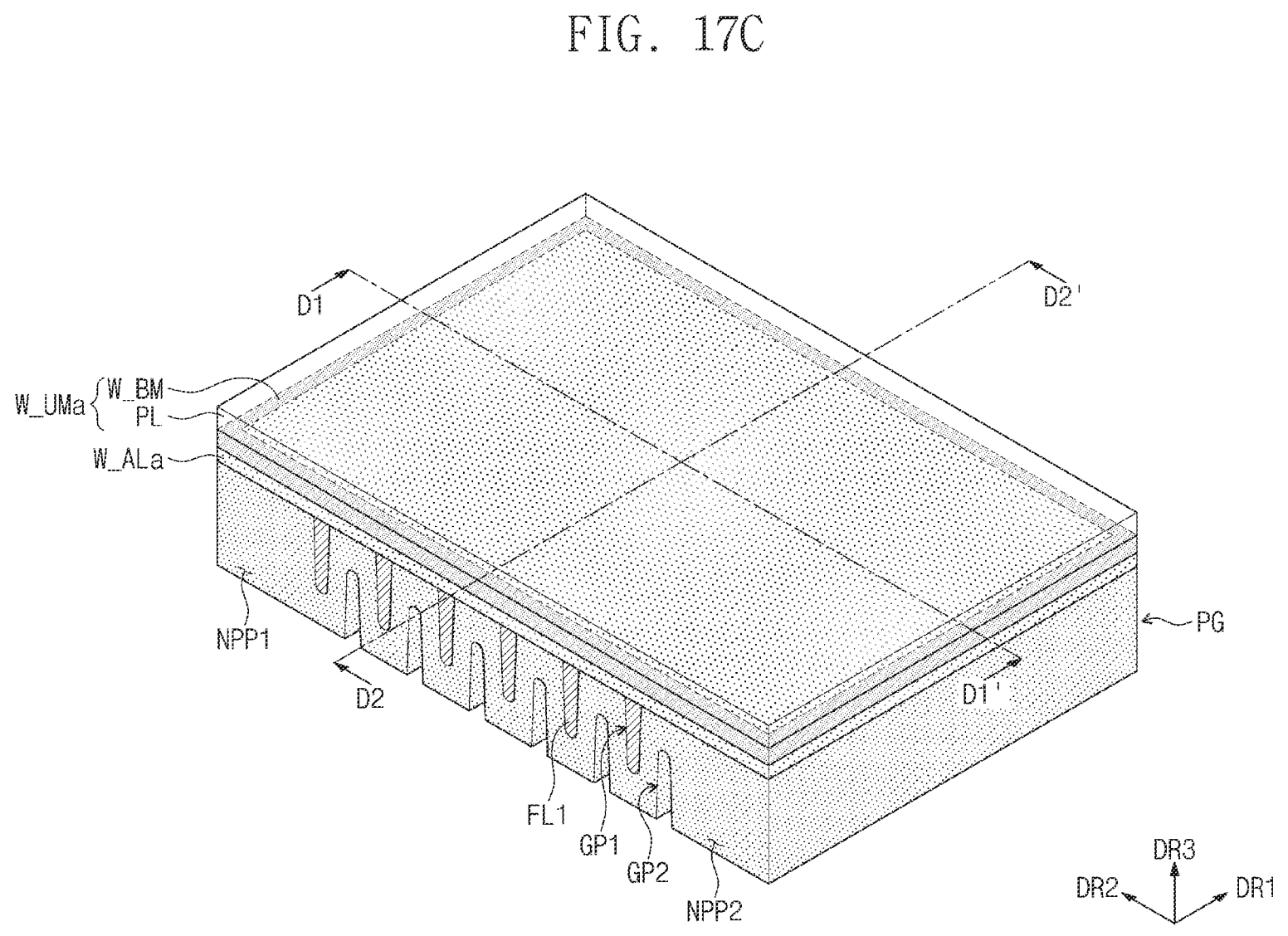

FIGS. 17A to 17C are schematic views illustrating a process of manufacturing a glass window according to an embodiment. FIGS. 18A to 18D are schematic views illustrating a process of manufacturing a glass window according to an embodiment.

Figure 18A:
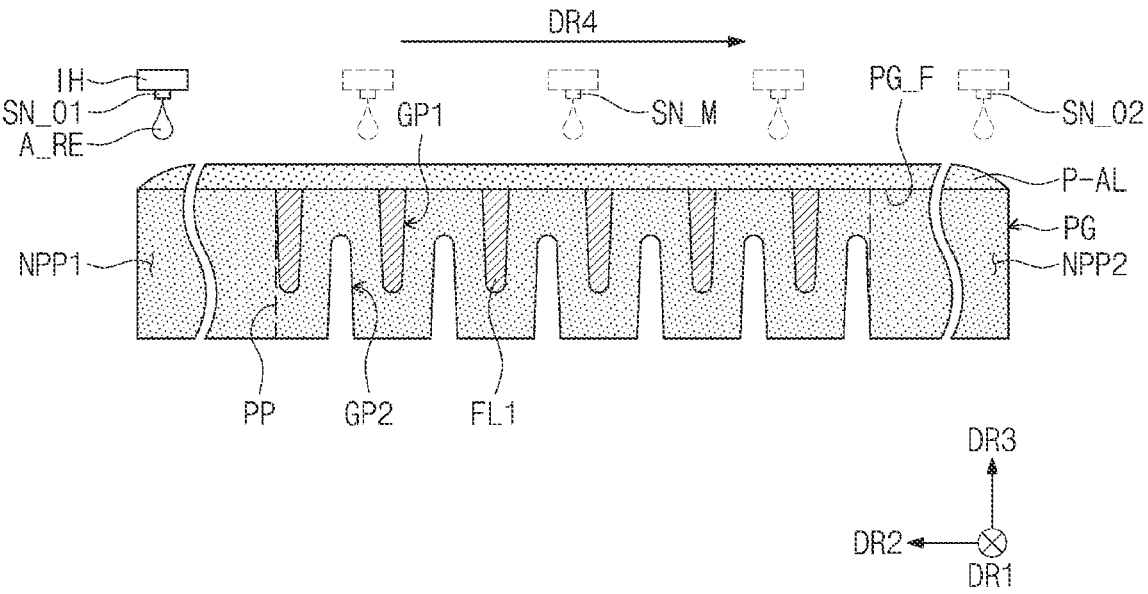
FIGS. 18A to 18D are schematic views illustrating a process of manufacturing a glass window according to an embodiment.
Figure 18B:
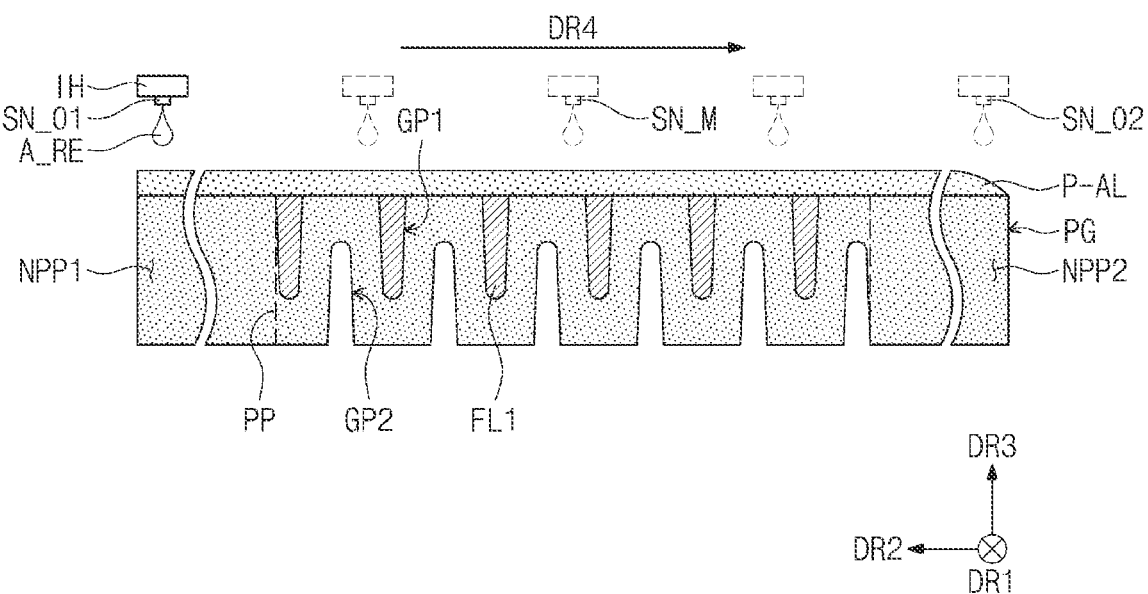
Figure 18C:
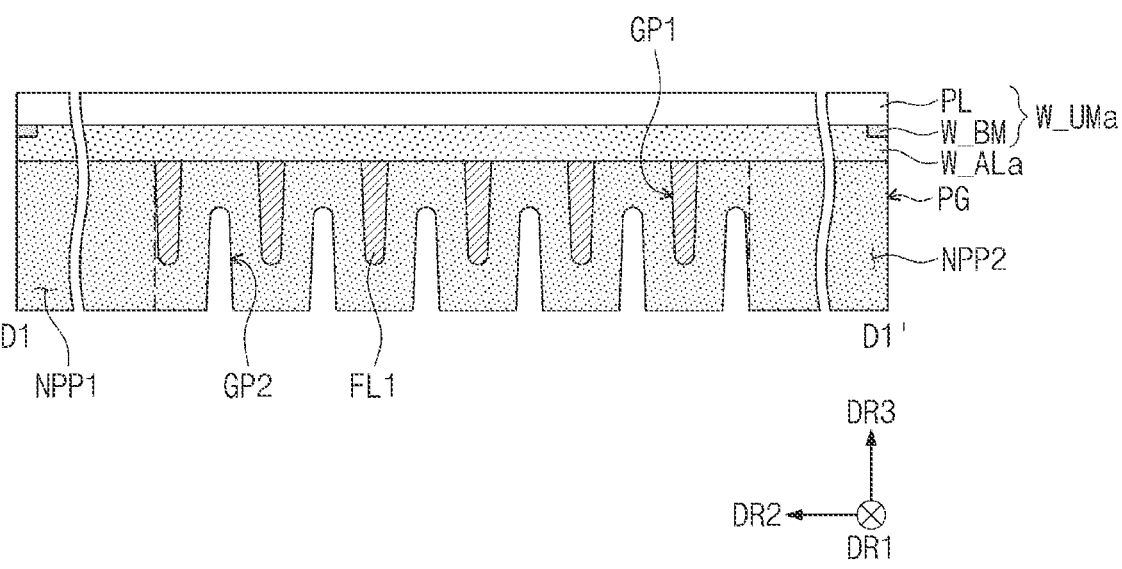
Figure 18D:
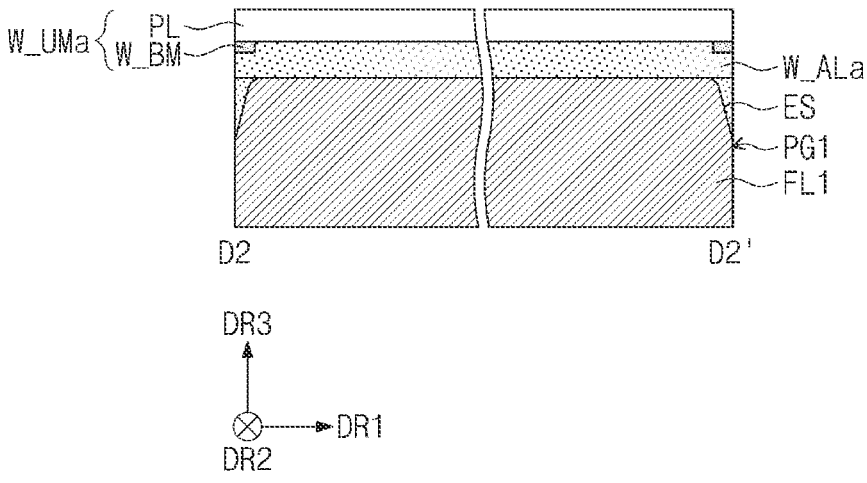

Particularly, FIG. 18A is a view illustrating an adhesive resin formation process of FIG. 17A. FIG. 18B is a view illustrating an adhesive resin additional filling process of FIG. 17B. FIG. 18C is a cross-sectional view taken along line D1-D1' of FIG. 17C. FIG. 18D is a cross-sectional view taken along line D2-D2' of FIG. 17C.

Referring to FIGS. 17A and 18A, an adhesive resin A_RE may be injected on the top surface PG-F (see FIG. 5B) of the pattern glass PG on which the first filling layer FL1 is formed to form a preliminary adhesive layer P_AL. The adhesive resin A_RE may be entirely injected onto the top surface PG-F of the pattern glass PG in an inkjet manner.

The adhesive resin A_RE may be a low-viscosity liquid crystal resin. As an example, the adhesive resin A_RE may have a viscosity of about 3 cPs to about 15 cPs and surface tension of about 20 dyne/cm to about 30 dyne/cm. The adhesive resin A_RE may have a modulus equal to or higher than that of the filling resin F_RE (see FIG. 14B). As an example, the adhesive resin A_RE may have a modulus of about 45 kPa to about 50 kPa. The adhesive resin A_RE may have adhesive strength equal to or greater than that of the filling resin F_RE. As an example, the adhesive resin A_RE may have adhesive strength of about 600 gf/in to about 1,000 gf/in.

The adhesive resin A_RE may have the same refractive index as or different from that of the pattern glass PG. For example, in case that the pattern glass PG has a refractive index of about 1.520, the adhesive resin A_RE may have a refractive index of about 1.490.

The adhesive resin A_RE may include at least one selected from a urethane resin, an epoxy resin, a polyester resin, a polyether resin, an acrylate resin, an acrylonitrile-butadiene-styrene (ABS) resin, and rubber. Particularly, the adhesive resin A_RE may include at least one of phenylene, polyethylene terephthalate (PET), polyimide (PI), polyamide (PAI), polyethylene naphthalate (PEN), and polycarbonate (PC).

Referring to FIGS. 17B and 18B, an additional filling process of additionally filling the adhesive resin A_RE to an edge portion of the preliminary adhesive layer P_AL may be performed. Before performing the additional filling process, the edge portion of the preliminary adhesive layer P_AL may have a gentle slope.

During the additional filling process, the adhesive resin A_RE may be injected from only two injection nozzles (i.e., first and second outermost injection nozzles SN_O1 and SN_O2 corresponding to the edge portion of the preliminary adhesive layer P_AL among the injection nozzles provided in the inkjet head IH, and the adhesive resin A_RE may not be injected from other injection nozzles (i.e., intermediate injection nozzles SN_M). Thus, the adhesive resin A_RE may be supplemented only on the edge portion of the preliminary adhesive layer P_AL having the relatively gentle slope. As a result, the first window adhesive layer W_ALa having an overall uniform height may be formed.

As described above, in case that the first window adhesive layer W_ALa is formed in the inkjet manner, an effect of removing even a minute height difference occurring between the first filling layer FL1 and the pattern glass PG may be achieved. Thus, it is possible to more effectively prevent the pattern part PP from being visually recognized.

Referring to FIGS. 17C, 18C, and 18D, the window upper film W_UMa may be physically connected to the top surface PG-F of the pattern glass PGa on which the first window adhesive layer W_ALa is formed. The window upper film W_UMa may include a protective layer PL and a window light blocking layer W_BM. In other embodiments, the window light blocking layer W_BM may be disposed on a surface of the passivation layer PL and may be disposed along an edge of the passivation layer PL. The window upper film W_UMa may be physically connected to the pattern glass PG by the first window adhesive layer W_ALa.

Since the subsequent manufacturing process of the glass window WM may be the same as that of FIGS. 13F to 13K and FIGS. 14K to 14T, duplicated descriptions will be omitted.

According to an embodiment, the filling layer of the glass window may be formed through the one or two additional filling processes, the height difference between the surface of the pattern glass and the filling layer may be reduced or removed. Therefore, in case that the window upper film is physically connected to the pattern glass, the air bubbles may be prevented from being generated between the window adhesive layer and the pattern glass to prevent the pattern part from being visually recognized.

It will be apparent to those skilled in the art that various modifications and deviations can be made in the disclosure. It is intended that the disclosure covers such modifications and deviations. Therefore, the technical scope of the disclosure is not limited to the contents described in the detailed description.

What is claimed is:

1. A method for manufacturing a glass window comprising a folding area folded with respect to a folding axis and a non-folding area adjacent to the folding area, the method comprising:

forming a pattern glass comprising a pattern part and a non-pattern part adjacent to the pattern part, the pattern part including first groove patterns in a first surface and corresponding to the folding area, the non-pattern part corresponding to the non-folding area; and forming a first filling layer on the pattern part, wherein the forming of the first filling layer comprises:

an initial filling of a filling resin into the first groove patterns, the initial filling comprising providing the filling resin into a first outermost groove pattern and a second outermost groove pattern that are farthest from the folding axis among the first groove patterns, and into at least one intermediate groove pattern, from among the first groove patterns, that is between the first outermost groove pattern and the second outermost groove pattern; and an additional filling of the filling resin into the first outermost groove pattern and the second outermost groove pattern after the initial filling, wherein the initial filling is performed such that an uppermost level of the filling resin in the at least one intermediate groove pattern becomes higher than an uppermost level of the filling resin in the first outermost groove pattern or the second outermost groove pattern, and wherein the additional filling is performed such that a height difference between the uppermost level of the filling resin in the at least one intermediate groove pattern and the uppermost level of the filling resin in the first outermost groove pattern or the second outermost groove pattern decreases in comparison to the initial filling.

2. The method of claim 1, wherein each of the first groove patterns has a strip shape extending in a first direction parallel to the folding axis, and the first groove patterns are disposed in a second direction perpendicular to the first direction.

3. The method of claim 2, wherein the first outermost groove pattern and the second outermost groove pattern are disposed at opposite sides with respect to the folding axis in the second direction.

4. The method of claim 1, wherein the initial filling of the filling resin is in an inkjet manner, and the additional filling of the filling resin is in an inkjet manner.

5. The method of claim 4, wherein the initial filling of the filling resin into the first groove patterns comprises a plurality of unit filling processes, the plurality of unit filling processes comprising:

a first unit filling process of providing the filling resin into the first groove patterns a first time; and a second unit filling process of providing more of the filling resin into the first groove patterns a second time after the first time.

6. The method of claim 5, wherein a discharge amount per groove pattern per each one of the plurality of unit filling processes is the same as a discharge amount per groove pattern per the additional filling of the filling resin into the first outermost groove pattern and the second outermost groove pattern.

7. The method of claim 1, wherein the forming of the first filling layer further comprises: a second additional filling of the filling resin into opposite ends of each of the first groove patterns without further filling an intermediate portion of each of the first groove patterns that is between the opposite ends.

8. The method of claim 7, wherein the initial filling of the filling resin is in an inkjet manner, the additional filling of the filling resin is in an inkjet manner, and the second additional filling of the filling resin is in an inkjet manner.

9. The method of claim 8, wherein the initial filling of the filling resin into the first groove patterns comprises a plurality of unit filling processes, the plurality of unit filling processes comprising:

a first unit filling process of providing the filling resin into the first groove patterns a first time; and a second unit filling process of providing more of the filling resin into the first groove patterns a second time after the first time.

10. The method of claim 9, wherein a discharge amount per groove pattern per each one of the plurality of unit filling processes is the same as a discharge amount per groove pattern per the additional filling of the filling resin.

11. The method of claim 1, wherein the forming of the pattern glass comprises:

forming the first groove patterns, each of which is in a shape that is recessed from a surface of a base glass.

12. The method of claim 11, wherein the forming of the first groove patterns comprises:

irradiating laser onto the surface of the base glass to form laser patterns; and etching the base glass, on which the laser patterns are formed, to form the first groove patterns.

13. The method of claim 11, wherein a height difference between the surface and an uppermost level of the first filling layer is about 5 μm or less.

14. The method of claim 1, further comprising attaching a window upper film to the pattern glass and the first filling layer.

15. The method of claim 14, wherein the window upper film comprises:

a protective layer;

a window adhesive layer disposed between the protective layer and the pattern glass; and a window light blocking layer disposed to surround the window adhesive layer and disposed along an edge of the protective layer.

16. The method of claim 1, further comprising forming a window adhesive layer on the pattern glass and the first filling layer, wherein the forming of the window adhesive layer comprises:

an initial injecting of an adhesive resin onto the pattern glass and the first filling layer to form a preliminary adhesive layer; and an additional injecting of the adhesive resin onto an edge portion of the preliminary adhesive layer to form the window adhesive layer.

17. The method of claim 16, wherein the adhesive resin has adhesion greater than or equal to that of the filling resin.

18. The method of claim 16, wherein the filling resin has a modulus less than or equal to a modulus of the adhesive resin.

19. The method of claim 18, further comprising:

attaching a window upper film to the window adhesive layer, wherein the window upper film comprises:

a protective layer; and a window light blocking layer disposed along an edge of the protective layer.

20. The method of claim 1, wherein the pattern part further comprises second groove patterns in a second surface facing away from the first surface and corresponding to the folding area, and the method for manufacturing the glass window further comprises:

forming a second filling layer on the pattern part, wherein the forming of the second filling layer comprises:

an initial filling of the filling resin into the second groove patterns, the initial filling comprising providing the filling resin into a third outermost groove pattern and a fourth outermost groove pattern that are farthest from the folding axis among the second groove patterns, and into at least one intermediate groove pattern, from among the second groove patterns, that is between the third outermost groove pattern and the fourth outermost groove pattern; and an additional filling of the filling resin into the third outermost groove pattern and the fourth outermost groove pattern after the initial filling of the filling resin into the second groove patterns, wherein the initial filling of the second groove patterns is performed such that an uppermost level of the filling resin in the at least one intermediate groove pattern of the second groove patterns becomes higher than an uppermost level of the filling resin in the third outermost groove pattern and the fourth outermost groove pattern, and wherein the additional filling of the second groove patterns is performed such that a height difference between the uppermost level of the filling resin in the at least one intermediate groove pattern of the second groove patterns and the uppermost level of the filling resin in the third outermost groove pattern and the fourth outermost groove pattern decreases in comparison to the initial filling of the second groove patterns.

21. The method of claim 1, wherein the initial filing comprises:

providing, by at least one nozzle, the filling resin into the first outermost groove pattern;

moving, after the providing the filling resin into the first outermost groove pattern, the at least one nozzle to the at least one intermediate groove pattern;

providing, by the at least one nozzle, the filling resin into the at least one intermediate groove pattern;

moving, after the providing the filling resin into the at least one intermediate groove pattern, the at least one nozzle to the second outermost groove pattern; and providing, by the at least one nozzle, the filling resin into the second outermost groove pattern.

22. The method of claim 21, wherein the additional filing comprises:

providing, by the at least one nozzle, the filling resin into the first outermost groove pattern;

moving, after the providing the filling resin into the first outermost groove pattern, the at least one nozzle from the first outermost groove pattern to the second outermost groove pattern without filling the resin into the at least one intermediate groove pattern; and providing, by the at least one nozzle, the filling resin into the second outermost groove pattern.

23. The method of claim 22, wherein the forming of the first filling layer further comprises: a second additional filling of the filling resin into opposite ends of at least one of the first groove patterns without further filling the resin into an intermediate portion of the at least one of the first groove patterns that is between the opposite ends.

24. A method for manufacturing a display device comprising a folding area folded with respect to a folding axis and a non-folding area adjacent to the folding area, the method comprising:

manufacturing a display panel that displays an image;

manufacturing a glass window; and physically connecting the display panel to the glass window, wherein the manufacturing of the glass window comprises:

forming a pattern part comprising groove patterns corresponding to the folding area and a non-pattern part adjacent to the pattern part and corresponding to the non-folding area; and forming a filling layer on the pattern part, wherein the forming of the filling layer comprises:

an initial filling of a filling resin into the groove patterns, the initial filling comprising providing the filling resin into a first outermost groove pattern and a second outermost groove pattern that are farthest from the folding axis among the groove patterns, and into at least one intermediate groove pattern, from among the groove patterns, that is between the first outermost groove pattern and the second outermost groove pattern; and an additional filling of the filling resin into the first outermost groove pattern and the second outermost groove pattern after the initial filling, wherein the initial filling is performed such that an uppermost level of the filling resin in the at least one intermediate groove pattern becomes higher than an uppermost level of the filling resin in the first outermost groove pattern and the second outermost groove pattern, and wherein the additional filling is performed such that a height difference between the uppermost level of the filling resin in the at least one intermediate groove pattern and the uppermost level of the filling resin in the first outermost groove pattern and the second outermost groove pattern decreases in comparison to the initial filling.

* * * * *